United States Patent
Bryant et al.

(10) Patent No.: US 12,025,630 B2
(45) Date of Patent: *Jul. 2, 2024

(54) SYSTEMS AND METHODS FOR AUTOMATED ANALYSIS

(71) Applicant: Abbott Molecular Inc., Des Plaines, IL (US)

(72) Inventors: Jason E. Bryant, Eliot, ME (US); Daniel P. Casazza, Salem, NH (US); Daniel J. Harris, Deerfield, NH (US); Brett W. Johnson, Naperville, IL (US); Sonal S. Nana, Chicago, IL (US); Timothy J. Patno, Barrington, IL (US); Frank Pawlowski, Amherst, NH (US); David M. Peters, Libertyville, IL (US); Joseph P. Skinner, Libertyville, IL (US); Mark Talmer, Pepperell, MA (US)

(73) Assignee: Abbott Molecular Inc., Des Plaines, IL (US)

(*) Notice: Subject to any disclaimer, the term of this patent is extended or adjusted under 35 U.S.C. 154(b) by 297 days.

This patent is subject to a terminal disclaimer.

(21) Appl. No.: 16/994,163

(22) Filed: Aug. 14, 2020

(65) Prior Publication Data

US 2021/0132097 A1    May 6, 2021

Related U.S. Application Data

(63) Continuation of application No. 15/460,157, filed on Mar. 15, 2017, now Pat. No. 10,775,401.
(Continued)

(51) Int. Cl.
*G01N 35/00* (2006.01)
*G01N 35/02* (2006.01)
(Continued)

(52) U.S. Cl.
CPC ......... *G01N 35/10* (2013.01); *G01N 35/0099* (2013.01); *G01N 35/026* (2013.01);
(Continued)

(58) Field of Classification Search
CPC .. G01N 35/10; G01N 35/0099; G01N 35/026; G01N 35/04; G01N 35/0098;
(Continued)

(56) References Cited

U.S. PATENT DOCUMENTS

| 5,358,691 A | 10/1994 | Clark et al. |
| 5,482,861 A | 1/1996 | Clark et al. |

(Continued)

FOREIGN PATENT DOCUMENTS

| CN | 103988064 | 8/2014 |
| CN | 204241303 | 4/2015 |

(Continued)

OTHER PUBLICATIONS

EP Application No. 17767481.9, Notice of Opposition dated Feb. 2, 2023.
(Continued)

*Primary Examiner* — Benjamin R Whatley
(74) *Attorney, Agent, or Firm* — Edward J. Baba; Mandar A. Joshi; Bozicevic, Field & Francis LLP

(57) ABSTRACT

Aspects of the present disclosure include sample analysis methods and systems. According to certain embodiments, provided are methods of analyzing samples in an automated sample analysis system. The methods include introducing samples and sample preparation cartridges into the system, isolating and purifying an analyte (e.g., nucleic acids and/or proteins) present in the samples at a sample preparation station, and performing analyte detection assays in assay mixtures that include the purified analyte. Also provided are automated sample analysis systems that find use, e.g., in
(Continued)

performing the methods of the present disclosure. In certain aspects, the methods and systems provide for continuous operator access during replenishment or removal of one or any combination of samples, bulk fluids, reagents, commodities, waste, and/or the like.

32 Claims, 52 Drawing Sheets

Related U.S. Application Data

(60) Provisional application No. 62/357,772, filed on Jul. 1, 2016, provisional application No. 62/308,617, filed on Mar. 15, 2016.

(51) Int. Cl.
*G01N 35/04* (2006.01)
*G01N 35/10* (2006.01)
*G01N 21/64* (2006.01)

(52) U.S. Cl.
CPC ......... *G01N 35/04* (2013.01); *G01N 21/6428* (2013.01); *G01N 2021/6432* (2013.01); *G01N 2021/6439* (2013.01); *G01N 2035/00524* (2013.01); *G01N 35/00732* (2013.01); *G01N 35/0098* (2013.01); *G01N 2035/0401* (2013.01); *G01N 2035/0405* (2013.01); *G01N 2035/0436* (2013.01); *G01N 2035/103* (2013.01); *G01N 2035/1048* (2013.01); *G01N 2035/1051* (2013.01)

(58) Field of Classification Search
CPC ......... G01N 35/00732; G01N 21/6428; G01N 2021/6432; G01N 2021/6439; G01N 2035/00524; G01N 2035/0401; G01N 2035/0405; G01N 2035/0436; G01N 2035/103; G01N 2035/1048; G01N 2035/1051
See application file for complete search history.

(56) References Cited

U.S. PATENT DOCUMENTS

| | | |
|---|---|---|
| 8,658,417 B2 | 2/2014 | Godsey et al. |
| 8,840,848 B2 | 9/2014 | Kraihanzel |
| 2009/0221059 A1 | 9/2009 | Williams et al. |
| 2011/0143947 A1 | 6/2011 | Chamberlin et al. |
| 2011/0158865 A1 | 6/2011 | Miller et al. |
| 2011/0159578 A1 | 6/2011 | Godsey et al. |
| 2013/0017535 A1 | 1/2013 | Frey et al. |
| 2013/0037564 A1 | 5/2013 | Williams et al. |
| 2013/0130369 A1 | 5/2013 | Wilson et al. |
| 2013/0137110 A1 | 5/2013 | Kraihanzel |
| 2014/0141518 A1 | 5/2014 | Pufahl |
| 2014/0263316 A1 | 9/2014 | Accurso |
| 2015/0079695 A1 | 3/2015 | Pollack et al. |
| 2017/0176481 A1 | 6/2017 | Accurso et al. |
| 2017/0266668 A1 | 9/2017 | Nana et al. |
| 2017/0267996 A1 | 9/2017 | Talmer et al. |
| 2017/0268038 A1 | 9/2017 | Henning et al. |
| 2017/0268039 A1 | 9/2017 | Nana et al. |
| 2017/0335408 A1 | 11/2017 | Pawlowski et al. |

FOREIGN PATENT DOCUMENTS

| | | |
|---|---|---|
| CN | 105188938 | 12/2015 |
| EP | 1560028 | 8/2005 |
| JP | 2006-276033 | 10/2006 |
| JP | 2011-524004 | 8/2011 |
| JP | 2013500496 A | 1/2013 |
| JP | 2013535193 A | 9/2013 |
| JP | 2013-217882 | 10/2013 |
| WO | 2013/132891 | 9/2013 |

OTHER PUBLICATIONS

Roche Diagnostics Ltd., "COBAS 4800 System" Underwriters Laboratories, Inc., 2009 Original electronic file: D3—cobas_4800_manual_v1-0_en.pdf annexed as: Published-Evidence-3.pdf.

SYSTEMS AND METHODS FOR AUTOMATED ANALYSIS

CROSS-REFERENCE TO RELATED APPLICATIONS

This application is a continuation of U.S. patent application Ser. No. 15/460,157 filed on Mar. 15, 2017, issued as U.S. Pat. No. 10,775,401, which application claims the benefit of U.S. Provisional Patent Application No. 62/308,617 filed Mar. 15, 2016, and U.S. Provisional Patent Application No. 62/357,772 filed Jul. 1, 2016, which applications are incorporated herein by reference in their entireties.

INTRODUCTION

Molecular analysis is transforming the way health care professionals detect and diagnose diseases and conditions. Select key technologies, including polymerase chain reaction (PCR) and next-generation sequencing, are helping transform the ability to analyze patient samples. As these technological advances become incorporated into routine diagnostic testing, classification systems are likely to be impacted and approaches for treatment will be transformed.

Real-time PCR analysis has improved the way clinical laboratories quantify and diagnose medical conditions and diseases, including cancer, microbial infections, and the like. This testing method often combines PCR chemistry with fluorescent probe detection of amplified product in the same reaction vessel. In general, both PCR and amplified product detection are completed in an hour or less, which is considerably faster than conventional PCR detection methods. Real-time PCR assays provide sensitivity and specificity equivalent to that of conventional PCR combined with Southern blot analysis, and since amplification and detection steps are performed in the same closed vessel, the risk of releasing amplified nucleic acids into the environment is reduced. The combination of excellent sensitivity, specificity and speed has made real-time PCR technology an appealing alternative to culture- or immunoassay-based testing methods for diagnosing cancer, infectious diseases, and any other diseases or medical conditions detectable by nucleic-acid based analysis.

SUMMARY

Aspects of the present disclosure include sample analysis methods and systems. According to certain embodiments, provided are methods of analyzing samples in an automated sample analysis system. The methods include introducing samples and sample preparation cartridges into the system, isolating and purifying an analyte (e.g., nucleic acids and/or proteins) present in the samples at a sample preparation station, and performing analyte detection assays in assay mixtures that include the purified analyte. Also provided are automated sample analysis systems that find use, e.g., in performing the methods of the present disclosure. In certain aspects, the methods and systems provide for continuous operator access during replenishment or removal of one or any combination of samples, bulk fluids, reagents, commodities, waste, and/or the like.

DETAILED DESCRIPTION

Figure 1:
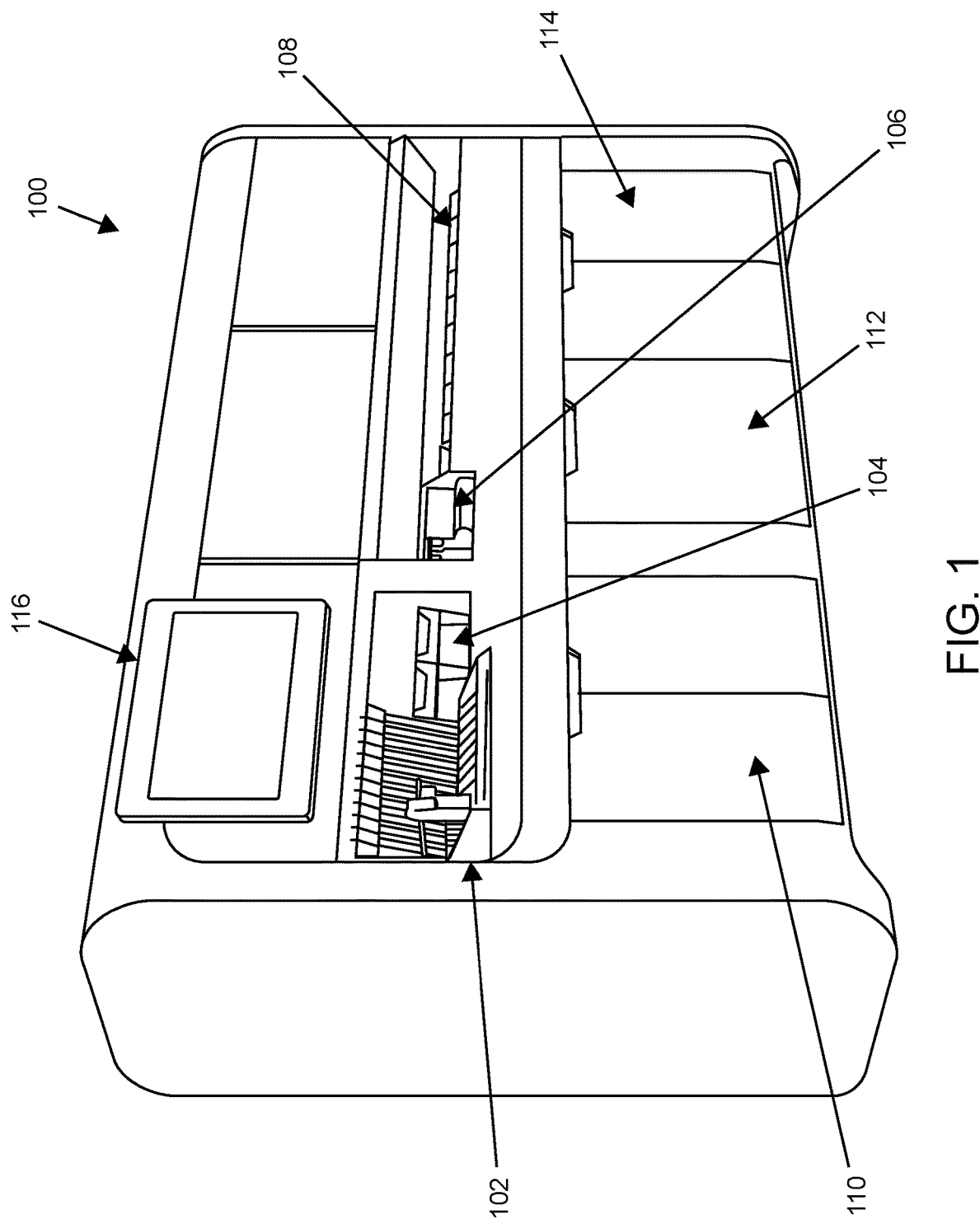
FIG. 1 shows an external view of an automated analysis system according to one embodiment of the present disclosure.

Aspects of the present disclosure include sample analysis methods and systems. According to certain embodiments, provided are methods of analyzing samples in an automated sample analysis system. The methods include introducing samples and sample preparation cartridges into the system, isolating and purifying an analyte (e.g., nucleic acids and/or proteins) present in the samples at a sample preparation station, and performing analyte detection assays in assay mixtures that include the purified analyte. Also provided are automated sample analysis systems that find use, e.g., in performing the methods of the present disclosure. In certain aspects, the methods and systems provide for continuous operator access during replenishment or removal of one or any combination of samples, bulk fluids, reagents, commodities, waste, and/or the like.

Before the present systems and methods are described in greater detail, it is to be understood that the present disclosure is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the present systems and methods. The upper and lower limits of these smaller ranges may independently be included in the smaller ranges and are also encompassed within the systems and methods, subject to any specifically excluded limit in the stated range. Where the stated range includes one or both of the limits, ranges excluding either or both of those included limits are also included in the systems and methods.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present invention, representative illustrative systems and methods are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present systems and methods. Any recited method can be carried out in the order of events recited or in any other order which is logically possible.

Systems and Methods

Aspects of the present disclosure include sample analysis systems and methods. The analysis systems may be adapted to perform a variety of analyses of interest, including but not limited to, nucleic acid analysis. In certain aspects, the analysis systems are automated, meaning that the system is capable of performing sample analysis and any necessary sample preparation steps without user intervention. The methods of the present disclosure may include any of the functions performed by the systems of the present disclosure, in any suitable combination.

According to certain embodiments, the analysis system is an automated nucleic acid preparation and analysis system. Aspects of automated nucleic acid preparation and analysis systems according to certain embodiments of the present disclosure will now be described.

An automated nucleic acid preparation and analysis system of the present disclosure is designed to perform continuous automated nucleic acid preparation and analysis (e.g., while an operator of the system has access to replenish consumables and reagents, remove waste, and/or the like) and finds use, e.g., for performing nucleic acid testing in a clinical laboratory. The system may be a fully integrated and automated molecular diagnostics analyzer that utilizes real-time PCR technology in clinical laboratories. The system is integrated in that it performs both sample preparation (e.g., nucleic acid isolation and purification) and analysis (e.g., real-time PCR analysis). The systems may isolate, wash, purify and amplify a DNA or RNA target of interest from a sample of interest (e.g., plasma, serum, whole blood, body fluid, swab sample, etc.) from a variety of sample container types (e.g., sample tubes that may vary in one or more of size, shape, the presence or type of sample tube cap, and the like).

In certain aspects, the systems of the present disclosure include redundant components for sample processing and nucleic acid analysis, redundant loading/storage areas for, e.g., samples, reagents, sample processing cartridges, pipette tips, and/or the like. The redundant components enable the system to run (including presenting sample results/data) continuously and provide continuous operator access during the replenishment or removal of samples, bulk fluids, reagents, commodities (e.g., reaction vessels and reaction vessel caps, sample processing (SP) cartridges, pipette tips and trays, assay plates, ancillary reagent packs, and/or the like), and waste, without ceasing operation of the system. By "continuous operator access" is meant an operator of the system can replenish and/or remove samples, bulk fluids, reagents, commodities, and waste without ceasing operation of the system, e.g., without interrupting any aspect of the sample preparation and analysis functions of the system.

Accordingly, in certain aspects, provided are methods of continuously analyzing samples in an automated sample analysis system. The method includes loading samples and sample preparation (SP) cartridges into the system, filling SP cartridges with bulk reagents at an SP cartridge bulk reagent filling station including two or more SP cartridge bulk reagent filling positions and pipetting samples into the SP cartridges at an SP cartridge sample filling station including two or more SP cartridge sample filling positions. The method further includes preparing the samples in the SP cartridges for analysis by isolating and purifying an analyte present in the samples at a sample preparation station including two or more SP cartridge sample preparation positions. The method further includes combining the purified analyte with assay reagents to form assay mixtures, and performing analyte detection assays on the assay mixtures to analyze the samples. Without ceasing operation of the system, an operator of the system has continuous access to the system for replenishment or removal of one or any combination of: samples, bulk fluids, reagents, commodities, and waste.

In certain aspects, a system of the present disclosure employs a "lockstep" protocol where the steps of the protocol follow one another as closely as possible. In some instances, the lockstep protocol is determined based on corresponding steps of different protocols where such protocols will be performed in parallel or concomitantly. Thus, a lockstep protocol need not consist of only successive shortest steps of a particular protocol, but may instead include one or more longest steps of various protocols that are to be performed in parallel. In some embodiments, the systems and methods involve running multiple assays according to the longest processing and/or analysis step required for each particular assay. For example, in some instances, a multi-assay processing method may include preparing a sample for a period of time corresponding to a longest SPU cartridge preparation step required for all of the assays of the plurality. An SP cartridge preparation step may include the aliquoting of necessary reagents into sample processing wells of a multi-well vessel in preparation for sample processing, e.g., lysis and extraction of nucleic acids. SP cartridge preparation steps for different assays will vary, e.g., because certain assays may require more or less reagents than another assay. The methods of multi-assay processing and analysis as described herein provide for simplified programming (e.g., software programming) of an automated multi-assay processing/analysis device by limiting scheduling complexity for steps of the automated processes, including sample processing and analysis. In certain aspects, a system of the present disclosure implements a lockstep assay protocol as described in No. 62/308,625, the disclosure of which is incorporated herein by reference in its entirety.

According to certain embodiments, systems of the present disclosure provide random access to all assays, meaning that the system permits the ordering and processing of any test (assay) in any order provided that the system has the necessary reagents/consumables for requested test. The total number of onboard assays may vary, and in certain aspects is 2 or more, 5 or more, 10 or more, 15 or more, 20 or more, 30 or more, 40 or more (e.g., 48 or more), or 50 or more assays in parallel. The assays may be the same or different. In certain embodiments, up to 12 different assays of interest may be processed in parallel. Any assays of interest may be performed. In certain aspects, the system performs assays to detect the presence or absence of microbial nucleic acids in a sample. For example, the system may include assay reagents for carrying out real-time PCR analysis to determine the presence or absence in the sample of a bacterial nucleic acid, viral nucleic acid, yeast nucleic acid, and/or the like. In certain aspects, the system includes reagents for testing for the presence or absence of a nucleic acid from one or more of human immunodeficiency virus (HIV), Hepatitis C virus (HCV), Hepatitis B virus (HBV), *Chlamydia trachomatis* (CT), *Neisseria gonorrhoeae* (NG), Human papillomavirus (HPV), Cytomegalovirus (CMV), Epstein-Barr virus (EBV), Polyomavirus BK (BKV), Methicillin-resistant *Staphylococcus aureus* (MRSA), *Clostridium difficile* (C. Diff.), Vancomycin-resistant enterococci (VRE), adenovirus, *Mycobacterium tuberculosis* (TB), Varicella Zoster Virus (VZV), Herpes simplex virus (HSV), John Cunningham virus (JCV), enterovirus, Lymphogranuloma Venereum (LGV), viruses of a Respiratory Viral Panel (RVP), Human Herpesvirus 6 (HHV6), *Trichomonas vaginalis, Mycoplasma genitalium*, norovirus, and zika virus.

According to certain aspects, a system of the present disclosure includes a sample loading area including two or more sample loading positions, and a sample preparation (SP) cartridge loading area including two or more SP cartridge loading positions. By "loading area" is meant an area at which objects are loaded and optionally removed (in whole or in part). For example, a sample loading area encompasses an area at which samples may be both loaded and removed. Systems of the present disclosure may further include an SP cartridge bulk reagent filling station that includes two or more SP cartridge filling positions, a robotic pipettor, an SP cartridge sample filling station including two or more SP cartridge sample filling positions, a sample preparation station including two or more SP cartridge sample preparation positions, a sample analysis station that includes two or more sample analysis units, and a sample analysis system control center (SCC) that interfaces with the instrument and external systems.

An external view of an automated analysis system according to one embodiment of the present disclosure is shown in FIG. 1. In this example, system 100 is an automated nucleic acid preparation and analysis system that includes sample loading area 102, pipette tip loading area 104, ancillary reagent loading area 106, assay reagent plate loading area 108, sample processing (SP) cartridge loading area 110, bulk fluid storage area 112 and solid waste storage area 114. Ancillary reagents may include magnetic particles, elution buffer, and/or the like that find use, e.g., in isolating, purifying and eluting nucleic acids at a sample preparation station of the system. The system includes local user interface (LUI) 116. LUI 116 includes a touchscreen display for displaying a graphical user interface to the operator. The display may enable the operator to locally view patient results, assess the status of the instrument, etc. Not shown in FIG. 1 are internal components of the system including a sample filling station, a sample preparation station, a sample analysis station, and other internal system components.

Figure 2:
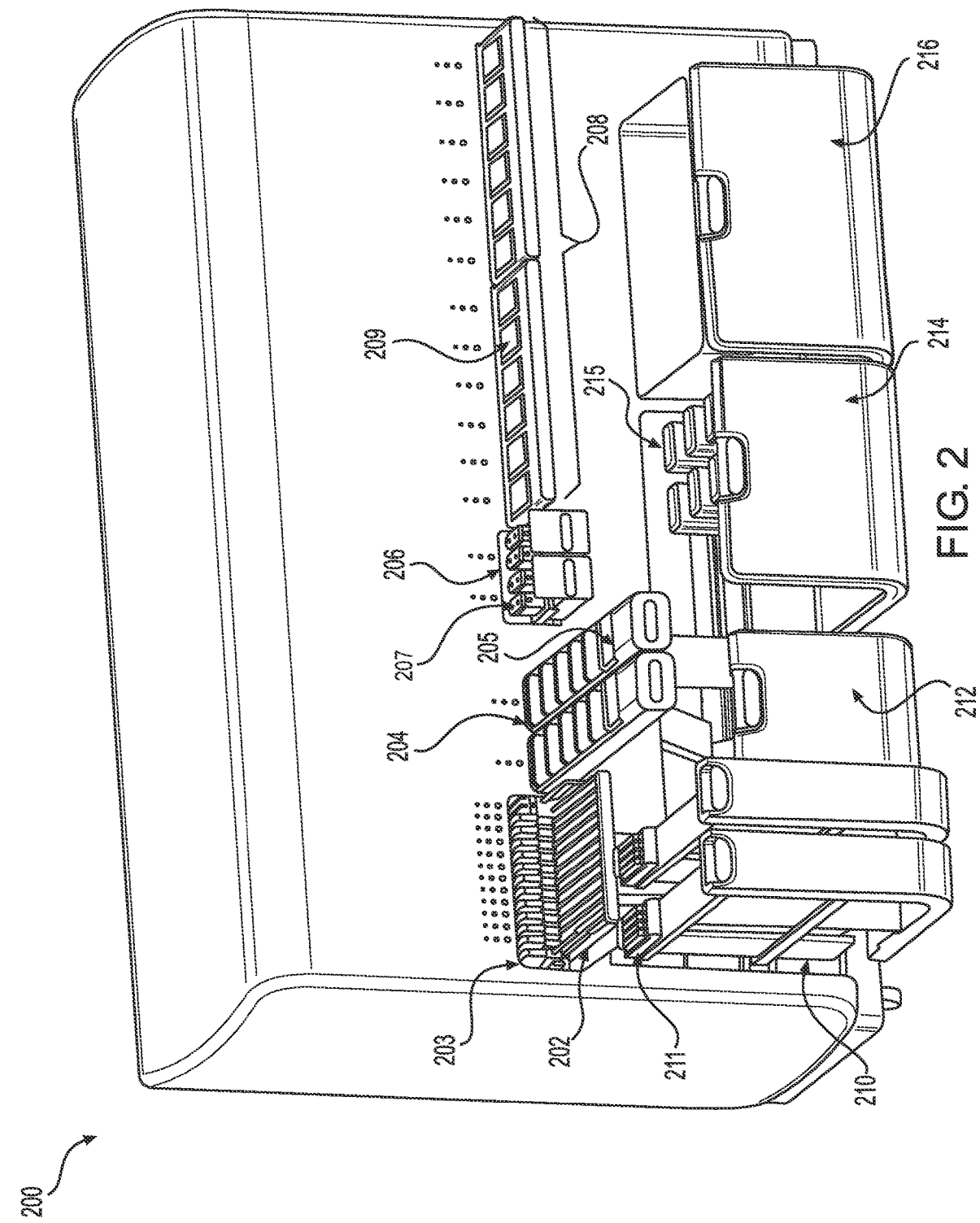
FIG. 2 shows an external view of an automated analysis system, with shelves and drawers of certain loading and storage areas open, according to one embodiment.

An external view of an automated analysis system according to one embodiment of the present disclosure is shown in FIG. 2. In this example, system 200 is an automated nucleic acid preparation and analysis system that includes sample loading area 202, pipette tip loading area 204, ancillary reagent loading area 206, assay reagent plate loading area 208, SP cartridge loading area 210, reaction vessel waste storage area 212, bulk fluid storage area 214 and solid waste storage area 216. As shown in FIG. 2, each loading or storage area includes a shelf or drawer to facilitate loading and/or removal of the relevant item(s) by an operator of the system, where the shelves or drawers of system 200 are shown in the open position in FIG. 2. In this example, samples are present in tubes and loaded into the system in sample tube racks, including sample tube rack 203. Pipette tips 205 for use by a robotic pipettor of the system are shown in pipette tip loading area 204. Ancillary reagent packs, including ancillary reagent pack 207, are shown in ancillary reagent loading area 206. Assay reagent plates, including assay reagent plate 209, are shown in assay reagent plate loading area 208. SP cartridges, including SP cartridge 211, are shown in SP cartridge loading area 210. Bulk fluid (bulk reagent) containers, including bulk fluid container 215, are shown in bulk fluid storage area 214. Not shown in FIG. 2 are internal components of the system including a sample filling station, a sample preparation station, a sample analysis station, and other internal system components.

Various areas and stations which may be present in the systems of the present disclosure, and which may be utilized for performing the methods of the present disclosure, will now be described in greater detail.

Sample Loading Area

As summarized above, an automated analysis system of the present disclosure includes a sample loading area. The sample loading area may include two or more sample loading positions. According to certain embodiments, samples loaded into the system are present in sample tubes. Sample tubes may be loaded into the system individually, or may be loaded together with other sample tubes within a sample tube rack. When sample tube racks are employed, the two or more sample loading positions may be two or more lanes into which the racks are loaded. For example, the sample tube loading area may include a platform having two or more lanes into which a user places sample tube racks. The lanes may be separated by lane dividers. The number of lanes may vary. In certain aspects, the loading area includes from 2 to 20 lanes, such as from 5 to 15 lanes (e.g., 12 lanes).

Figure 3:
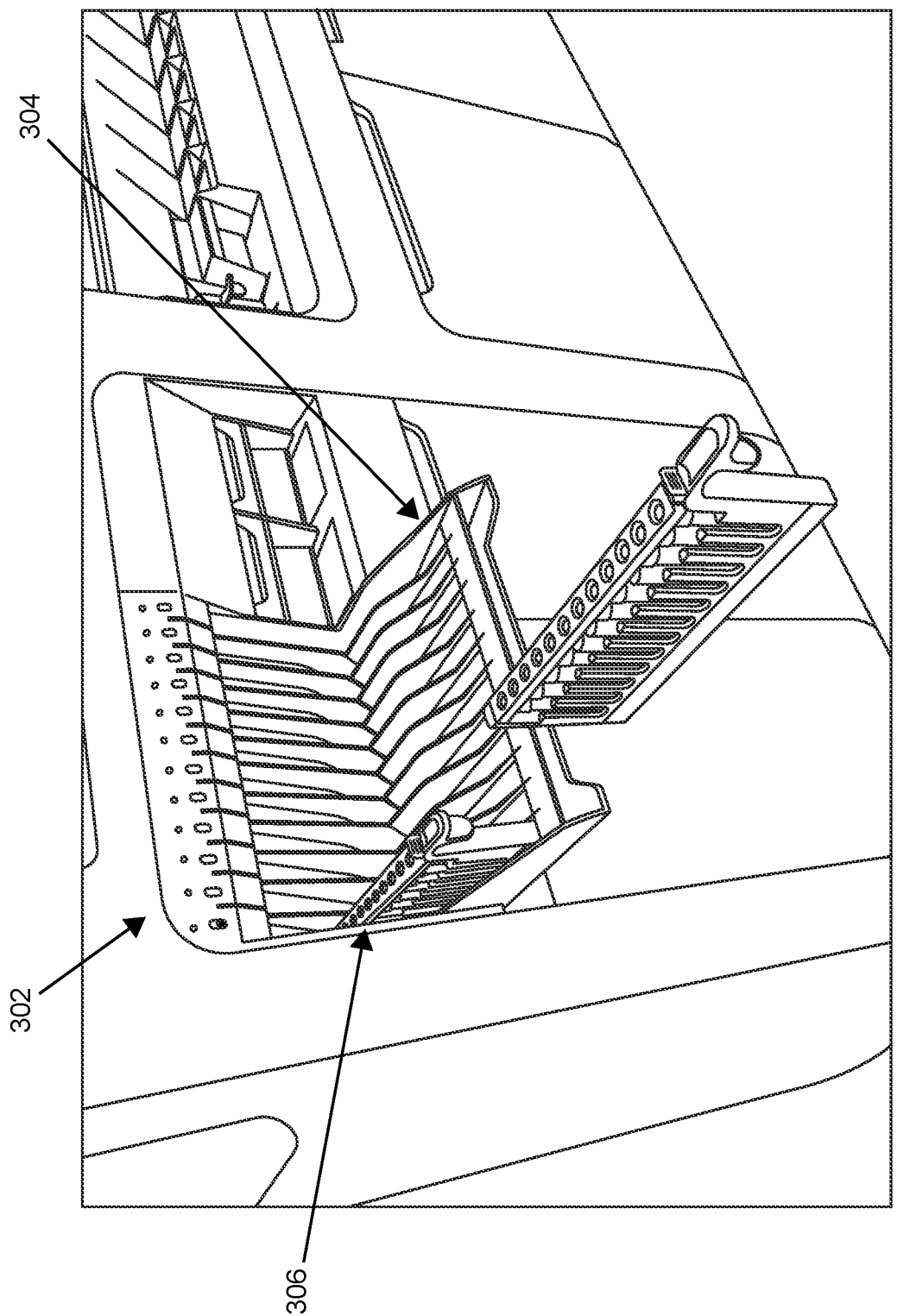
FIG. 3 shows a sample loading area of an automated analysis system according to one embodiment.

According to certain embodiments, the sample loading area includes a loading shelf that pivots between a closed/up (unavailable) and open/down (available) loading position. Shown in FIG. 3 is sample loading area 302 in which loading shelf 304 is in the open/down (available) loading position. Sample tube rack 306 is present in a lane of loading shelf 304.

Figure 4A:
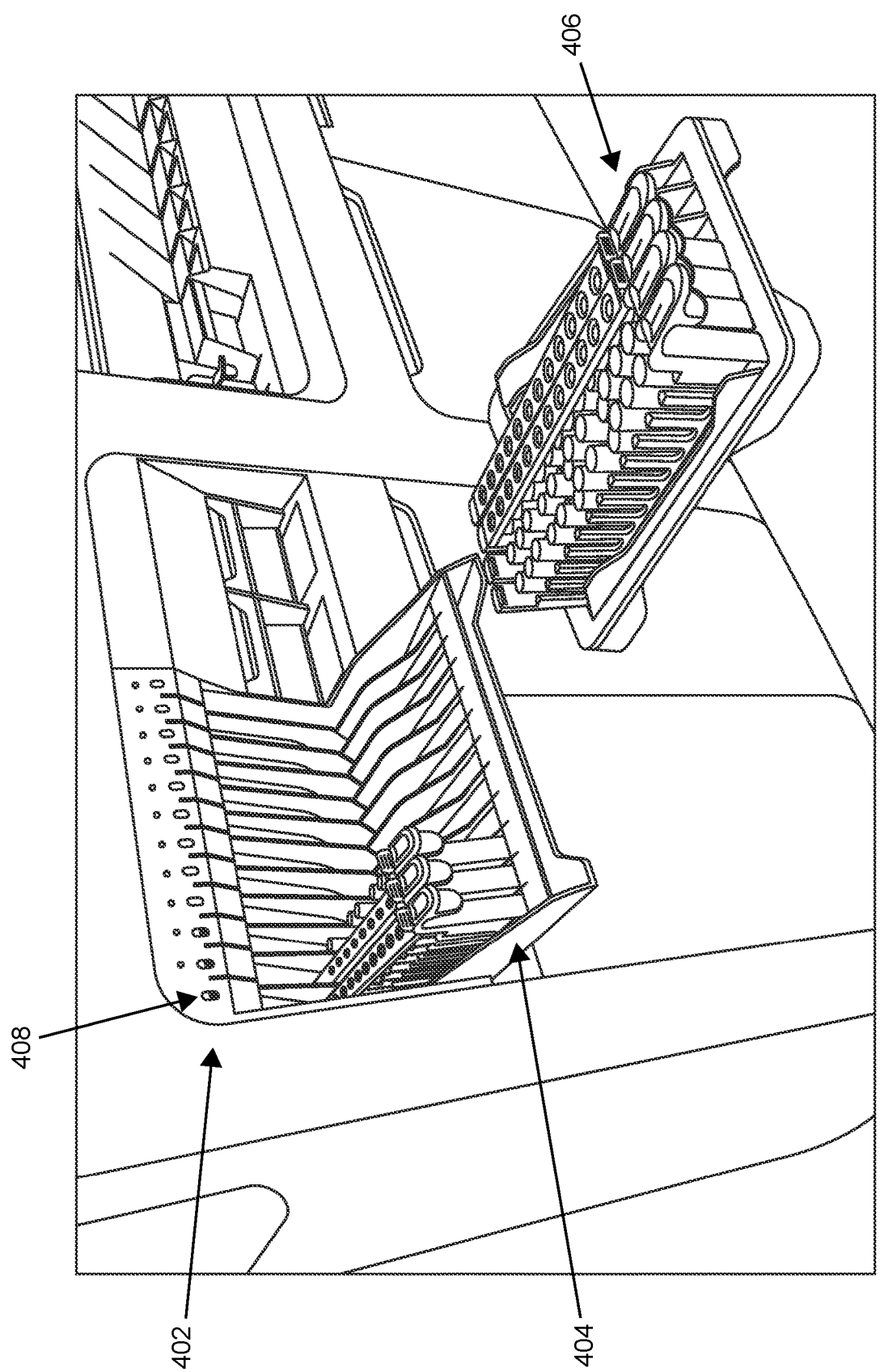
FIGS. 4A and 4B show a sample loading area and detached shelf according to one embodiment. The shelf finds use in loading multiple sample tube racks into the system, e.g., in a single motion.
Figure 4B:
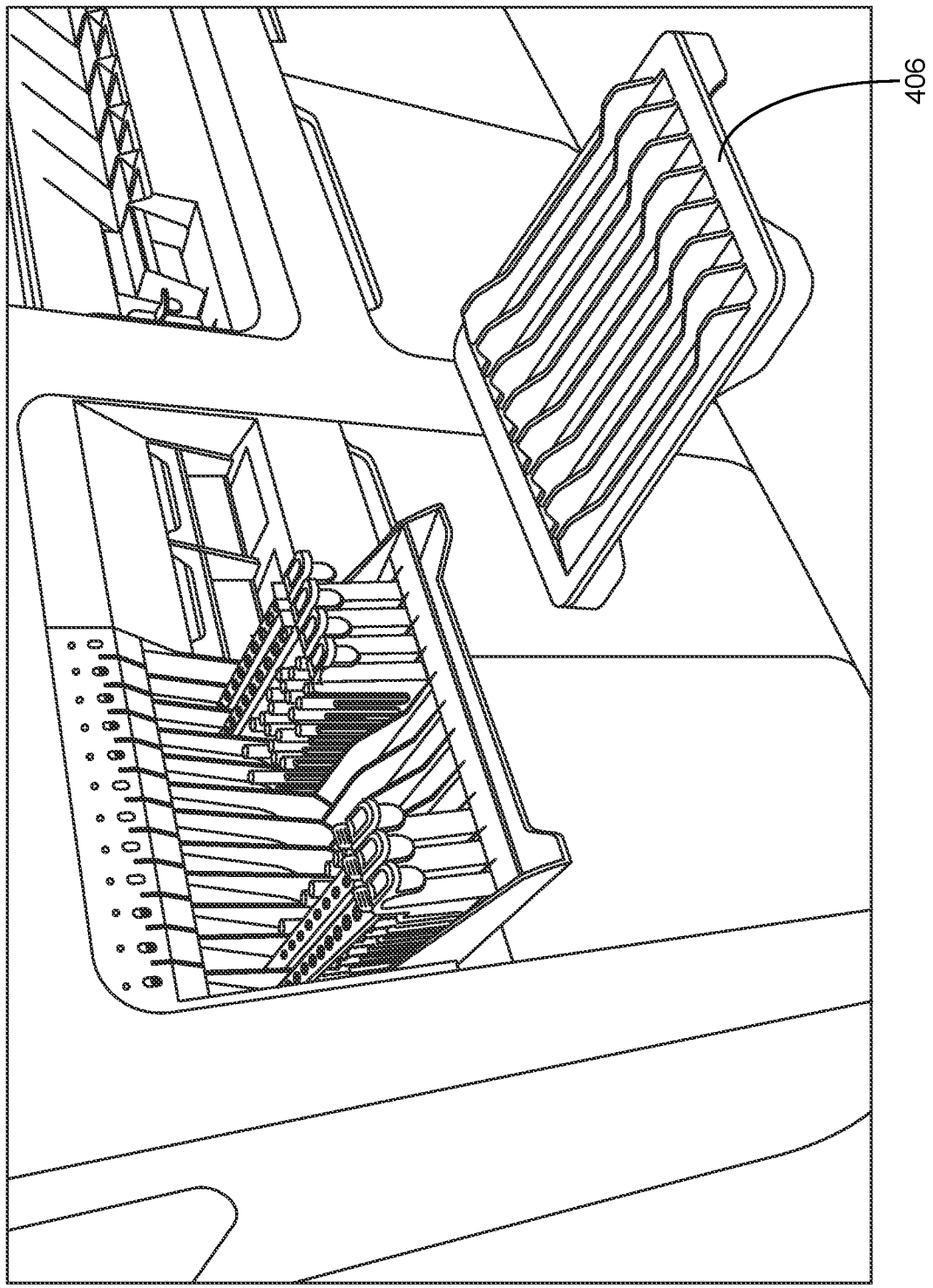

Shown in FIG. 4A is sample loading area 402 in which loading shelf 404 is in the open/down (available) loading position. Three sample tube racks are present in respective lanes of loading shelf 404. In this example, the system includes detached sample rack shelf 406 which can be loaded by an operator away from the system as the samples come into the laboratory. Once the desired number of racks are loaded on shelf 406, the racks can be loaded from shelf 406 to sample loading area 402 of the system in a single motion. FIG. 4B shows such a shelf and sample introduction area subsequent to the transfer of multiple racks in a single motion from the shelf to the sample introduction area. This functionality finds use, e.g., for consolidating high volume and low volume samples on one platform.

According to certain embodiments, the sample loading area includes lane indicator lights aligned with each lane to indicate to the operator information including lane/processing status, lane availability, and/or the like. Shown in FIG. 4A are lane indicator lights, e.g., lane indicator light 408, located above their respective lanes to indicate processing status/availability of the lanes.

Figure 5:
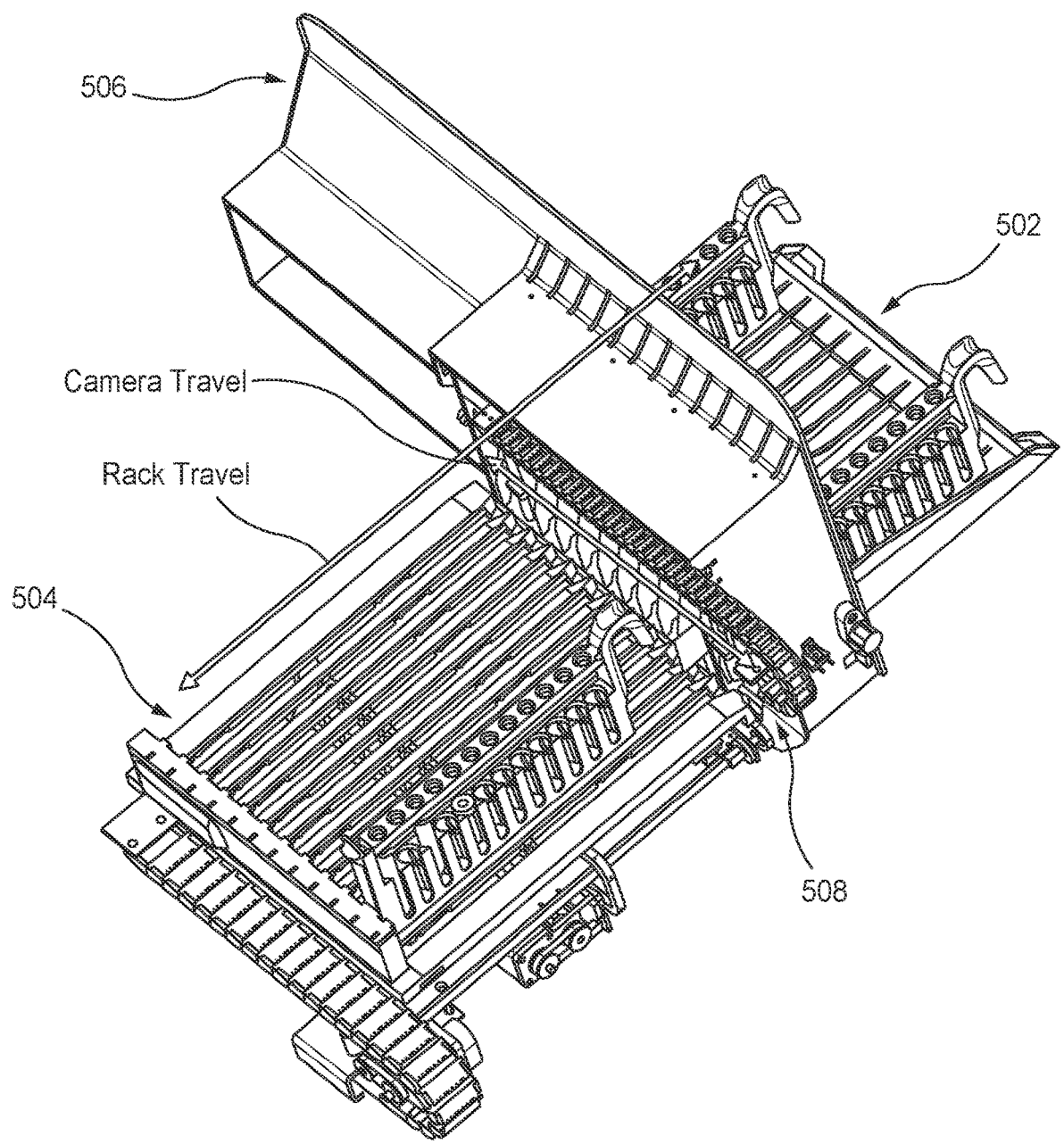
FIG. 5 shows a sample loading area that includes a sample tube identification code reader according to one embodiment.

In certain aspects, the sample loading area includes a sample tube identification code reader. The sample tube identification code reader may be a sample tube barcode reader. The identification code may vary and in certain aspects is either a one-dimensional code, a two-dimensional code (e.g., a QR code), or the like. A sample loading area that includes a sample tube identification code reader is shown in FIG. 5. Shown is sample rack shelf 502 in the down/open (available) position, internal sample rack area 504, and panel 506 disposed between sample rack shelf 502 and internal sample rack area 504. In this example, sample tube racks placed by an operator on sample rack shelf 502 are transported by the system from sample rack shelf 502 to internal sample rack area 504. Upon determining that a particular sample tube rack will be transported from the sample rack shelf to the internal sample rack area, the system moves the sample tube identification code reader (here, barcode reader camera 508) to a position adjacent to that of sample tube rack travel, and as the sample tube rack travels from the sample rack shelf to the internal sample rack area, barcode reader camera 508 successively reads barcodes present on sample tubes present in the sample tube rack. The camera also identifies unique rack and tube characteristics that can be used by the system to prevent potential user errors.

As such, according to certain embodiments, the methods of the present disclosure may include reading sample identification information (e.g., a sample barcode) present on sample racks and sample tubes as sample tube racks are loaded into the system.

In certain aspects, the sample loading area includes a sample tube rack identification code reader. For example, the sample loading area may include one or more cameras disposed proximal to the sample tube rack area of the loading area for reading a barcode present on the racks.

According to certain embodiments, the sample loading area includes a detection system for detecting the presence and/or position of a rack within lanes (e.g., external and/or internal lanes) of the sample loading area. The detection system may include position sensors provided in the front and/or rear of the sample loading area for detecting whether a rack is partially inserted, fully inserted, or has been ejected by the system upon completion of sample analysis. According to certain embodiments, when a rack is fully inserted into a lane, the rack is fixed into place by a fixing mechanism. For example, the rack may be fixed into place by a locking rib present on the surface of a lane that mates with a notch present on the underside of the rack. Reversible fixing of the rack upon full insertion deters the user from removing an in-process rack, while still allowing removal in case of, e.g., loss of power to the system.

In certain aspects, the sample loading area of the system is adapted to receive samples automatically from a different automated system. For example, the system can function as a separate automated sample preparation and analysis system, or be integrated (e.g., configured in a workcell) with one or more other systems, e.g., one or more other automated sample preparation and analysis systems. A workcell may be adapted for automated transport of sample tubes (e.g., present in sample tube racks) between individual systems of the workcell. For example, a rack that includes one or more sample tubes present in a first system may be transported to a different system of the workcell, e.g., to balance the workload between the systems. For sample tube transport between systems of the workcell, each system may include an internal sample tube (or sample tube rack) conveyor system that includes a conveyor belt. The systems may be positioned such that the conveyor belts of the internal conveyor systems of adjacent systems are aligned, permitting the transport of tube racks between systems. Details regarding internal sample tube (or sample tube rack) conveyor systems that find use in transporting containers between systems/modules are described in U.S. Patent Application Ser. No. 62/269,535, the disclosure of which is incorporated herein by reference in its entirety.

Pipette Tip Loading Area

An automated sample analysis system of the present disclosure may include a pipette tip loading area. In certain aspects, the pipette tip loading area includes one or more (e.g., 2) pipette tip drawers each having positions for two or more pipette tip racks, to facilitate the loading of tip racks into the system. According to certain embodiments, the one or more drawers may be completely removed from the system to enable loading of tip racks at a location remote from the system, e.g., at a different area within a clinical diagnostics laboratory or facility.

Figure 6:
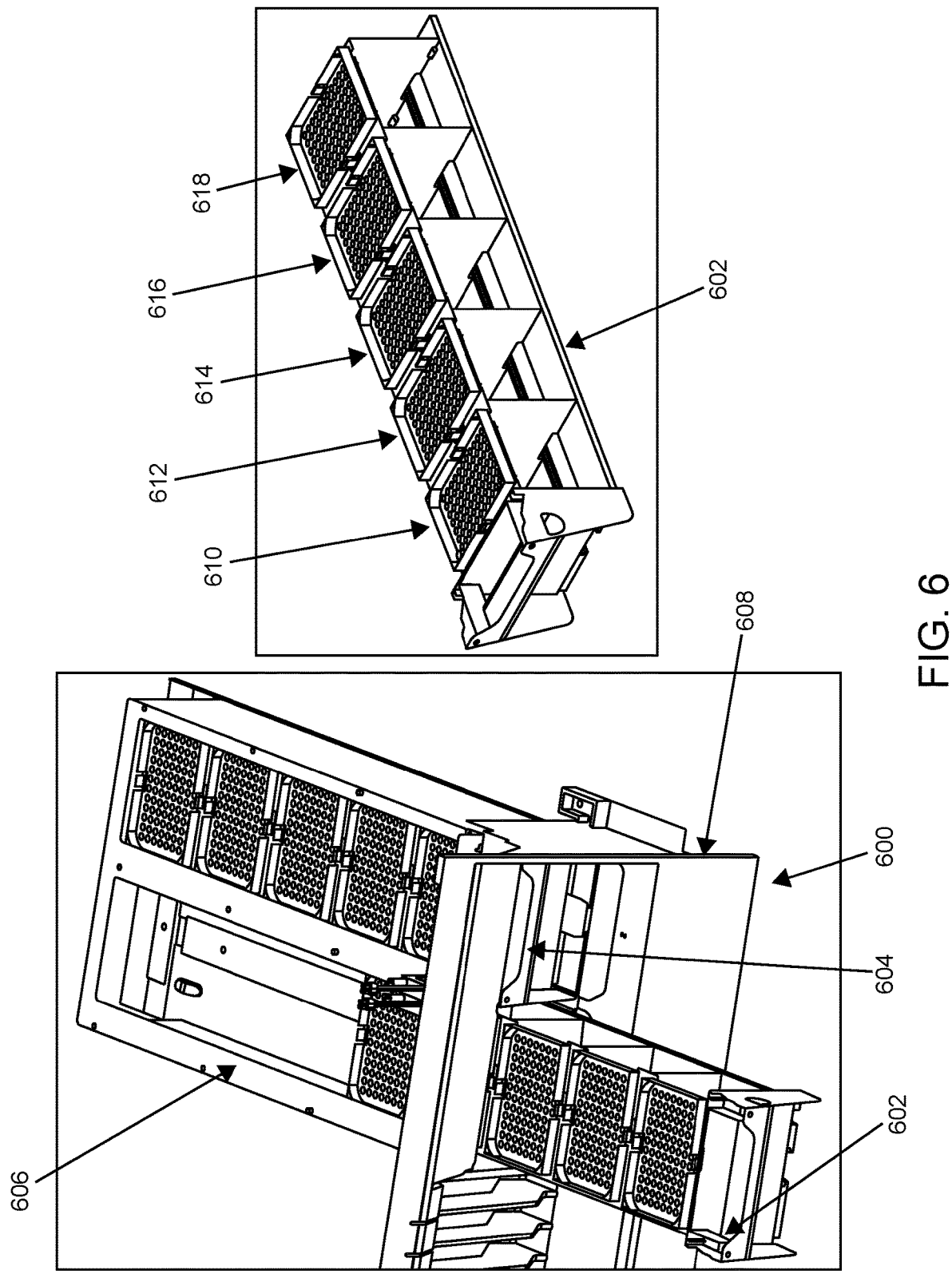
FIG. 6 shows a pipette tip loading area according to one embodiment.

A pipette tip loading area according to one embodiment is illustrated in FIG. 6. Shown is pipette tip loading area 600 that includes two pipette tip rack drawers 602 and 604 and internal pipette tip rack drawer receptacle 606. Panel 608 separates the external and internal portions of pipette tip loading area 600. In this example, each pipette tip rack drawer includes positions for 5 pipette tip racks. Shown on the right of FIG. 6 is pipette tip rack drawer 602 that includes pipette tip racks 610-618, where drawer 602 has been completely removed from the automated sample analysis system.

Figure 7:
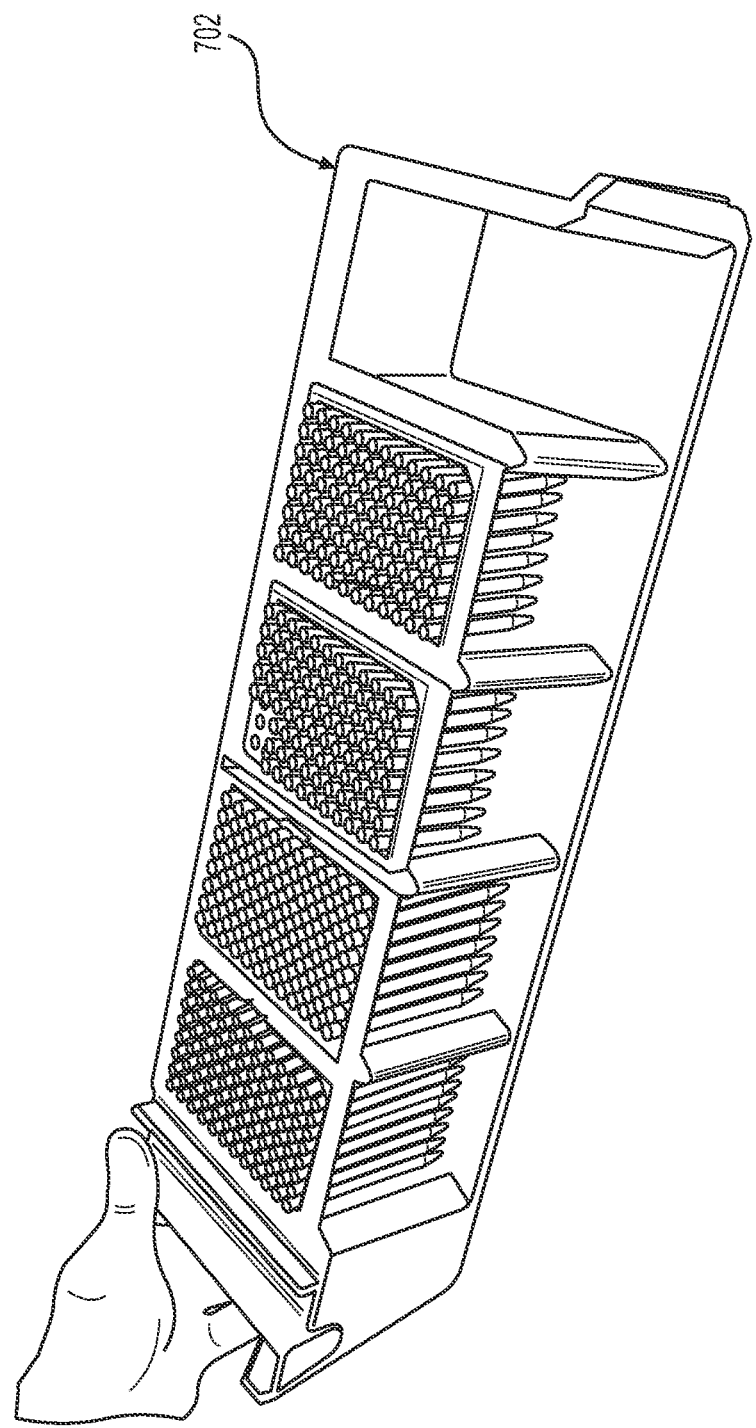
FIG. 7 shows a pipette tip rack loading drawer according to one embodiment. The drawer is removable from the system and can be loaded with pipette tip racks from above or from the side.

FIG. 7 shows a pipette tip rack drawer according to one embodiment. Tip rack drawer 702 has positions for 5 pipette tip racks. The drawer includes a side opening at each of the 5 positions to enable side-loading of tip racks into the positions. Side-loading of tip racks may reduce the occurrence of tips being displaced from the tip racks upon loading of the tip racks into the drawers, which displacement occurs at an appreciable level when loading the tip racks from the top, e.g., due to inaccurate placement of tip racks into open positions in the drawer when loading from above. In FIG. 7, 4 of the 5 tip rack positions of tip rack drawer 702 are occupied, and the open position at the far right may be loaded from above or from the side as enabled by the lack of a wall on one side of the position.

Ancillary Reagent Loading Area

In certain aspects, an automated sample analysis system of the present disclosure includes an ancillary (or auxiliary) reagent loading area. Ancillary reagents may include, e.g., magnetic particles for capturing nucleic acids at the sample preparation station, elution buffer for eluting purified nucleic acids at the sample preparation station, and/or the like.

Figure 8:
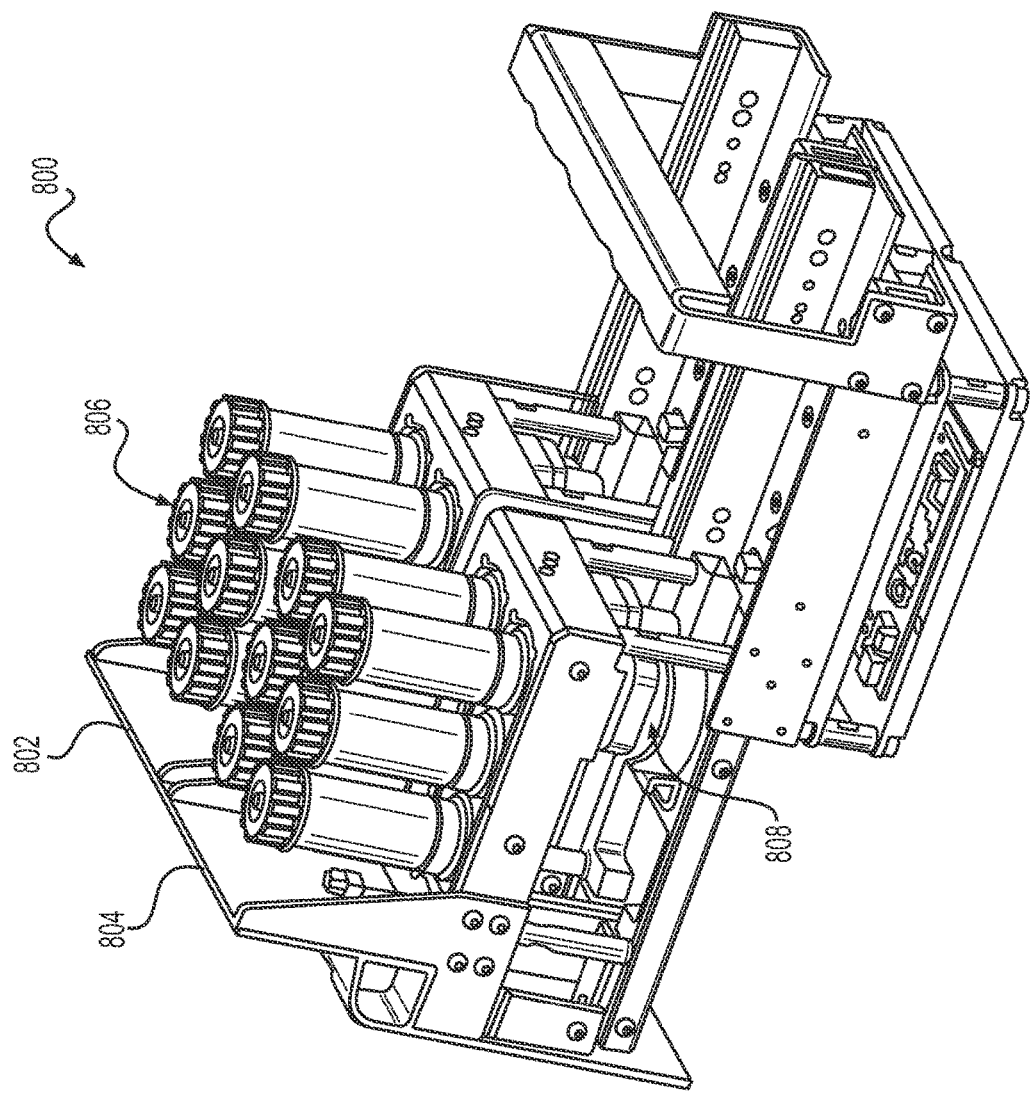
FIG. 8 shows an ancillary reagent loading area according to one embodiment.

According to certain embodiments, the ancillary reagent loading area includes one or more drawers into which individual ancillary reagent tubes, or a pack of ganged ancillary reagent tubes, are loaded. FIG. 8 is an illustration of an example ancillary reagent loading area according to one embodiment. Ancillary reagent loading area includes drawers 802 and 804. In this example, each drawer has positions for 6 ancillary reagent tubes. With respect to drawer 802, 6 ancillary reagent tubes are present, including ancillary reagent tube 806. Upon loading and closing of the one or more ancillary reagent loading drawers, the system has been loaded with ancillary reagents.

In certain aspects, when one or more ancillary reagent tubes include magnetic particles, the ancillary reagent loading area includes a mixing motor to mix the magnetic particles, thereby maintaining the particles in suspension for consistent aspiration by a pipettor robot of the system. Shown in FIG. 8 is mixing motor 808 for maintaining magnetic particles in a suspended state within the ancillary reagent tube inserted into the position having the motor. The mixing motor may work by alternatingly rotating the ancillary reagent tube in counterclockwise and clockwise directions.

Figure 9:
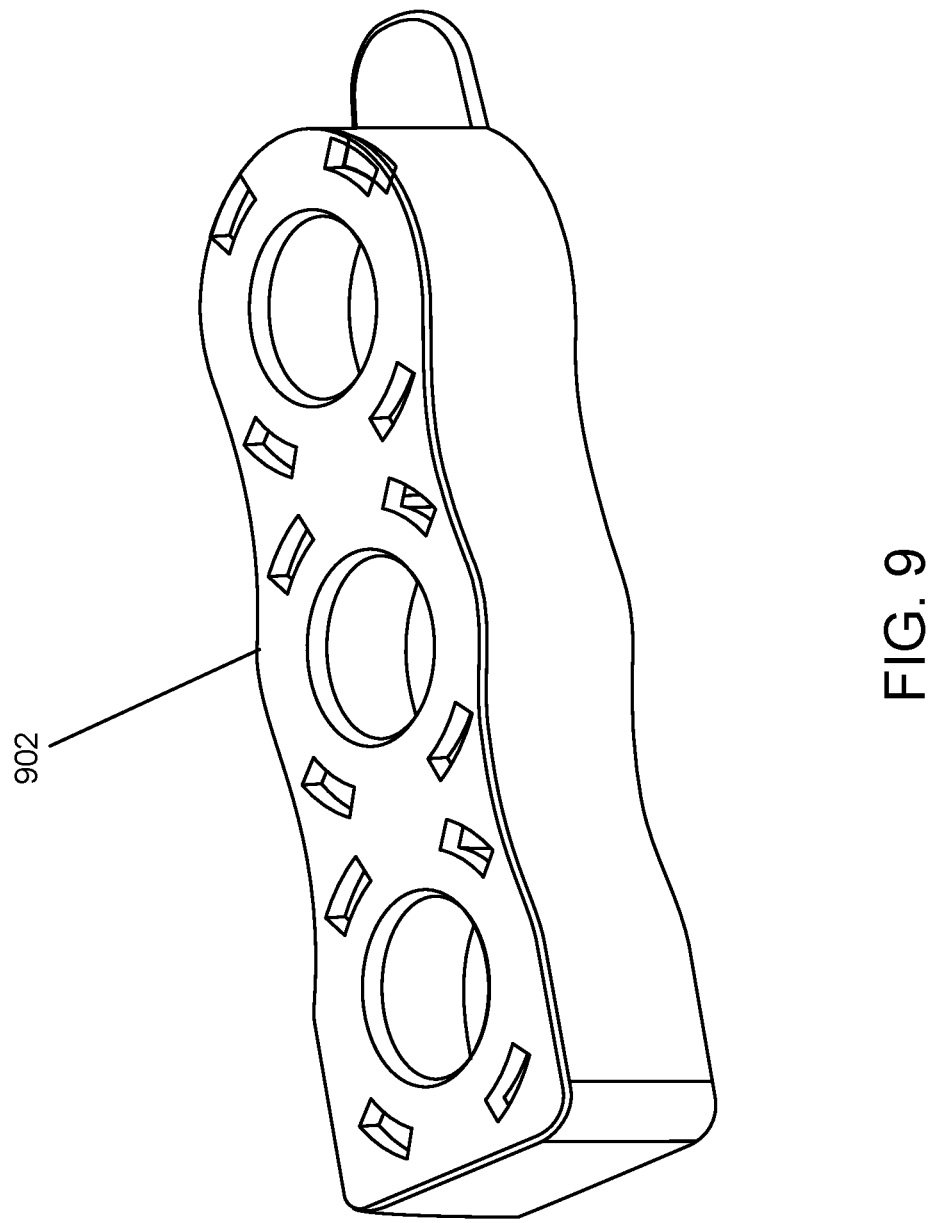
FIG. 9 shows an ancillary reagent pack holder according to one embodiment.

According to certain embodiments, the operator loads ancillary reagent tubes into the system in the form of ancillary reagent packs. Shown in FIG. 9 is an ancillary reagent pack holder according to one embodiment. In this example, the reagent pack holder 902 is designed to mate with the tops (e.g., caps) of 3 ancillary reagent tubes, such that the operator may introduce 3 ancillary reagent tubes into the ancillary reagent loading area in a single motion. Pack holder 902 includes openings that permit access to the tops of the ancillary reagent tubes, enabling aspiration of the contents of the tubes by a pipettor robot of the system. The types of reagents within the tubes of the ancillary reagent packs may vary and can be selected by an operator of the system.

Assay Reagent Loading Area

In certain aspects, an automated sample analysis system of the present disclosure includes an assay reagent loading area. Assay reagents include those reagents which are combined with samples subsequent to sample preparation and are necessary for the system to perform the desired assay.

According to certain embodiments, the sample analysis station performs nucleic acid amplification-based assays (e.g., the sample analysis station may include units that perform real-time PCR and detection), and the assay reagents include one or more nucleic acid amplification reagents selected from amplification primers (e.g., labeled amplification primers) specific to a target of interest, a thermostable polymerase, a cofactor (e.g., $Mg^{2+}$) for the polymerase, a buffer suitable for the assay, and/or the like. The reagents may be loaded into the system in liquid or non-liquid form. In certain aspects, the reagents loaded into the system are lyophilized. Lyophilized reagents have the advantage of being storage stable, such that lyophilized reagents loaded into the system are stable for extended periods of time, e.g., 30 days or more.

Assay reagents may be loaded into the system in individual tubes. In other aspects, one or more plates that include the assay reagents are loaded into the system. The plates may be in any desired format (48-well, 96-well, 384-well, etc.). A plate may include the same assay reagents in each well of the plate, or the assay reagents in a plate may vary from well to well.

In certain aspects, the system performs assays to detect the presence or absence of microbial nucleic acids in a sample, such that the system may include assay reagents for carrying out real-time PCR analysis to determine the presence or absence in the sample of a bacterial nucleic acid, viral nucleic acid, yeast nucleic acid, and/or the like. Assay reagent plates loaded into the system may include liquid or lyophilized reagents that include amplification primers for amplification and detection of one or more microbial target selected from: human immunodeficiency virus (HIV), Hepatitis C virus (HCV), Hepatitis B virus (HBV), *Chlamydia trachomatis* (CT), *Neisseria gonorrhoeae* (NG), Human papillomavirus (HPV), Cytomegalovirus (CMV), Epstein-Barr virus (EBV), Polyomavirus BK (BKV), Methicillin-resistant *Staphylococcus aureus* (MRSA), *Clostridium difficile* (C. Diff.), Vancomycin-resistant enterococci (VRE), adenovirus, *Mycobacterium tuberculosis* (TB), Varicella Zoster Virus (VZV), Herpes simplex virus (HSV), John Cunningham virus (JCV), enterovirus, Lymphogranuloma Venereum (LGV), viruses of a Respiratory Viral Panel (RVP), Human Herpesvirus 6 (HHV6), *Trichomonas vaginalis, Mycoplasma genitalium*, norovirus, and zika virus.

Assay plates may be loaded into the system using one or more assay plate carriers. An assay plate carrier may include a single assay plate position, or two or more assay plate positions. When two or more assay plates are present in an assay plate carrier, the reagents in each of the assay plates may be the same, or the reagents between different assay plates may be different. For example, each plate in a carrier may include the same assay reagents (that is, for running the same test, e.g., HIV), or a plate in a carrier may include different assay reagents from those in a different plate in the carrier. According to certain embodiments, the system includes assay plate carriers having assay plates such that 5 or more, 10 or more, 20 or more (e.g., 24 or more), 30 or more, 40 or more (e.g., 48 or more), or 50 or more different assays may be run in the system in parallel.

Figure 10:
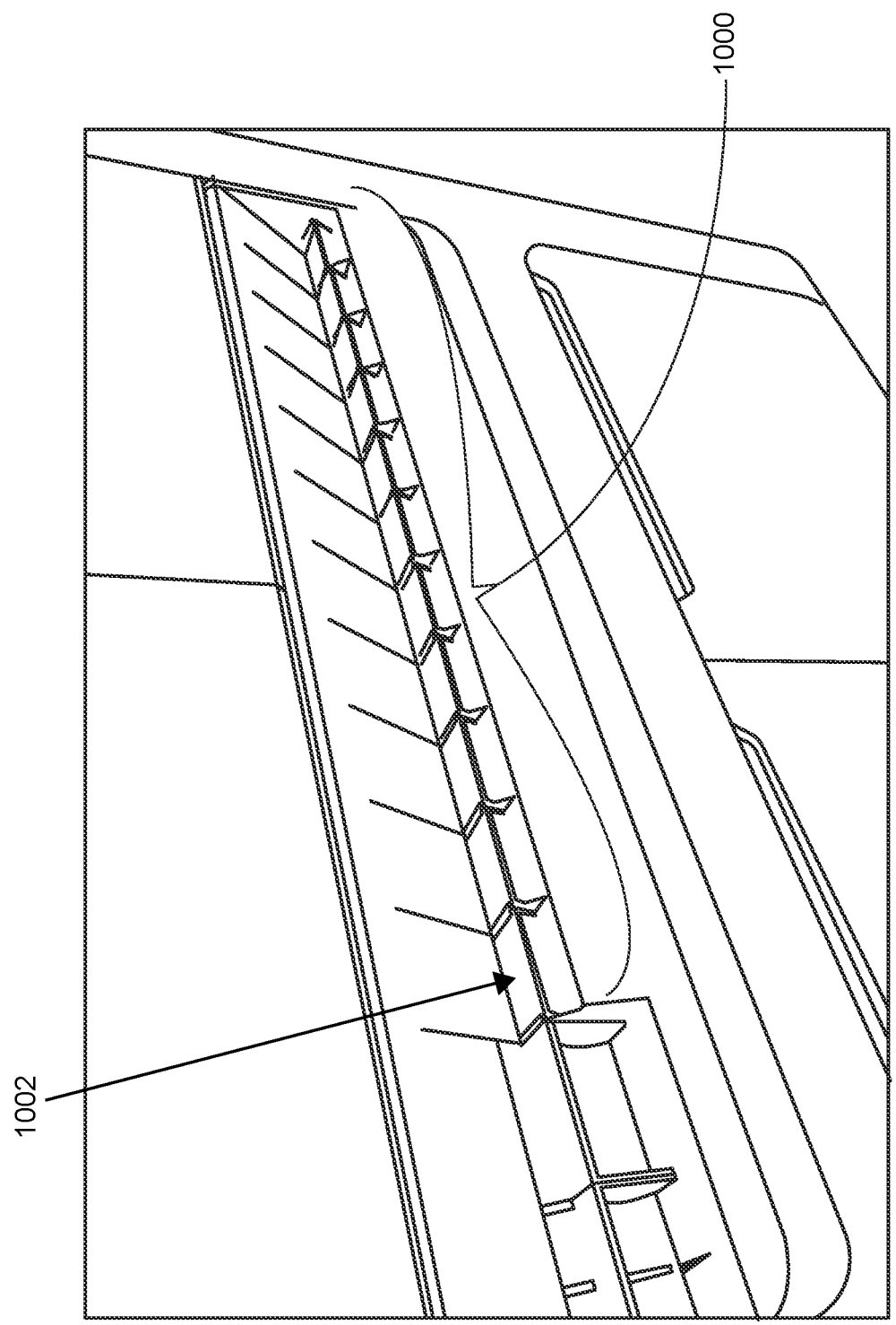
FIG. 10 shows an assay reagent loading area according to one embodiment.
Figure 11:
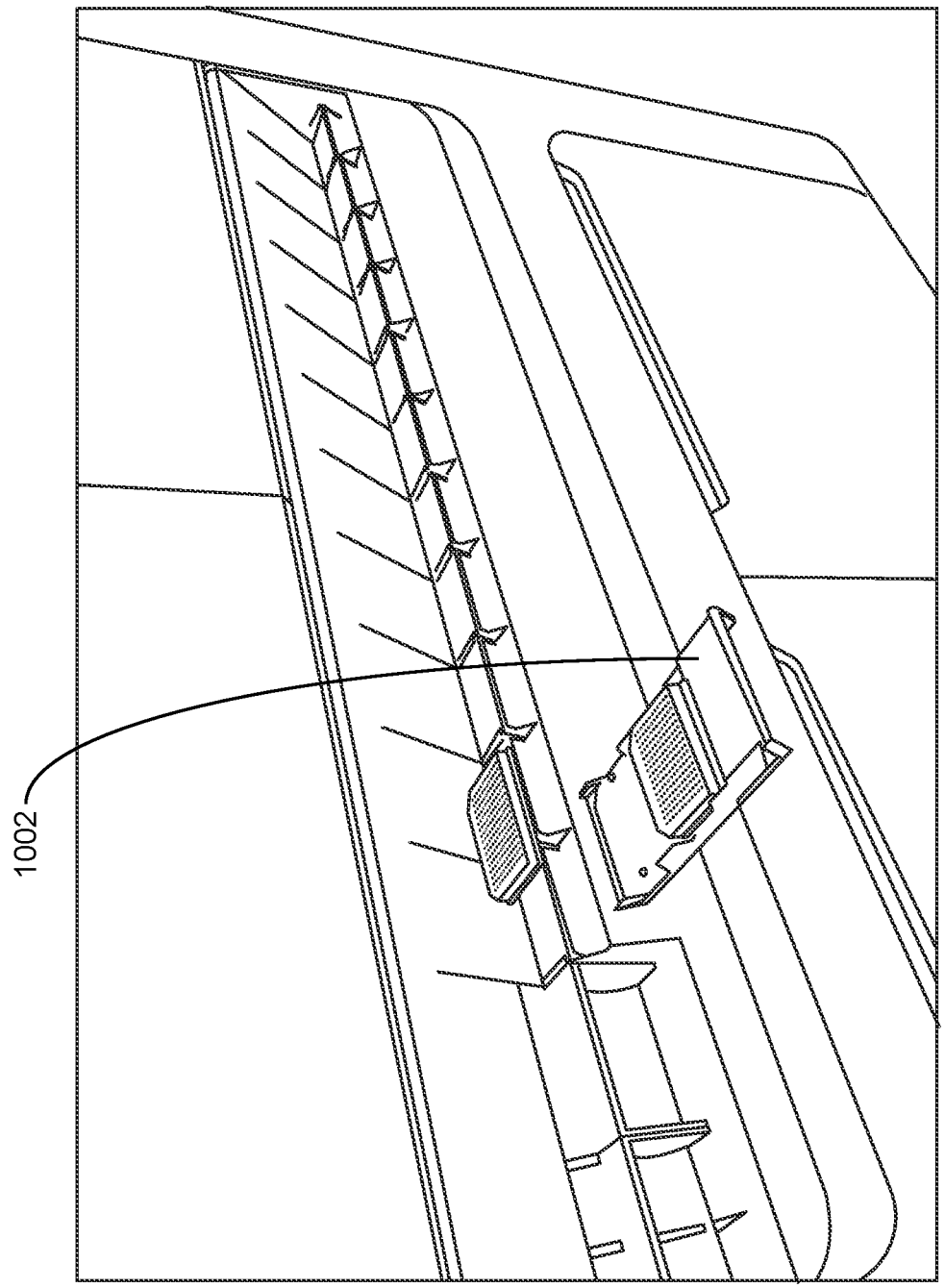
FIG. 11 shows an assay reagent loading area according to one embodiment.

External views of an assay reagent loading area according to one embodiment are illustrated in FIG. 10 and FIG. 11. In this example, assay reagent loading area 1000 includes 11 assay plate carriers, including assay reagent plate carrier 1002. FIG. 11 shows assay reagent plate carrier 1002 removed from the system and being loaded with assay reagent plates. In this example, the carrier holds two assay reagent plates that include lyophilized reagents for real-time nucleic acid amplification and detection. The two plates may include the same assay reagents, or the two plates may differ from each other with respect to the specific assay reagents that they contain. In this example, loading assay reagents into the system includes loading the assay reagent plate carrier with assay plates and inserting the carrier into an available position among the 11 positions.

Figure 12:
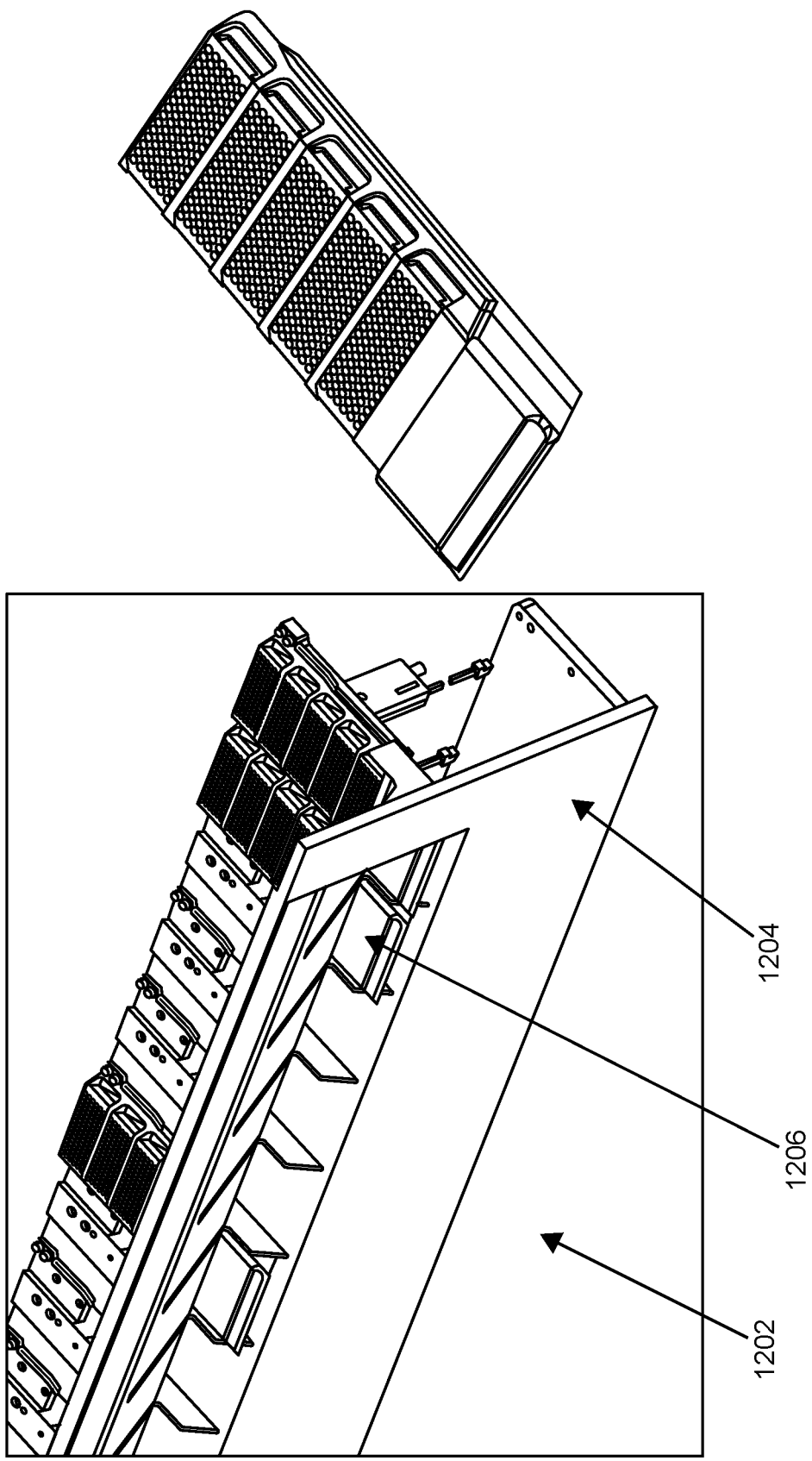
FIG. 12 shows an assay reagent loading area according to one embodiment.

An assay reagent loading area according to an embodiment of the present disclosure is illustrated in FIG. 12. As shown, assay reagent loading area 1202 includes panel 1204 having slots for loading assay reagent plate carriers (including assay reagent plate carrier 1206) into the system. As shown on the right, in this example, a plate carrier has 5 positions for assay reagent plates, each plate having 96 wells in 6×16 format.

In some embodiments, an assay reagent plate is provided in a sealed package (e.g., a hermetically sealed or substantially hermetically sealed package) that includes a desiccant material. The desiccant material may be provided in a packet within the assay reagent plate package. In some embodiments, a desiccant material packet is sized such that the base of one or more wells of the assay reagent plate may rest upon the desiccant material packet. Within the assay reagent plate package, the desiccant material packet may be provided beneath, on top of, etc. the assay reagent plate. In certain aspects, introducing the assay reagent plate into an assay reagent plate carrier includes removing the assay reagent plate and a desiccant packet from an assay reagent plate package, placing the desiccant packet in the assay reagent plate carrier, and then placing the assay reagent plate may rest above the desiccant packet. Such a desiccant packet and configuration thereof increases the length of time for which the assay reagents are usable by the system for performing assays. In certain aspects, the desiccant packet increases the usable lifespan of the reagents by 5 or more days, such as 6 or more, 7 or more, 8 or more, 9 or more, 10 or more, 11 or more, 12 or more, 13 or more, 14 or more, or 15 or more days, as compared to the usable lifespan of the reagents in the absence of the desiccant packet. The "on-board" stability of the assay reagents is therefore improved when such a desiccant is provided.

Figure 48:
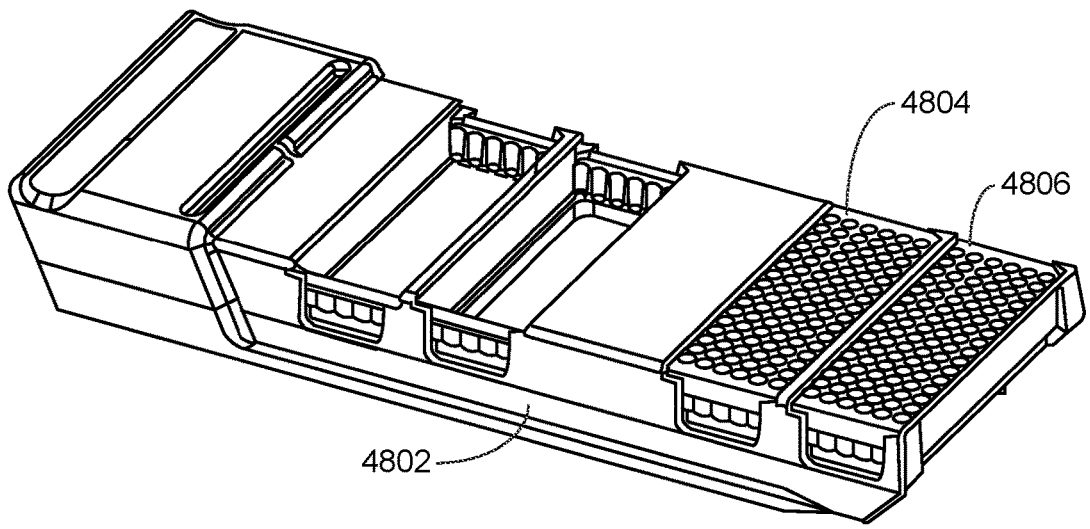
FIG. 48 shows an assay reagent plate carrier and assay reagent plates according to one embodiment.
Figure 49:
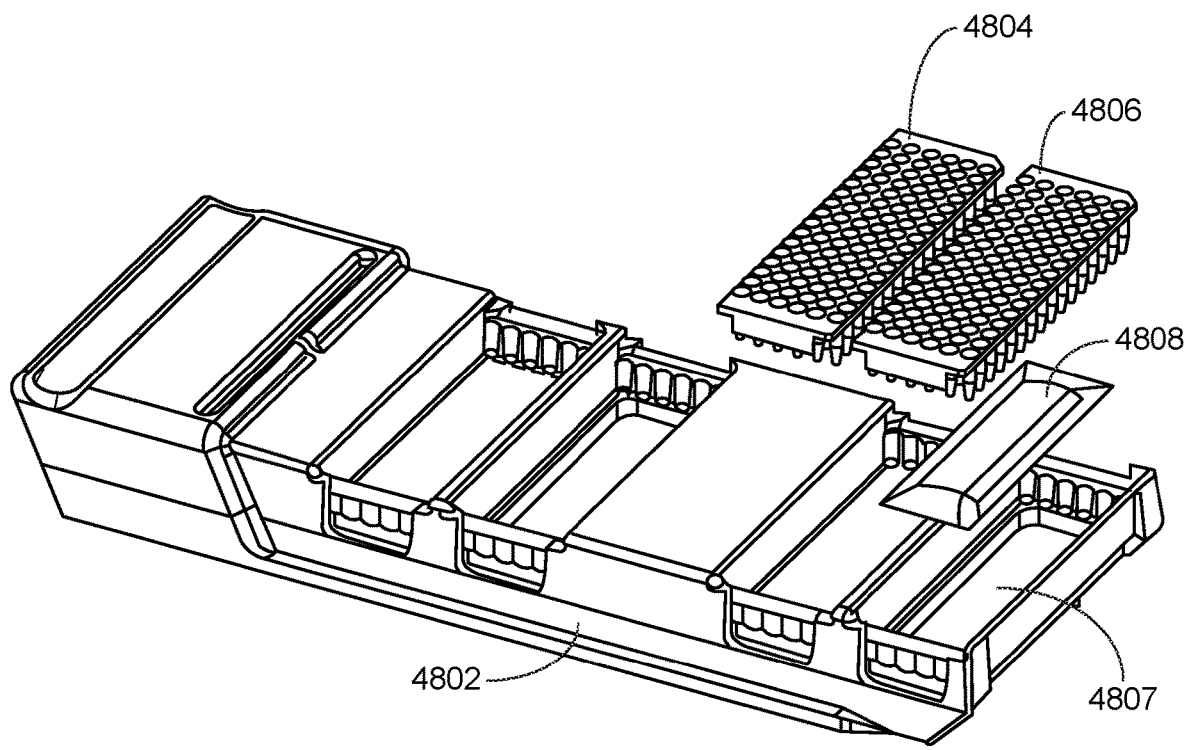
FIG. 49 shows an assay reagent plate carrier having an indentation for a desiccant packet for improved stability of assay reagents according to one embodiment.
Figure 50:
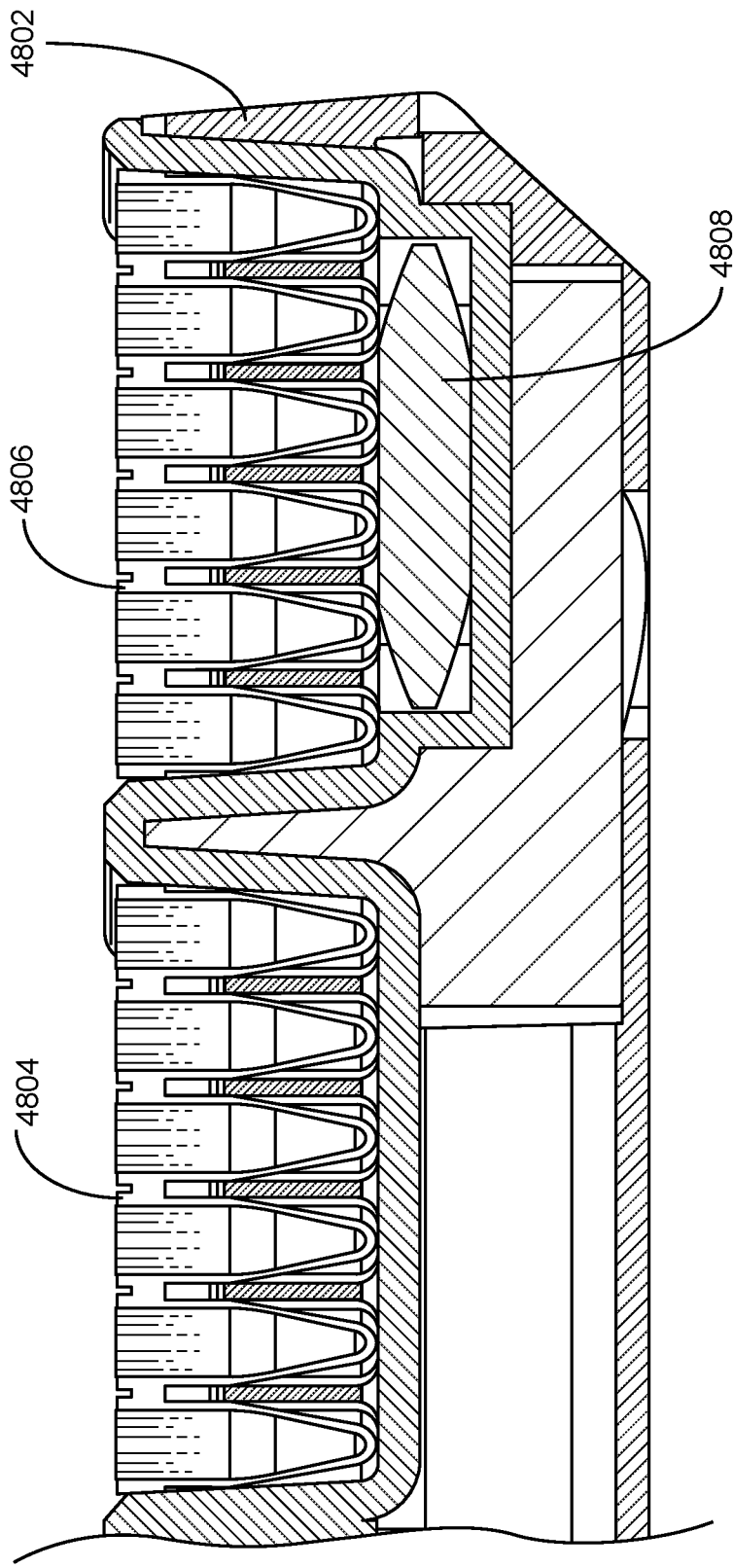
FIG. 50 shows a cross section view of an assay reagent plate carrier, desiccant packet indentation, desiccant packet, and assay reagent plate according to one embodiment.

FIG. 48 shows two assay reagent plates 4804 and 4806 present in respective assay reagent plate positions of assay reagent plate carrier 4802. Beneath each assay reagent plate is a desiccant packet (not shown) to increase the length of time for which the assay reagents are usable by the system for performing assays. The carrier may include an indentation sized to receive the desiccant packet above (e.g., upon) which its respective assay reagent plate rests. For example, shown in FIG. 49 is indentation 4807 sized to receive desiccant packet 4808, above (e.g., upon) which assay reagent plate 4806 rests when placed in its respective assay reagent plate position of assay reagent plate carrier 4802. FIG. 50 shows a cross section view of assay reagent plate carrier 4802 having an indentation sized to receive desiccant packet 4808 above (e.g., upon) which assay reagent plate 4806 rests when placed in its respective assay reagent plate position of the carrier.

Sample Processing (SP) Cartridge Loading Area

An automated sample analysis system of the present disclosure may employ sample processing (SP) cartridges to facilitate sample processing and, accordingly, may include an SP cartridge loading area.

Figure 13:
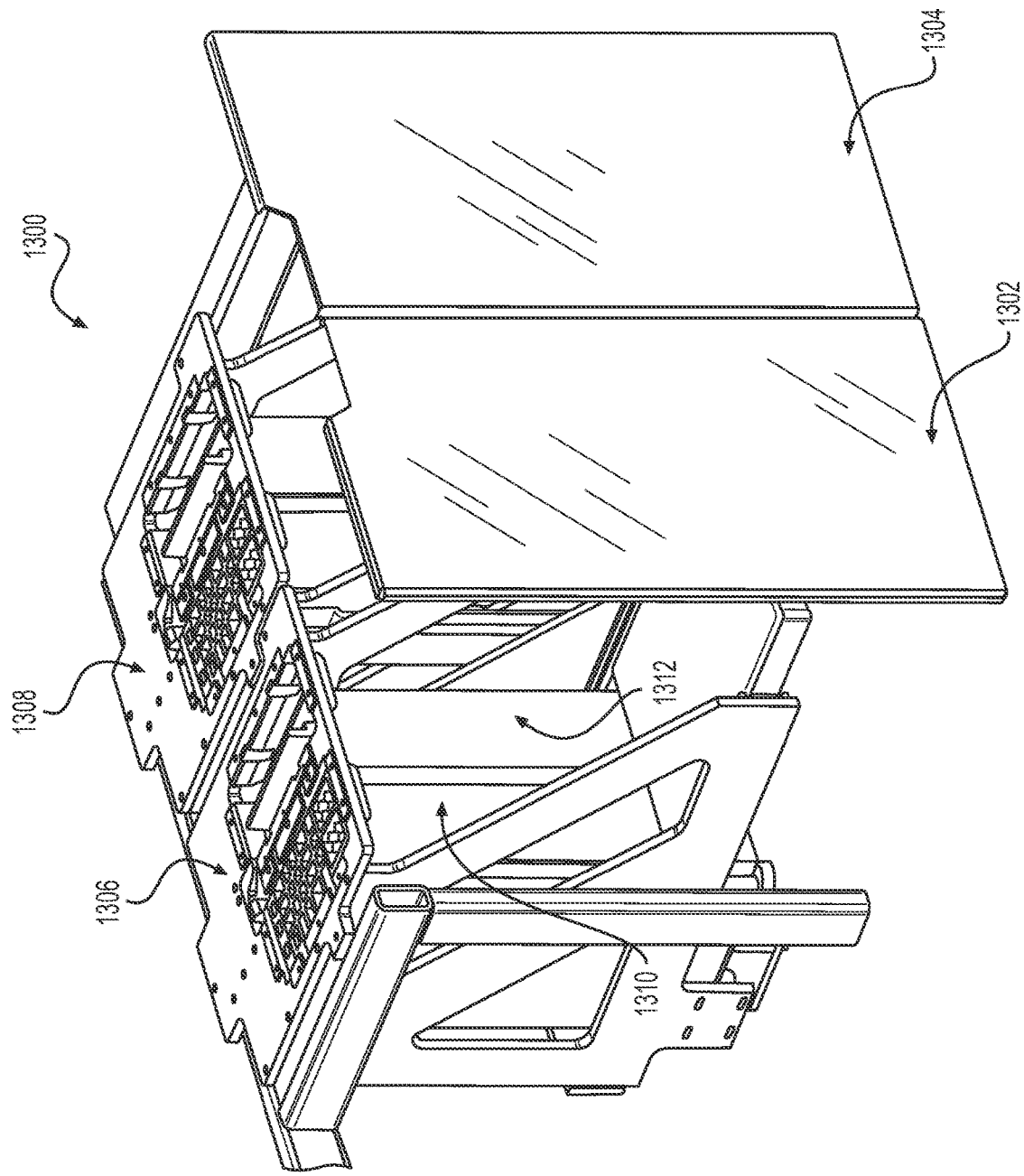
FIG. 13 shows a sample processing (SP) cartridge loading area according to one embodiment.
Figure 14:
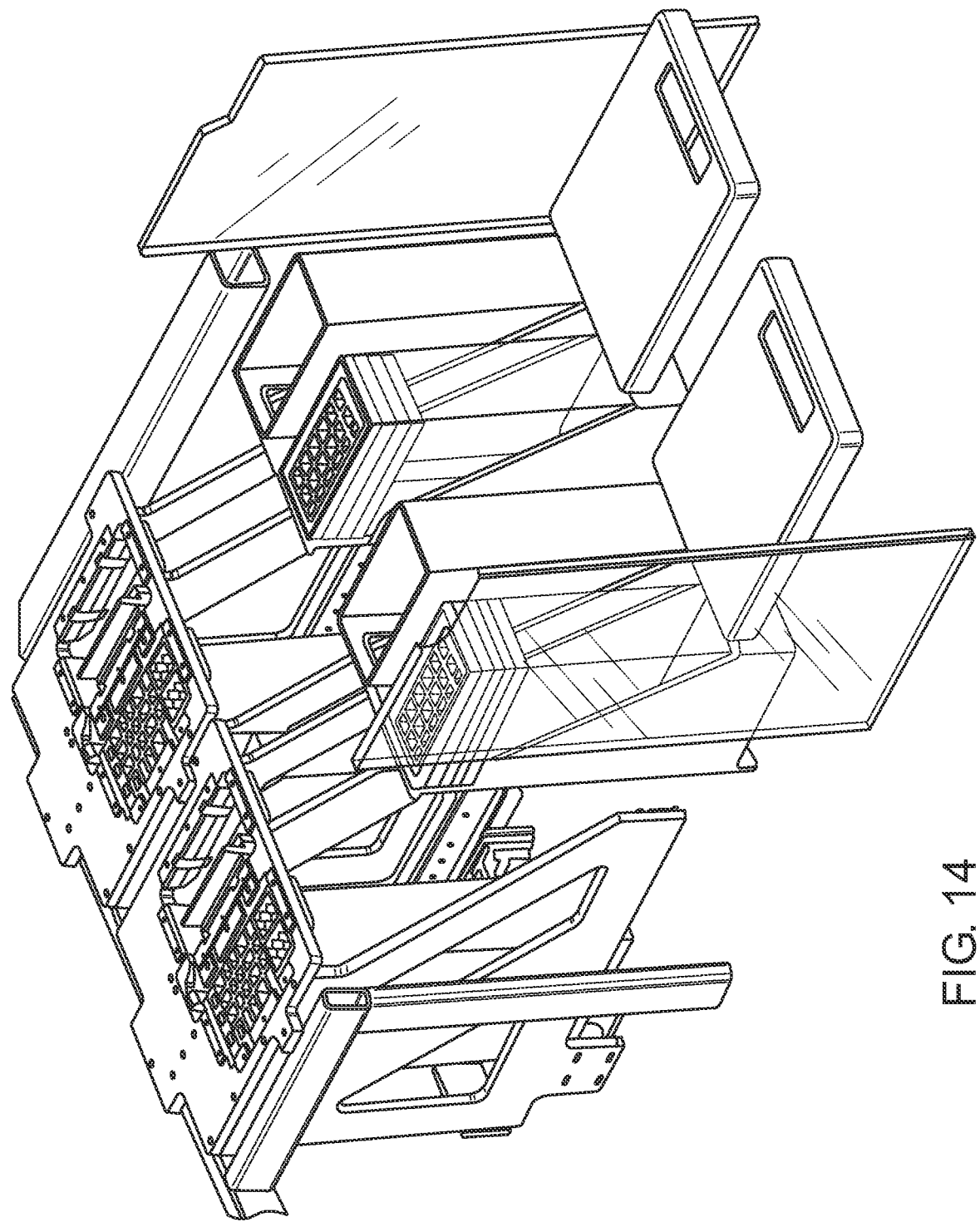
FIG. 14 shows the SP cartridge loading area of FIG. 13 with the doors open and SP cartridge storage units towards the front of the system to facilitate loading of the SP cartridge stacks by an operator of the system.
Figure 15:
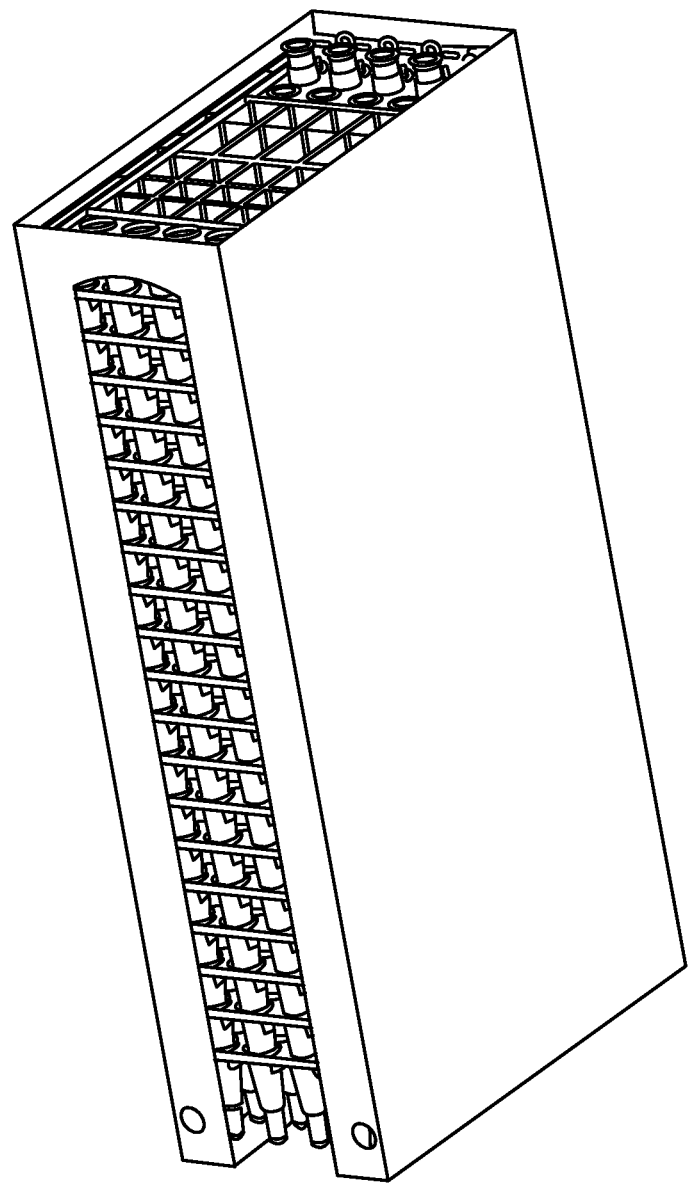
FIG. 15 shows a single stack of SP cartridges present in a sleeve.

An SP cartridge loading area according to one embodiment is illustrated in FIG. 13. Shown is SP cartridge loading area 1300 that includes doors 1302 and 1304 that provide the operator access to the internal portion of the loading area. In this example, the internal portion includes SP cartridge storage units 1306 and 1308 behind doors 1302 and 1304, respectively. In certain aspects, each storage unit includes one or more SP cartridge elevators. For example, as shown in FIG. 13, SP cartridge storage units 1306 and 1308 each include two SP cartridge elevators (see elevators 1310 and 1312 of storage unit 1306). The elevators are adapted to release SP cartridges at the top of the stack, one SP cartridge at a time, utilizing an upward force on the bottom of the stack. FIG. 14 shows the SP cartridge loading area of FIG. 13 with the doors open and SP cartridge storage units towards the front of the system to facilitate loading of the SP cartridge stacks by an operator of the system. FIG. 15 shows a single stack of SP cartridges present in a sleeve. In certain aspects, the operator removes a sleeve pull tab to expose the SP cartridge stack to the elevator. The number of SP cartridges in a stack/sleeve may vary. In certain aspects, each stack/sleeve has from 10 to 30 SP cartridges, e.g., 20 SP cartridges.

Figure 16:
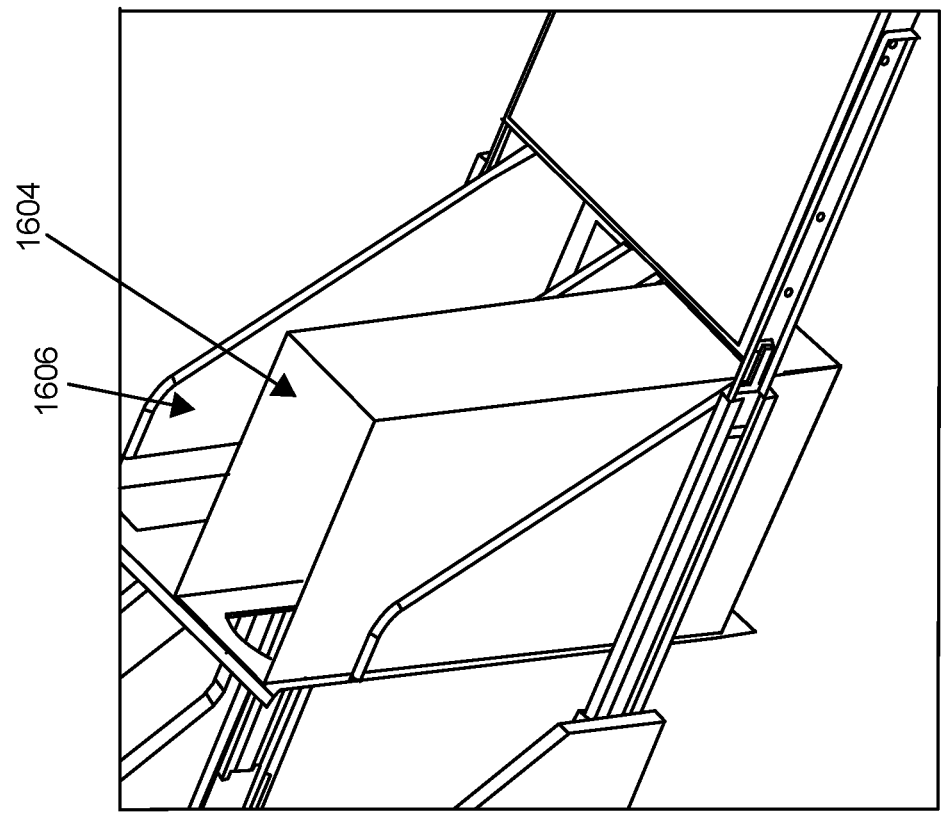
FIG. 16 shows an SP cartridge loading area according to one embodiment.
Figure 16:
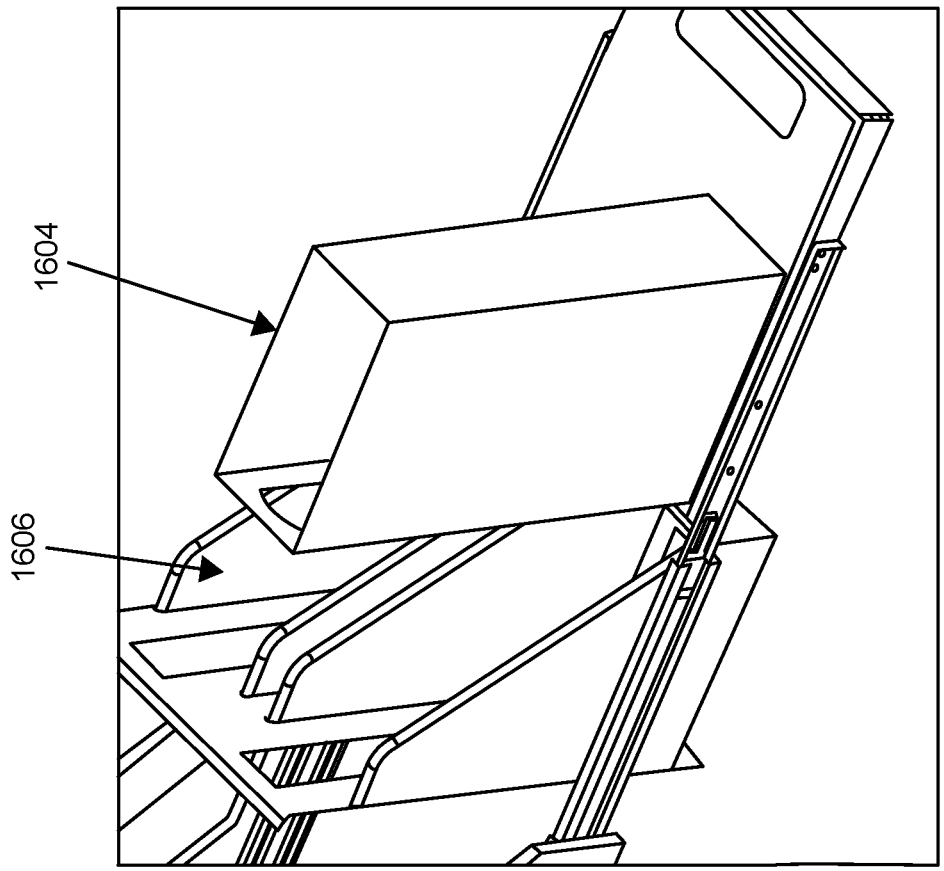

Illustrated in FIG. 16 is an SP cartridge loading area according to one embodiment in which SP cartridge sleeve 1604 is being loaded into an available position of SP cartridge storage unit 1606 (left panel) and in which SP cartridge sleeve 1604 has been loaded into the position of SP cartridge storage unit 1606 (right panel).

Figure 17:
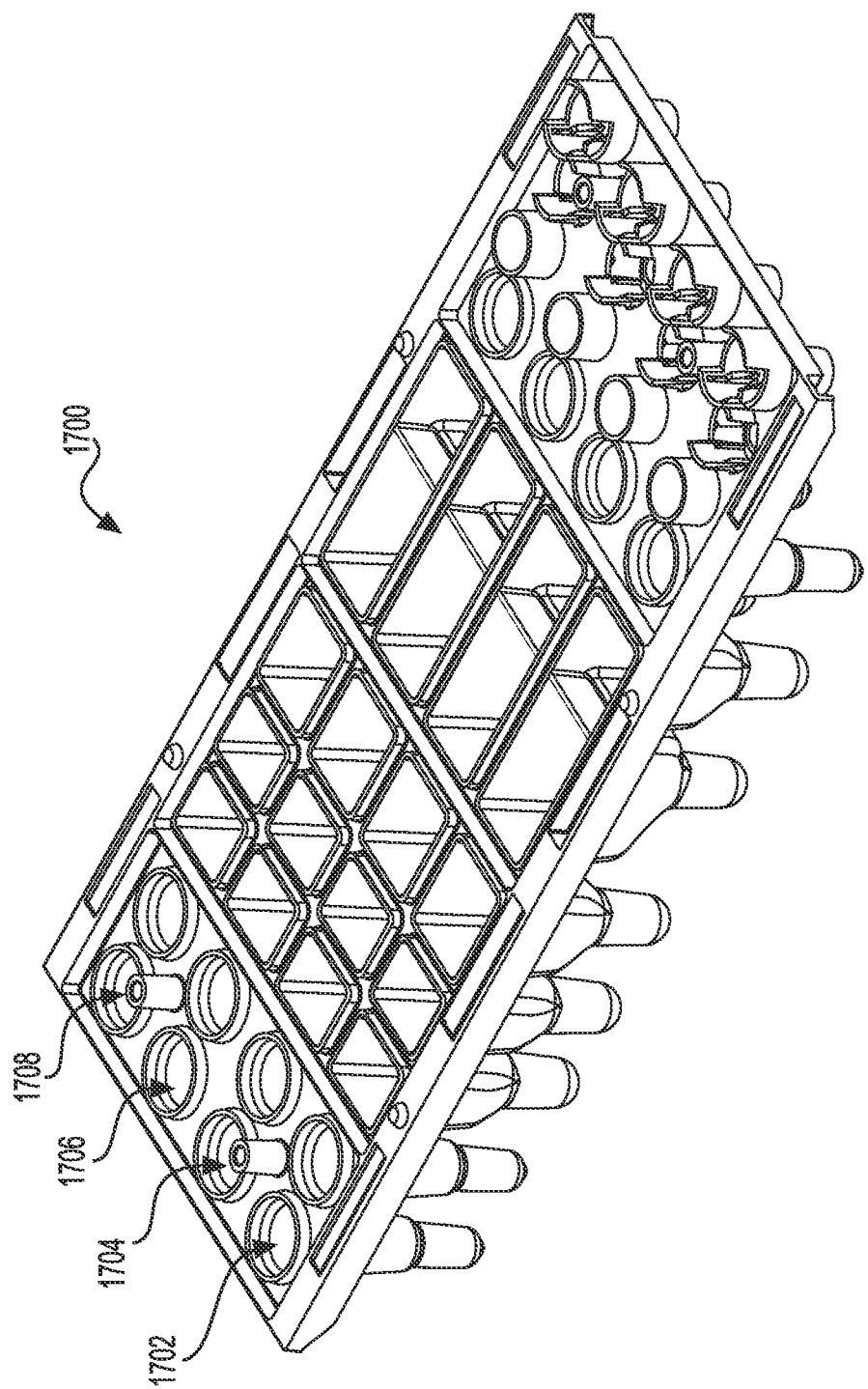
FIG. 17 shows an SP cartridge according to one embodiment.

FIG. 17 shows an SP cartridge according to one embodiment of the present disclosure. In this example, the SP cartridge 1700 has 4 lanes (lanes 1702-1708) of wells, where one sample can be processed per lane.

Figure 18:
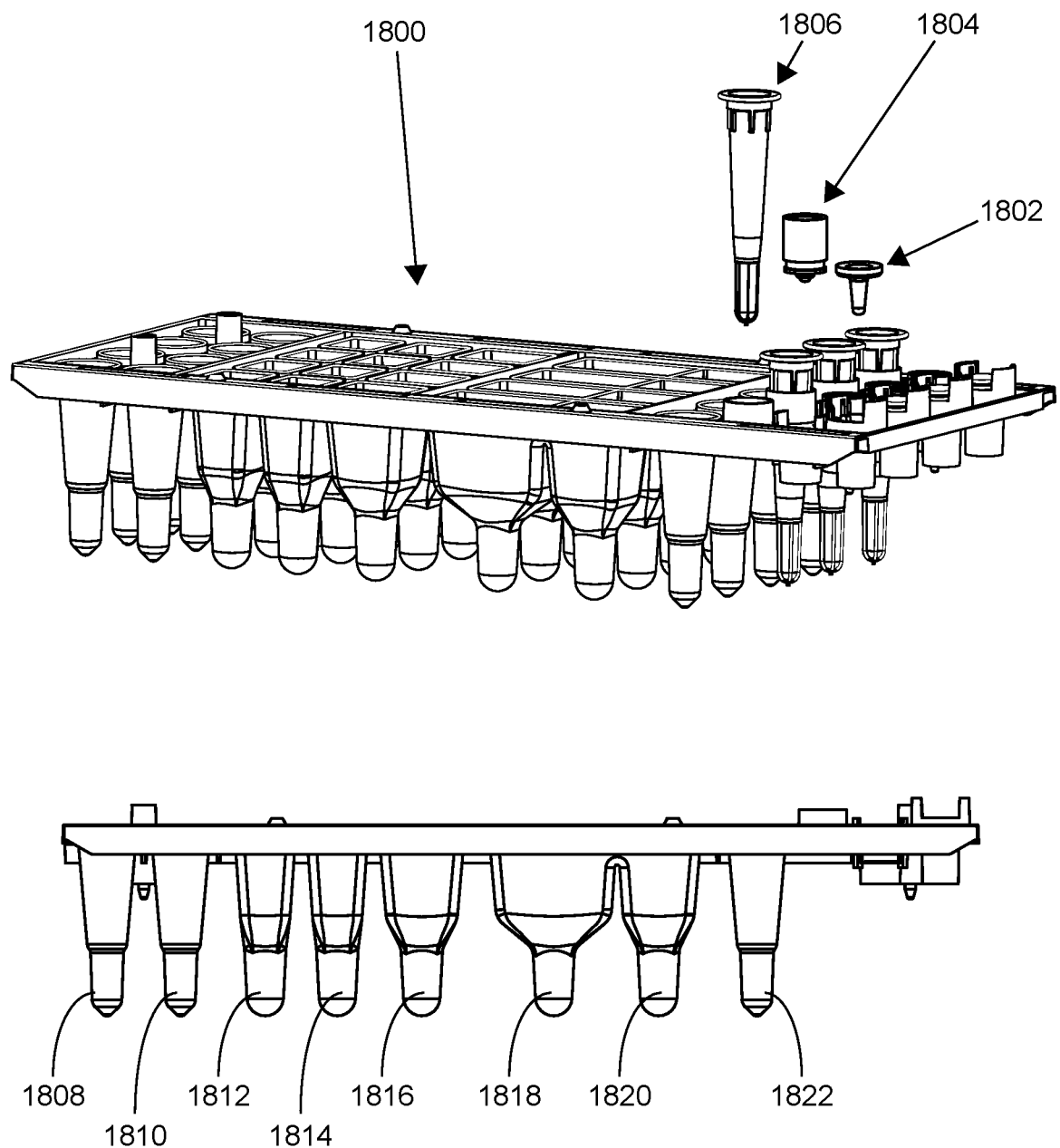
FIG. 18 shows an SP cartridge according to one embodiment.

A similar 4-lane SP cartridge is shown in FIG. 18. In this example, SP cartridge 1800 includes removable reaction vessel (RV) 1802, removable RV cap 1804, and removable plunger (1806) (top panel). As will be described in greater detail below, the plunger finds use in embodiments in which sample preparation involves magnetic particle-based capture of nucleic acids. The bottom panel shows a side view of SP cartridge 1800. Shown are wells 1808-1822. In this particular embodiment: well 1808 is an elution well; well 1810 is an auxiliary well and may be used to hold water for rehydration of lyophilized assay reagents; wells 1812-1816 are wash wells having a washing solution in which nucleic acids present on magnetic particles are washed; well 1818 is a lysis well having a lysis solution for lysing cells within the sample to release nucleic acids therein; well 1820 is a pretreatment well which may include a solution including a protease for pretreating a sample prior to lysis; and well 1822 is sized to hold a plunger that has already been used during the sample preparation process.

According to certain embodiments, the systems and methods of the present disclosure include and employ any of the SP cartridges described in No. 62/308,618, the disclosure of which is incorporated herein by reference in its entirety.

Figure 19:
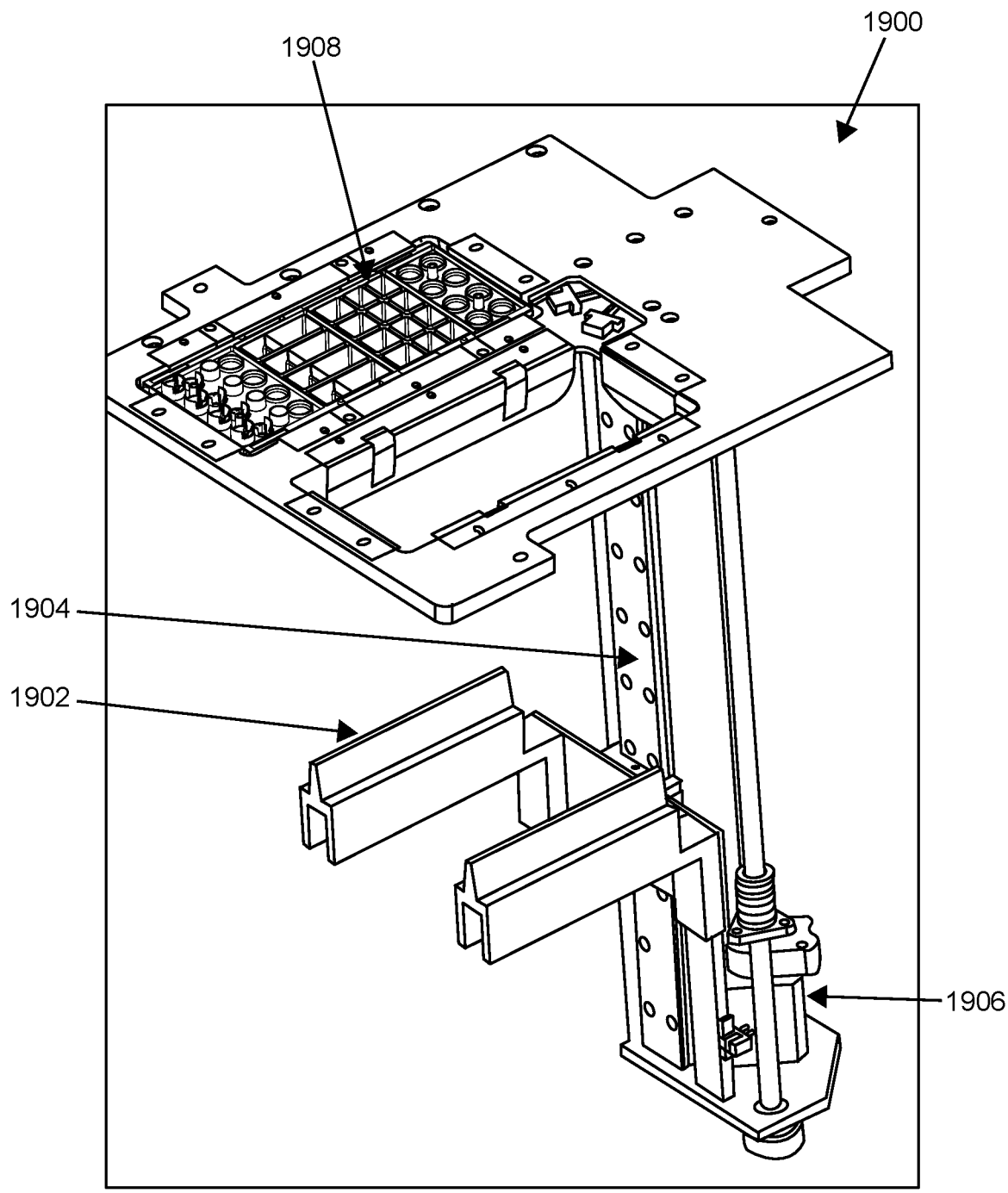
FIG. 19 shows certain components of an SP cartridge elevator according to one embodiment.

FIG. 19 shows certain components of an SP cartridge elevator according to one embodiment. SP cartridge elevator 1900 includes SP cartridge lift 1902 which moves along rail 1904 driven by motor 1906. As lift 1902 moves upward along rail 1904, the lift exerts an upward force on the bottom of an SP cartridge stack (not shown) to present an SP cartridge at the top of the stack (here, SP cartridge 1908) to a robotic SP cartridge handler of the system for subsequent transfer to one or more filling stations within the system.

Figure 20:
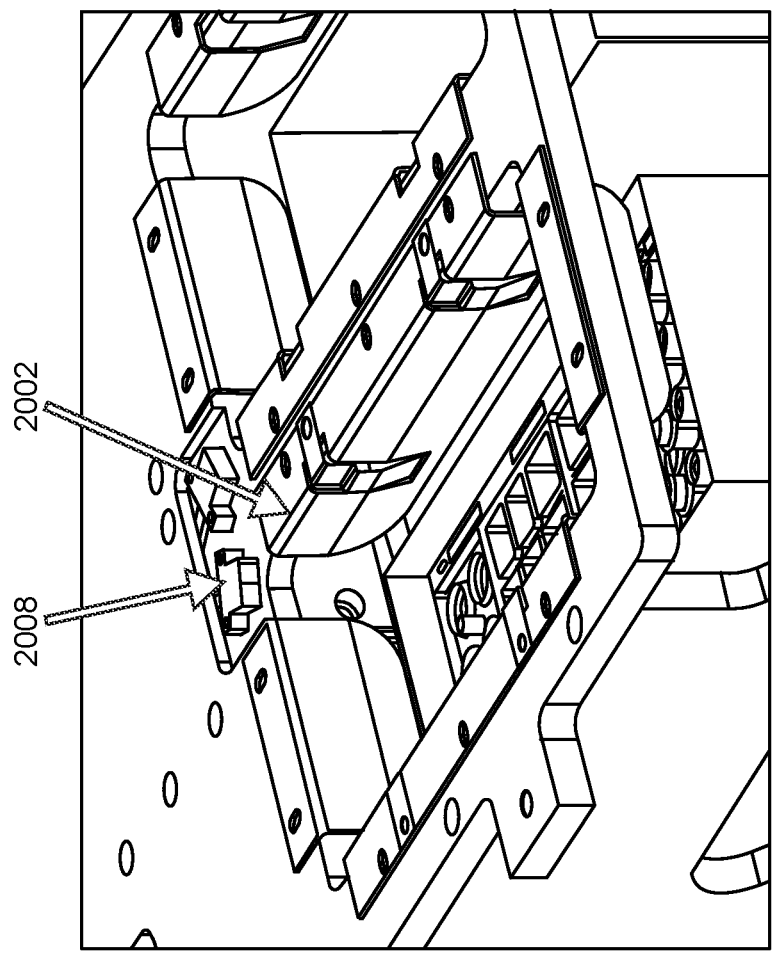
FIG. 20 shows an SP cartridge elevator having an alignment funnel according to one embodiment.
Figure 20:
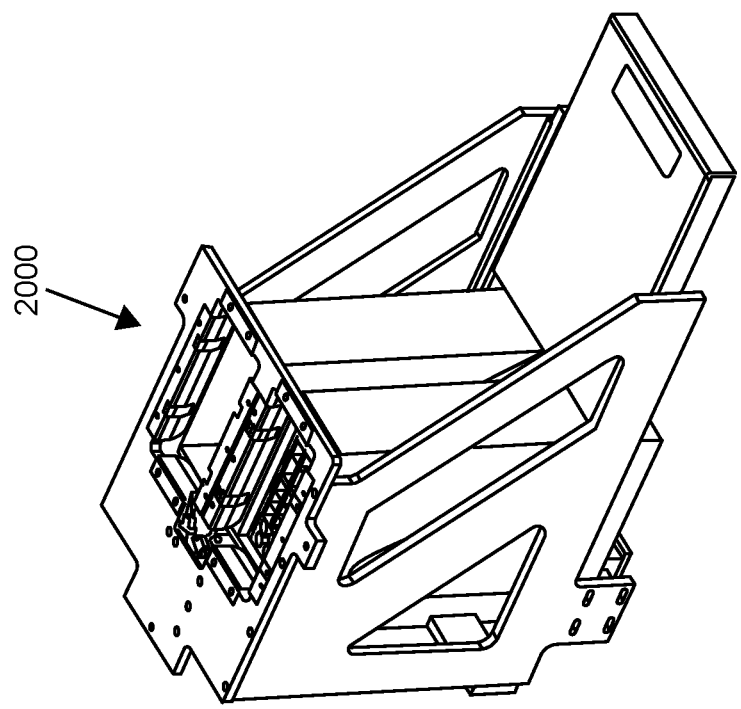
Figure 21:
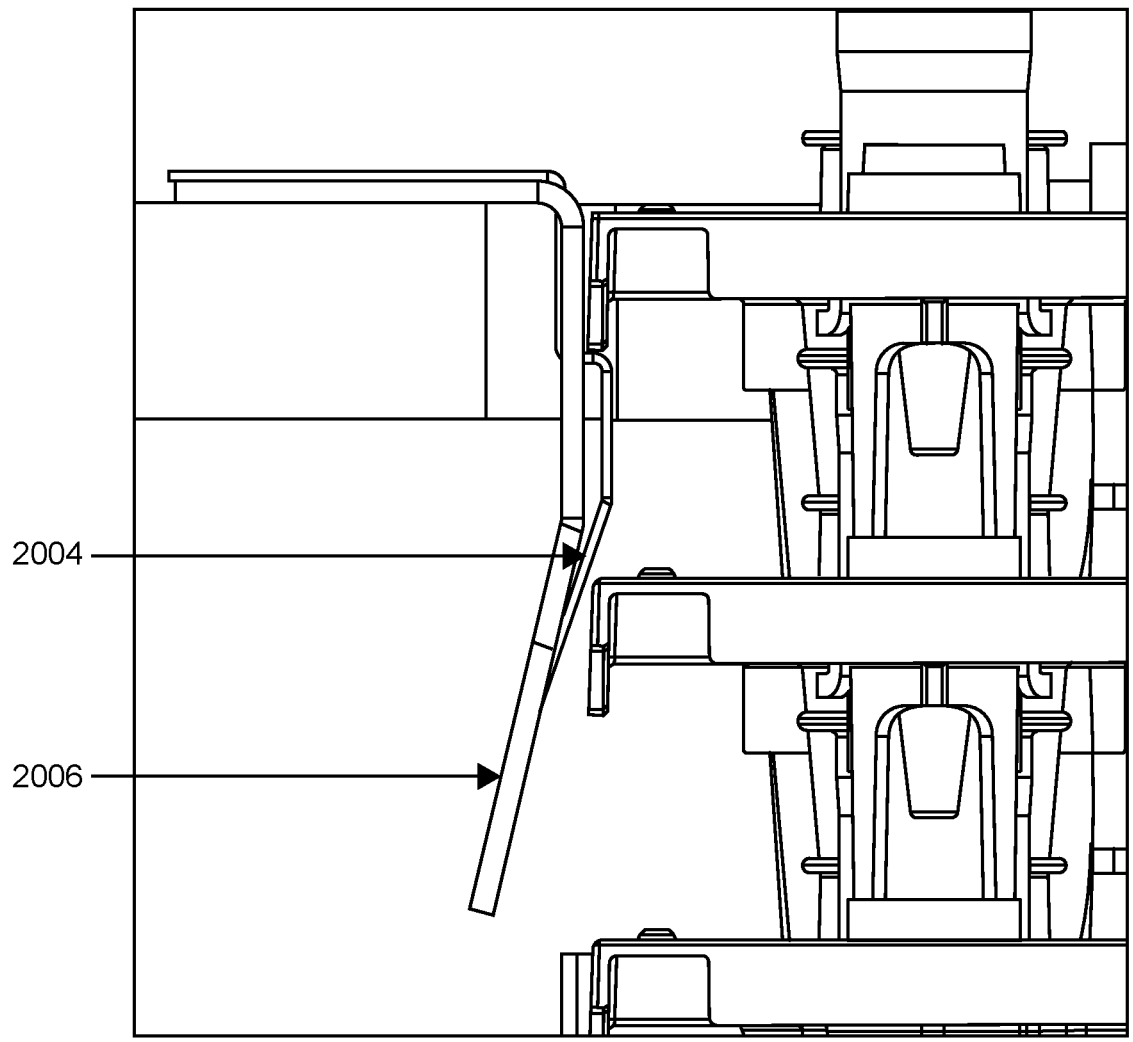
FIG. 21 shows a side view of the alignment funnel shown in FIG. 20.

FIG. 20 illustrates an SP cartridge loading area according to one embodiment. SP cartridge loading area 2000 includes two SP cartridge elevators. At the top of each elevator is an alignment funnel, e.g., alignment funnel 2002. As shown in FIG. 21, the alignment funnel may include anti-lift spring 2004 and SP cartridge funnel 2006. Funnel 2006 funnels SP cartridges toward anti-lift spring 2004 as the lift exerts an upward force on the bottom of the SP cartridge stack, which force is resisted by anti-lift spring up to a threshold. When an SP cartridge is pushed upward and beyond the anti-lift spring, the top SP cartridge of the stack is presented (made available) at a suitable alignment position for being engaged and transported by a robotic SP cartridge handler of the system.

An SP cartridge elevator of the present disclosure may include a sensor for sensing the presence of an SP cartridge at the top of the elevator. For example, top SP cartridge presence sensor 2008 in FIG. 20 is an optical sensor capable of determining the presence or absence of an SP cartridge at the top position of the elevator. When an SP cartridge is not detected at the top position, the system is capable instructing the robotic SP handler to begin retrieving SP cartridges from a different SP cartridge elevator. The system is also capable of notifying the operator that the SP elevator should be reloaded.

Bulk Fluid Storage Area

According to certain embodiments, an automated sample analysis system of the present disclosure includes a bulk fluid (or "bulk reagent") storage area. Bulk reagents are commonly used reagents that may be dispensed into a destination vessel (e.g., an SP cartridge) with a pump and nozzle and do not require special manipulation, e.g., resuspension of the container's contents. In certain aspects, bulk fluids/reagents include lysis buffer, alcohol (e.g., ethanol), nucleic acid wash solutions, molecular grade water, vapor barrier reagent(s), and/or the like.

In certain aspects, bulk reagents are stored in bottles in the bulk fluid storage area. Bulk reagent bottles may be sized to contain a desired volume of bulk reagents. For example, the bottles may be sized to contain from 500 ml to 1.5 L (e.g., 1 L) of bulk fluid.

According to certain embodiments, one or more bulk reagents are provided in bottles that include a keyed cap. The keyed cap may include a keying element with at least one annular ring protrusion. The one or more annular rings provide a specific configuration of rings and spaces defined by the rings. The specific configuration created by the one or more annular rings functions as a "key" that requires a corresponding configuration on a receiving device in the bulk reagent storage area, to enable the keying element on the cap to be received. For example, the corresponding keying element on the receiving device will be shaped and sized to properly align and receive the one or more annular rings of the keyed cap. For instance, the keying element on the receiving device may include one or more annular grooves or wells that are positioned appropriately to align with the one or more annular rings on the keyed cap. Furthermore, the keyed element on the receiving device may include one or more annular rings that are positioned appropriately to align with one more spaces on the keying element on the keyed cap that are defined by the one or more annular rings on the keyed cap. Further details regarding keyed caps useful for bulk reagent bottles and bulk reagent storage areas of the systems of the present disclosure may be found in U.S. Patent Application Publication No. 2014/0263316.

Figure 22:
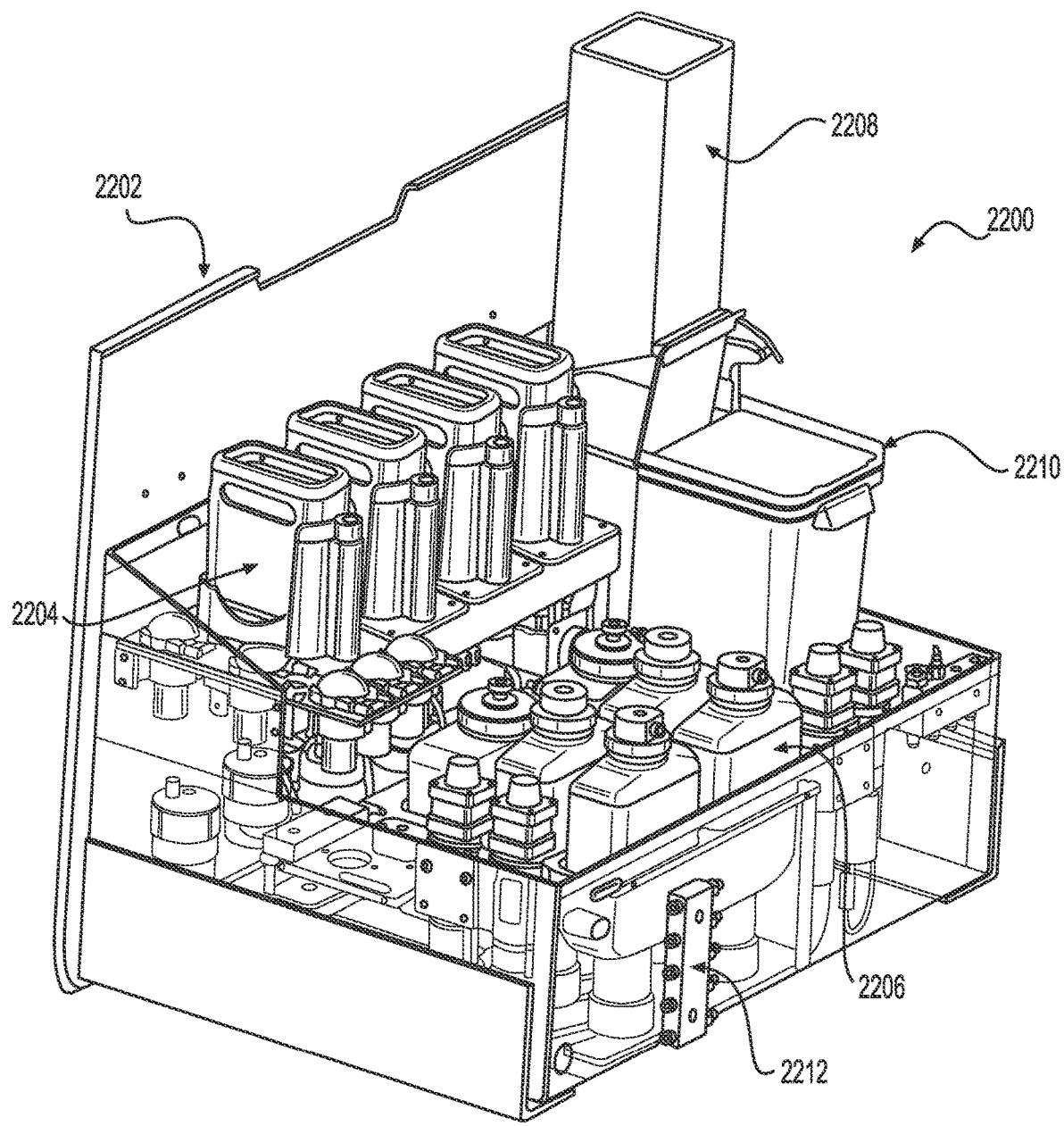
FIG. 22 shows a bulk reagent storage area according to one embodiment.

A bulk reagent storage area according to one embodiment is illustrated in FIG. 22. In this example, bulk reagent storage area 2200 is a drawer having front cover 2202 and an internal storage area for storing bulk reagent contained within bottles (e.g., bottles 2204 and 2206). Also included in this example is solid waste chute 2208 and solid waste container 2210. The system may be adapted to dispose of used pipette tips, used reaction vessels, and/or the like, into the solid waste container via the solid waste chute. In this example, the bulk reagent storage area includes fluidic interface 2212 that interfaces (e.g., via hoses) with a bulk fluid dispense station that dispenses bulk fluids into the appropriate wells of SP cartridges.

Figure 23:
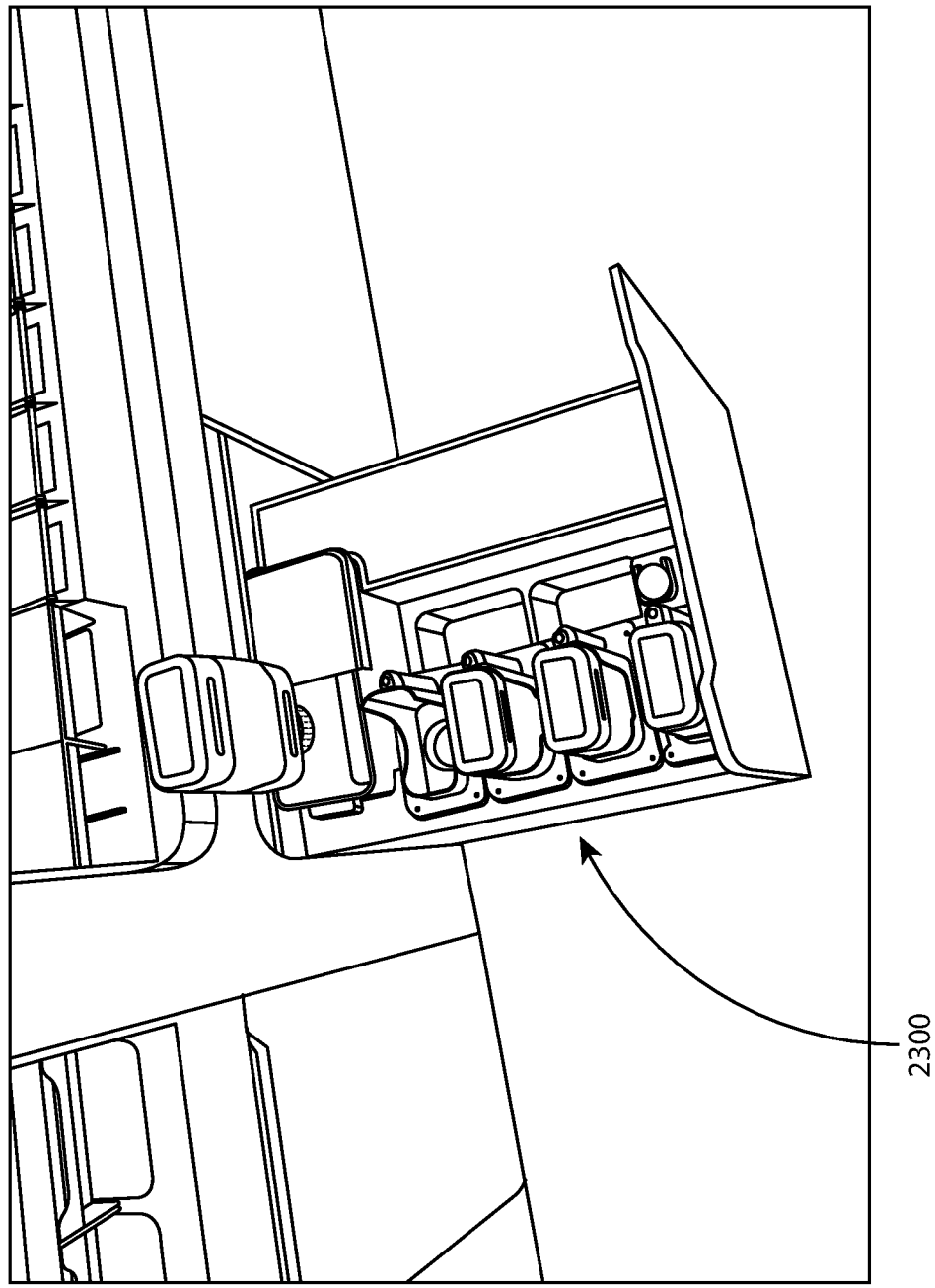
FIG. 23 shows a bulk reagent storage area according to one embodiment.

FIG. 23 shows a bulk reagent storage area according to one embodiment. Shown here is bulk reagent storage area 2300 which is a drawer having an internal compartment for loading/storing bulk reagent bottles in an inverted orientation. In this example, the drawer has four positions each designed to specifically mate with a bulk reagent bottle having a keyed cap (not shown) as described above. The keyed caps reduce the opportunity for human error. For example, lysis buffer cannot be loaded into the wash buffer slot due to lack of complementarity between the keyed cap of the lysis buffer bottle and the cap receiving portion of wash buffer slot.

The bulk reagent storage area may include one or more reservoirs in fluid communication with one or more bulk reagent bottles. For example, when a bulk reagent bottle is loaded into the bulk reagent storage area, the liquid contents of the bottle may empty into a reservoir, enabling an operator of the system to remove the bottle (and replace the bottle with a new (filled) reagent bottle, if desired) at any convenient time during continuous operation of the system.

SP Cartridge Transport and SP Cartridge Filling Stations

In certain aspects, the systems of the present disclosure carry out sample preparation in SP cartridges present at one or more positions of a sample preparation station. The SP cartridges may be transported and placed at the positions of the sample preparation station having already been filled with the reagents and samples necessary for the sample preparation process.

Figure 24:
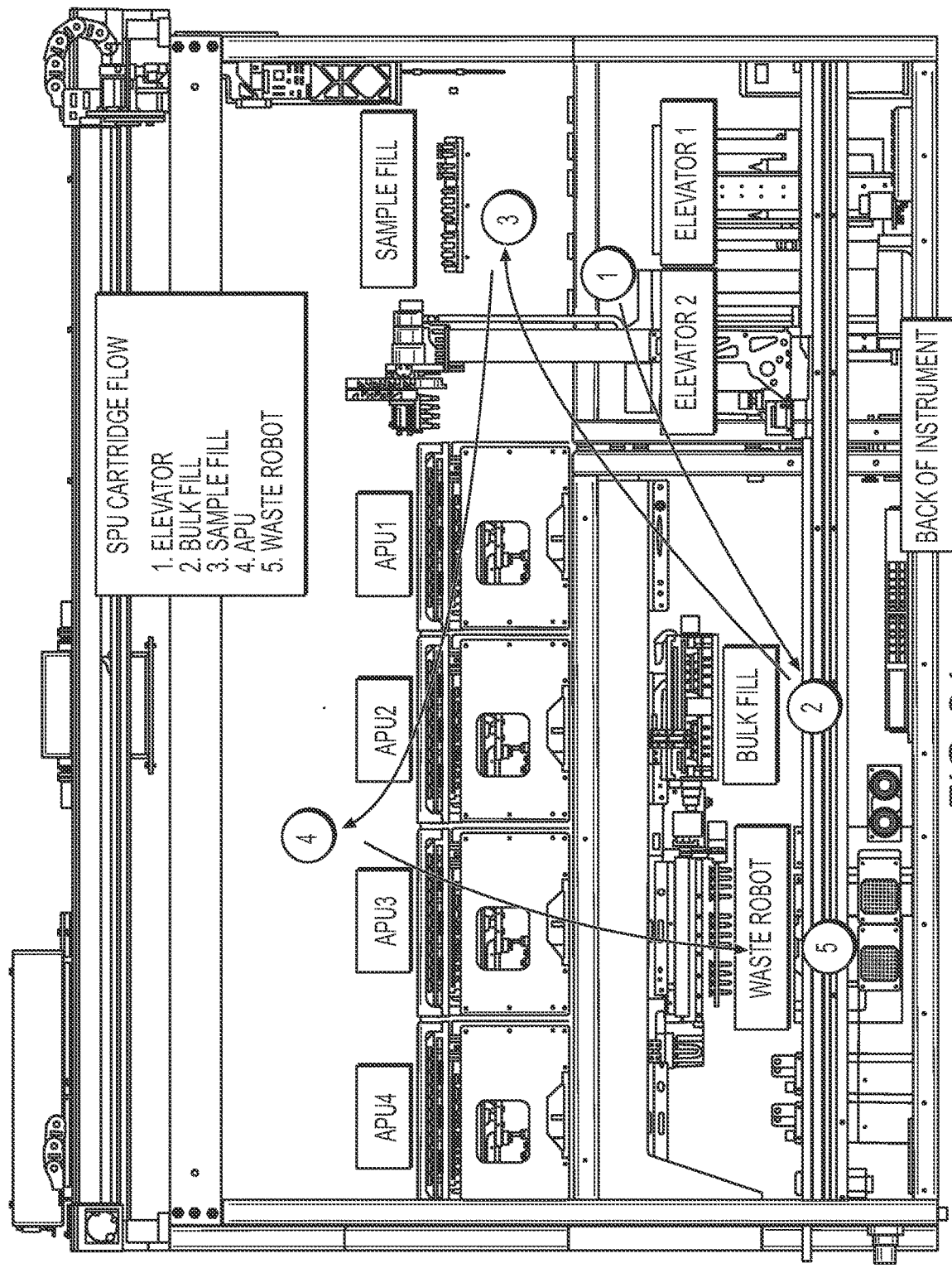
FIG. 24 shows an SP cartridge work flow according to one embodiment.

Any suitable approach for filling the SP cartridges prior to sample preparation may be employed. According to certain embodiments, SP cartridges are subjected to an SP cartridge workflow as shown in FIG. 24. In this example, an SP cartridge is picked up from the top of an SP cartridge elevator at the SP cartridge loading area (labeled "1" in FIG. 24) by a robotic SP cartridge handler (not shown), and transported by the handler to one of two or more positions of an SP cartridge bulk reagent filling station (labeled "2" in FIG. 24). After bulk reagents are dispensed into the appropriate wells of SP cartridges at the SP cartridge bulk reagent filling station, the robotic SP cartridge handler transports SP cartridges to one of two or more positions of an SP cartridge sample filling station (labeled "3" in FIG. 24). After samples (and optionally, additional reagents) are dispensed into the appropriate wells of SP cartridges at the SP cartridge sample filling station, the robotic SP cartridge handler transports SP cartridges to one of two or more positions of a sample preparation station (labeled "4" in FIG. 24) where sample preparation (e.g., nucleic acid isolation and purification) occurs. The system may include an SP cartridge waste robot that picks up SP cartridges upon completion of sample processing and discards the used SP cartridges in an SP cartridge waste container.

A robotic SP cartridge handler of the present disclosure may have a variety of functions including retrieving SP cartridges from: an elevator at the SP cartridge loading area, a bulk filling station, a sample filling station and a sample processing station. The robotic SP cartridge handler may also function to distribute SP cartridges to: a bulk filling station, a sample filling station, a sample processing station, and a waste robot 5. The robotic SP cartridge handler may be designed to permit the robotic pipetting device to work in an adjacent sample preparation unit without interference, provide information to the system indicating whether it has an SPU cartridge, determine the presence or absence of an SPU cartridge at any location, and/or the like.

Figure 25:
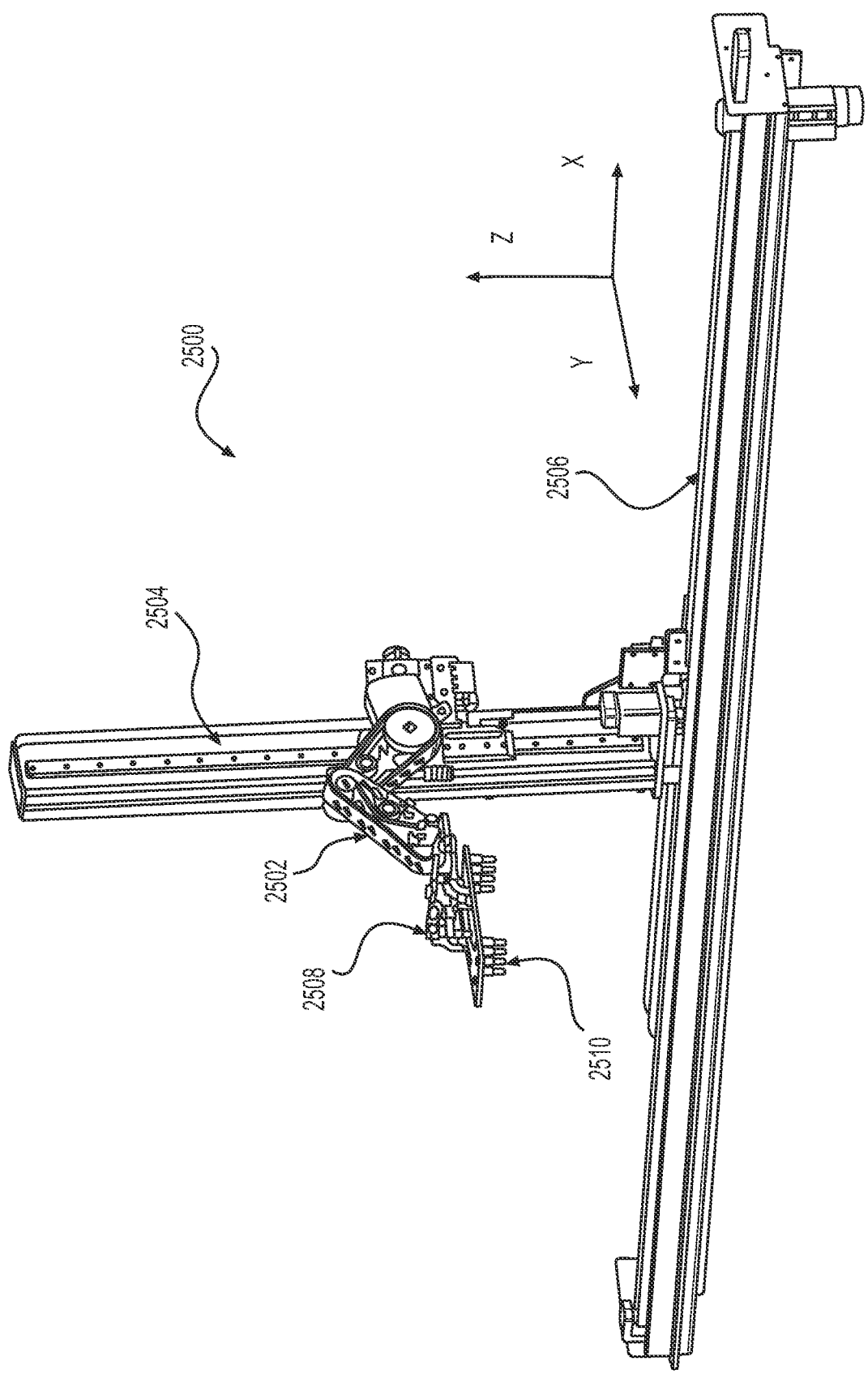
FIG. 25 shows a robotic SP cartridge handler according to one embodiment.

A robotic SP cartridge handler according to one embodiment of the present disclosure is illustrated in FIG. 25. Robotic SP cartridge handler 2500 is capable of moving in the X, Y and Z directions. Dual link arm 2502 permits movement in the Y axis. Movement along rails 2504 and 2506 enables movement in the Z and X axes, respectively. SP cartridge handler 2500 includes SP cartridge gripper 2508 for gripping SP cartridge 2510.

Figure 26:
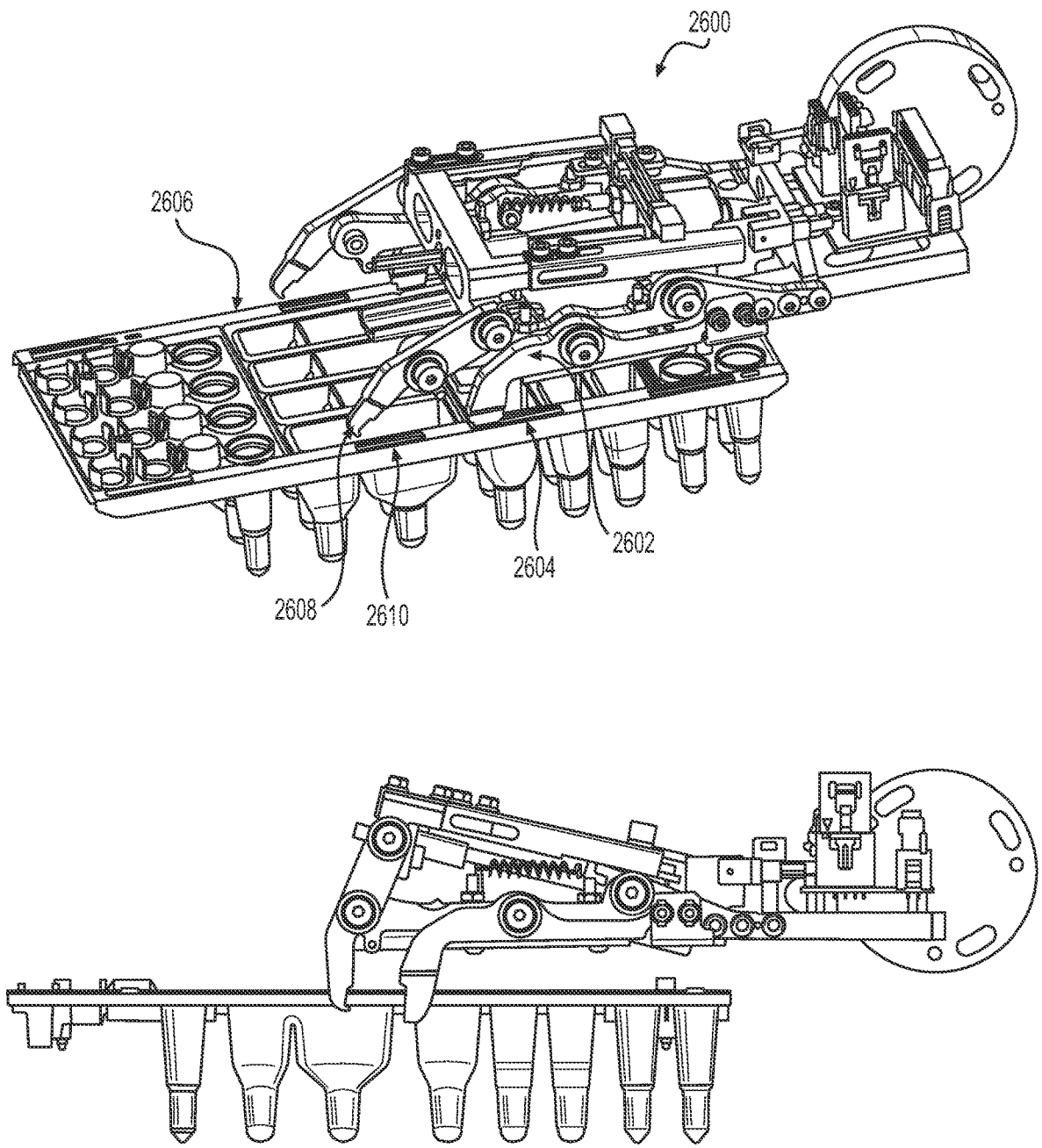
FIG. 26 shows an SP cartridge gripper of a robotic SP cartridge handler according to one embodiment.

A more detailed view of an SP cartridge gripper of a robotic SP cartridge handler is shown in FIG. 26. SP cartridge gripper 2600 includes two passive fingers (including passive finger 2602) which are inserted into corresponding slots (including slot 2604) of SP cartridge 2606 by moving down and then forward to engage the passive fingers with the cartridge. Then, two active fingers (including active finger 2608) are flexed/gripped for insertion of the active fingers into corresponding slots (including slot 2610) of SP cartridge 2606. To complete the grip, the active fingers are driven towards the passive fingers. Shown in the bottom panel of FIG. 26 is a side view of SP cartridge gripper 2600 and SP cartridge 2606, in which passive finger 2602 and active finger 2608 are inserted into corresponding slots of SP cartridge 2606 for gripping the cartridge to enable picking up and transporting the SP cartridge to a desired position within the system. Releasing the SP cartridge at a desired position within the system can be carried out by ungripping the active finger and removing the active and passive fingers from the corresponding slots of the SP cartridge. The robotic SP cartridge handler may include one or more optical sensors for, e.g., home position, cartridge presence, and/or the like.

When the system includes a bulk reagent filling station, such a filling station includes one or more (e.g., 2 or more) SP cartridge bulk reagent filling positions. The bulk reagent filling station is in fluid communication with the bulk reagent storage area and dispenses into the appropriate wells of SP cartridges bulk reagents that are utilized during the sample preparation process, e.g., one or more of molecular grade water, ethanol, lysis reagent, wash reagent, vapor barrier liquid (e.g., an oil), and/or the like.

Figure 27:
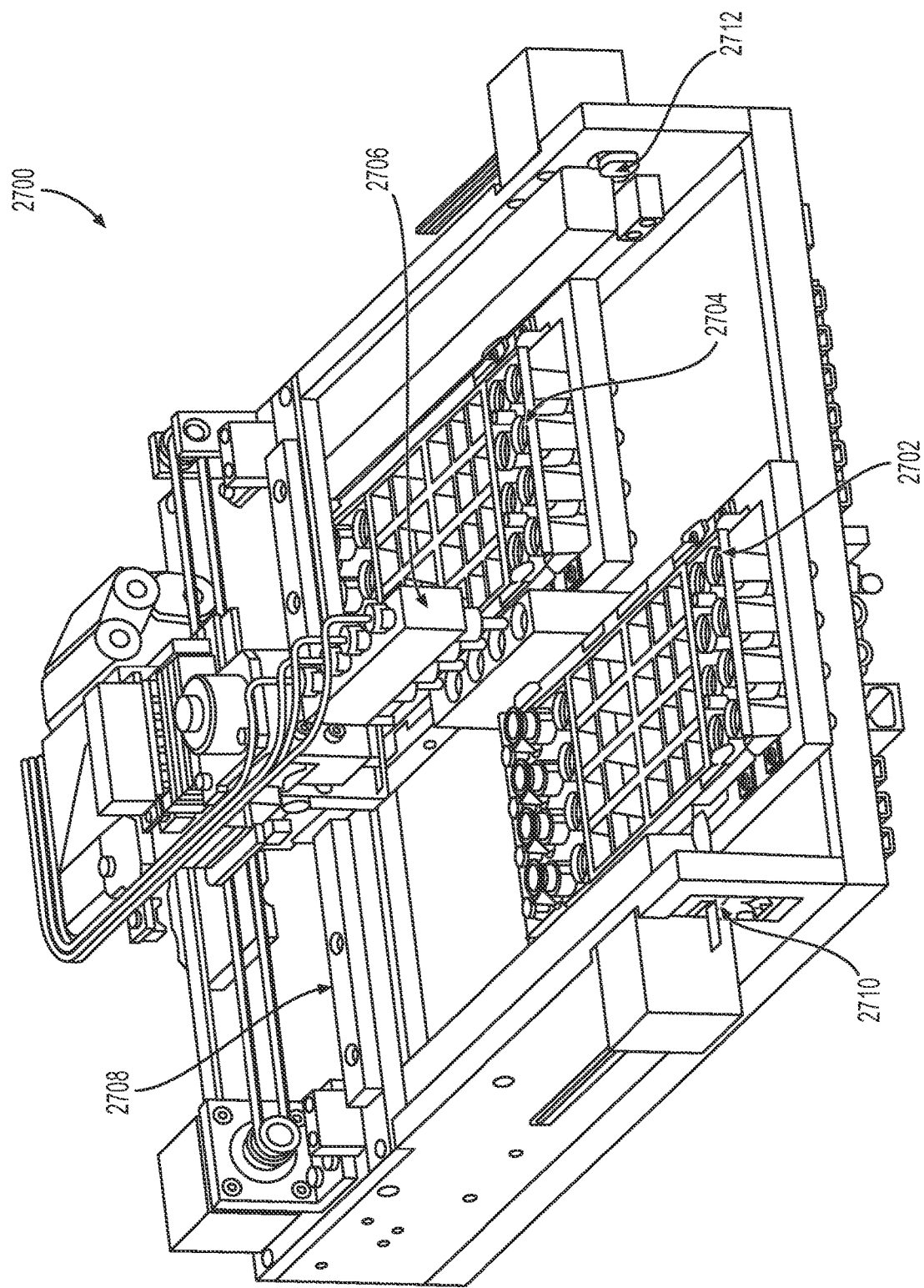
FIG. 27 shows a bulk reagent filling station according to one embodiment.

A bulk reagent filling station according to one embodiment is shown in FIG. 27. In this example, bulk reagent filling station 2700 includes two SP cartridge bulk reagent filling positions. Shown in FIG. 27 are SP cartridges 2702 and 2704. The station includes bulk reagent dispense head 2706 which can travel along rail 2708 so as to be positioned to dispense bulk reagents into the appropriate wells of the SP cartridges. The station includes optical sensors 2710 and 2712 for detecting the presence and/or position of SP cartridges at the station.

The system may include an SP cartridge sample filling station. Such a station may include one or more (e.g., 2 or more) SP cartridge sample filling positions. For sample filling, the robotic pipettor aspirates samples from sample tubes present at the internal portion of sample loading area, is transported to the sample filling station, and dispenses samples into the appropriate wells of SP cartridges present at the one or more SP cartridge sample filling positions of the sample filling station.

According to certain aspects, the methods of the present disclosure include transporting an SP cartridge from the SP cartridge loading area to one of two or more positions of the SP cartridge bulk reagent filling station. In certain aspects, the methods include transporting an SP cartridge from the SP cartridge bulk reagent filling station to one of two or more positions of the SP cartridge sample filling station. The methods may include transporting an SP cartridge from the SP cartridge sample filling station to one of two or more sample preparation positions of the sample preparation station. Any (e.g., each) of the above transporting steps may be performed by the robotic SP cartridge handler.

Sample Preparation Station

The automated analysis systems of the present disclosure include a sample preparation station. The sample preparation may include one or more (e.g., 2 or more) SP cartridge sample preparation positions. SP cartridges are transported to the one or more SP cartridge sample preparation positions by the robotic SP cartridge handler. The SP cartridges transported to the sample preparation positions include samples, and also may include most if not all of the reagents necessary for the sample preparation process. According to certain embodiments, the SP cartridges utilized by the sample preparation station is similar or the same as the SP cartridges shown in FIG. 18. That is, the SP cartridge may be a four channel cartridge which holds reagents needed for processing patient samples to purify nucleic acids. In addition, the cartridge stores a mixing plunger, reaction vessel (RV) and RV cap for each sample purified. In certain aspects, the RV and RV cap are as described in No. 62/308,620, the disclosure of which is incorporated herein by reference in its entirety. The cartridge is designed to mate with a sample processing position of the station, which station has the necessary hardware to make use of the mixing plunger and purify nucleic acid from sample using magnetic particle manipulation. The onboard storage of the plunger, RV and RV cap permits simultaneous delivery of all materials needed to extract nucleic acid and perform amplification and detection to the sample preparation station, e.g., using a single robotic motion.

The plunger may have a shape that almost entirely fills the volume of the bottom portion of all the wells. This forces the fluid in the wells to be driven up and down with a range large enough to mix the reagents adequately. The tip of the plunger may be fluted in order to provide enough space to ensure the fluid can easily flow up when the plunger is submerged in the liquid during the mixing. According to certain embodiments, the plunger is a plunger as described in No. 62/308,645, the disclosure of which is incorporated herein by reference in its entirety.

Figure 28:
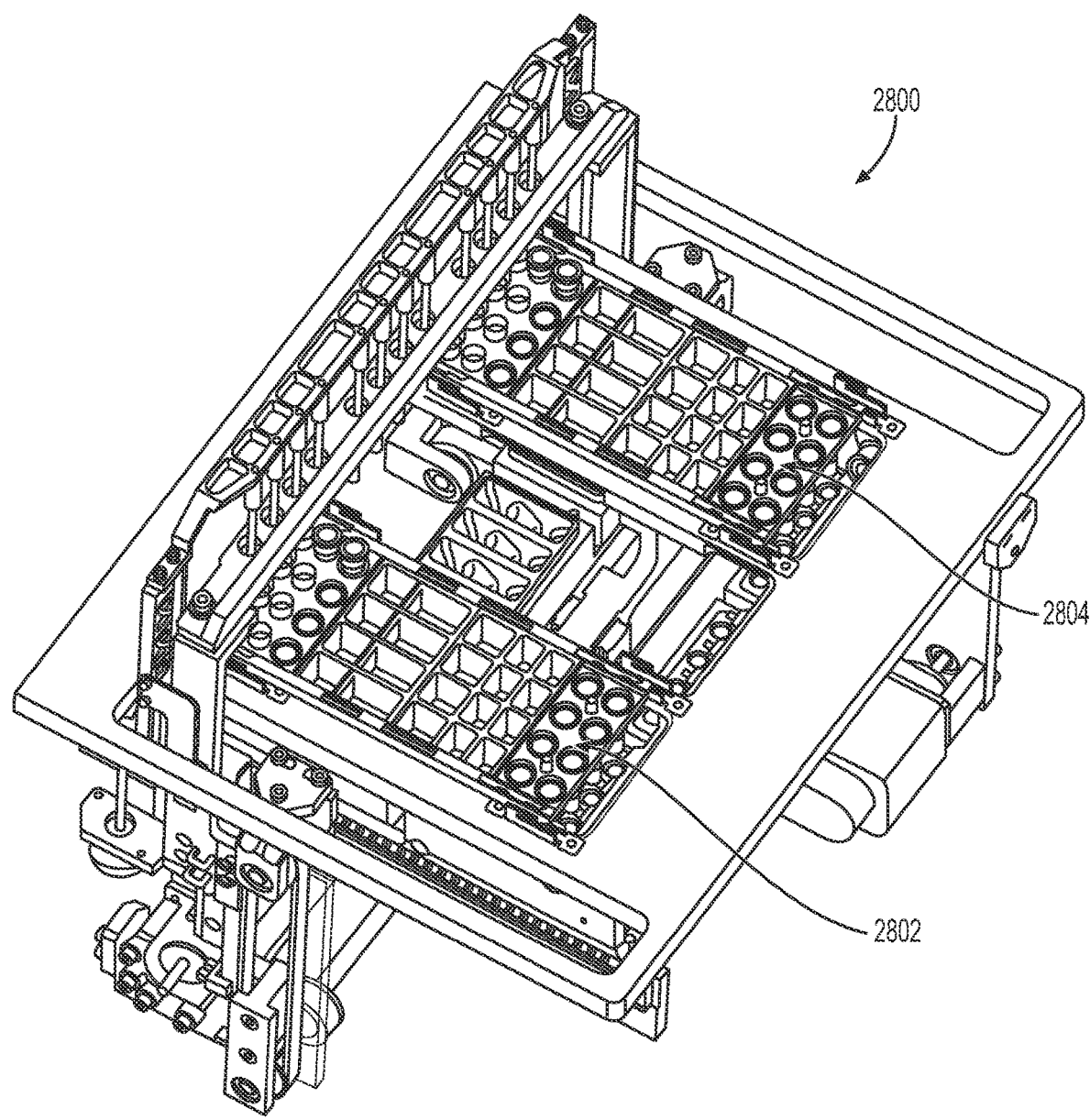
FIG. 28 shows a sample preparation unit of a sample preparation station according to one embodiment.

The sample preparation station may include one or more sample preparation (SP) modules. An SP module according to one embodiment is illustrated in FIG. 28. As shown, SP module 2800 includes three SP cartridge sample preparation positions, two of which are occupied in FIG. 28 by SP cartridges 2802 and 2804. SP module 2800 performs the mechanical motions needed to extract nucleic acid. SP module 2800 has features to pull the mixing plunger from the cartridge and move it to different wells along the SP cartridge to mix reagents. Mixing takes place using the plunger attached to a vertically translating plunger bar. SP module 2800 also has two independently controllable and movable heaters. The first heater is used to heat reagents in the pretreatment and lysis wells. The second heater is used to heat fluid in the eluate well. Both heaters can be engaged during mixing in their respective wells.

SP module 2800 moves magnetic microparticles from one well to another by inserting a magnet into the plunger which attracts particles to the external wall of the plunger. Once the particles are magnetically attached to the plunger, it is moved to the next well. The particles are released by removing the magnet from inside the plunger. Vertical motion of the plunger by SP module 2800 causes mixing in the wells.

Figure 29:
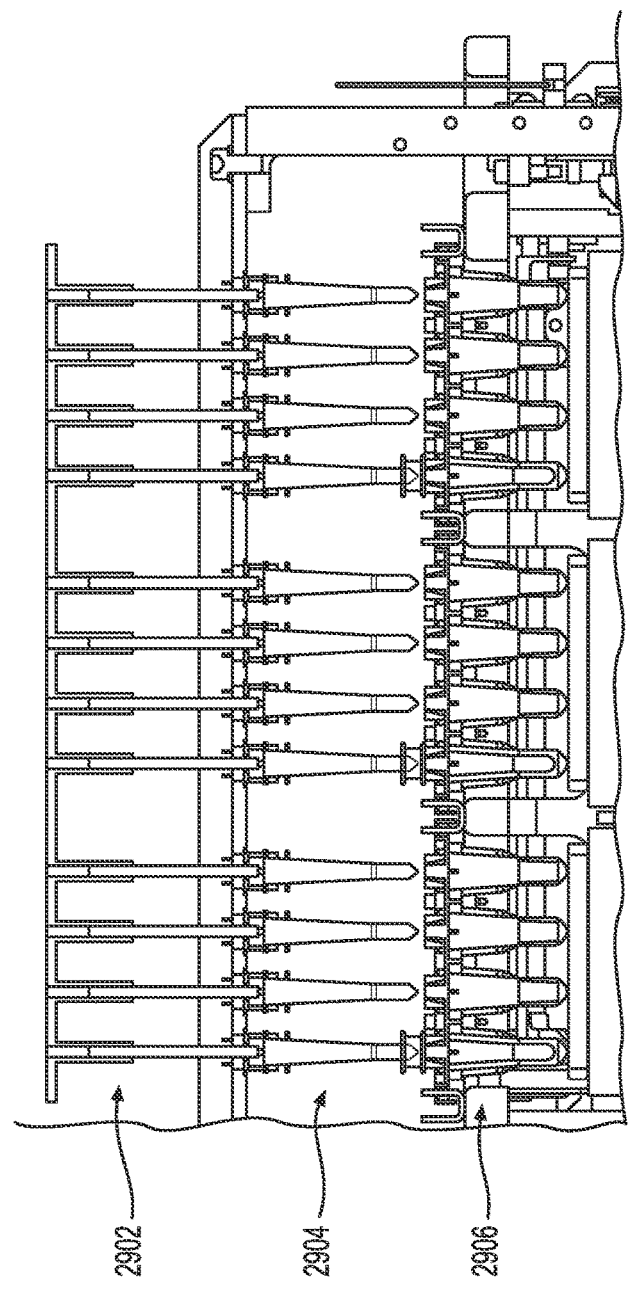
FIG. 29 shows magnets, plunger bars, plungers and SP cartridge wells according to one embodiment.
Figure 29:
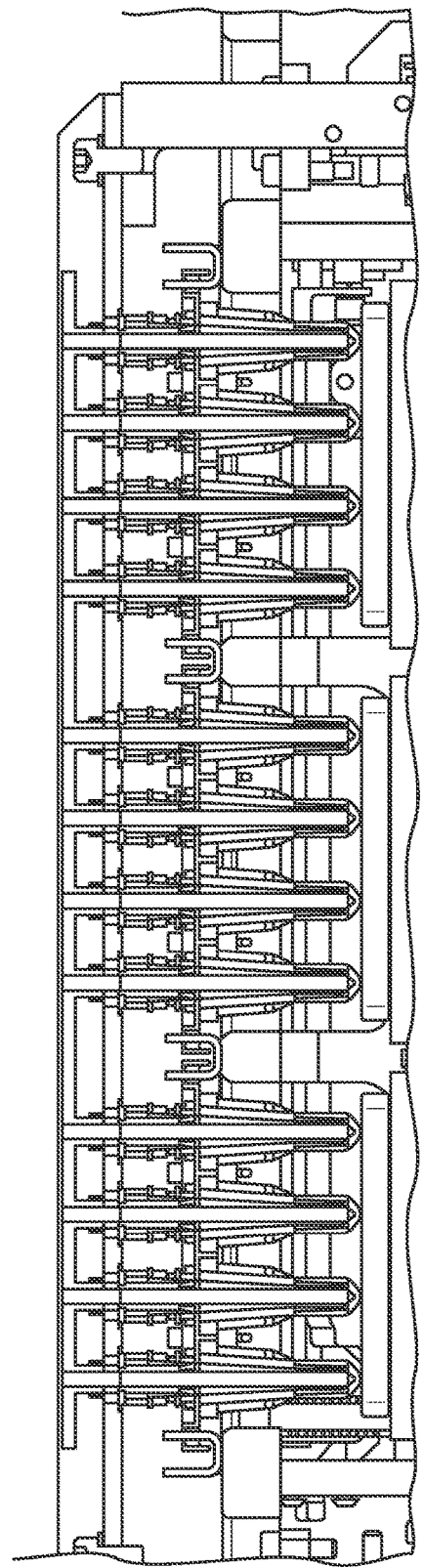

A side view of the SP module shown in FIG. 28 is illustrated in FIG. 29. Shown at the top of FIG. 29 are 3 groups of 4 magnets 2902, 3 groups of 4 plungers 2904, and 3 groups of 4 SP cartridge wells 2906 of SP cartridges for holding plungers. Shown at the bottom of FIG. 29 are the elements in their down-most position, in which the magnets and plungers are collapsed in wells of the SP cartridges.

Figure 30:
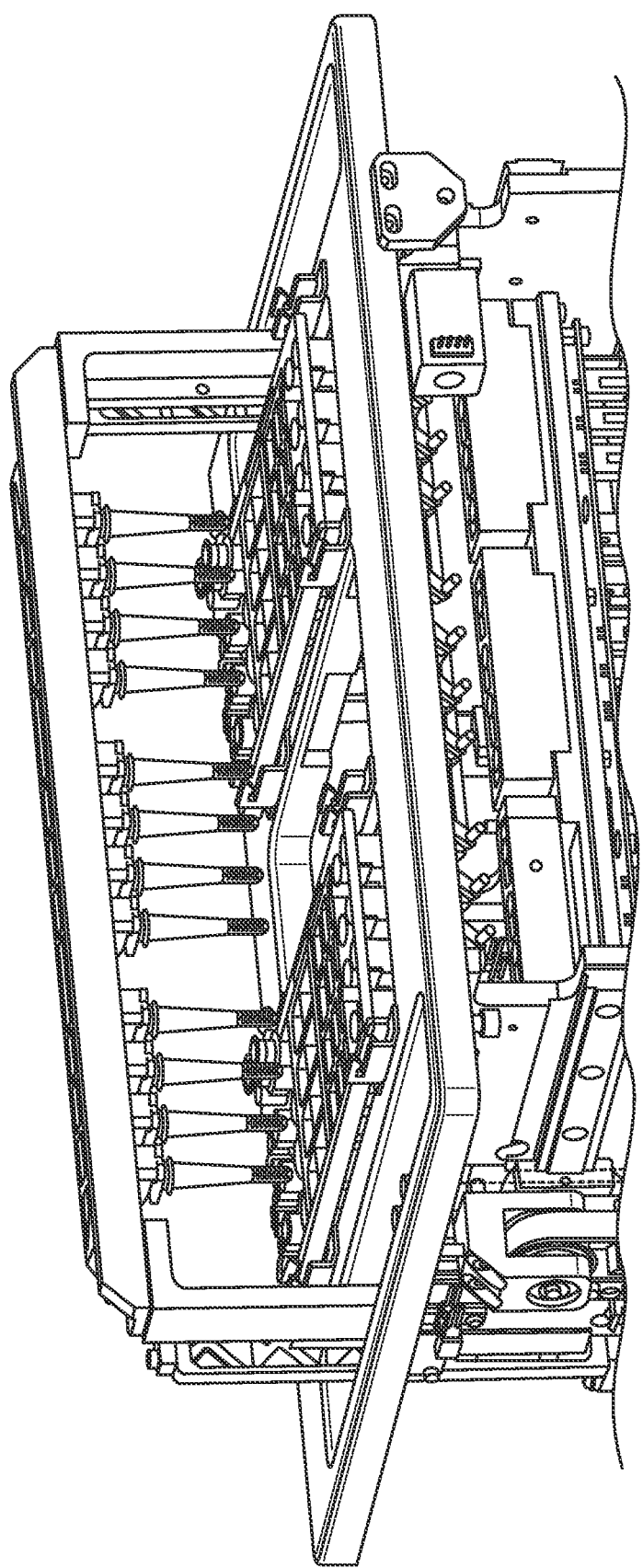
FIG. 30 shows a sample preparation unit of a sample preparation station according to one embodiment.

Another view of the SP module shown in FIG. 28 is illustrated in FIG. 30. In this example, a plunger is attached to each plunger bar (not shown) and each magnet is inserted into a plunger. Upon lowering into a well that includes magnetic particles having nucleic acids attached thereon, the magnetic particles will attach to the outside wall of the plunger, enabling movement of the particles from well to well for washing and, ultimately, elution of nucleic acids from the particles.

Figure 51:
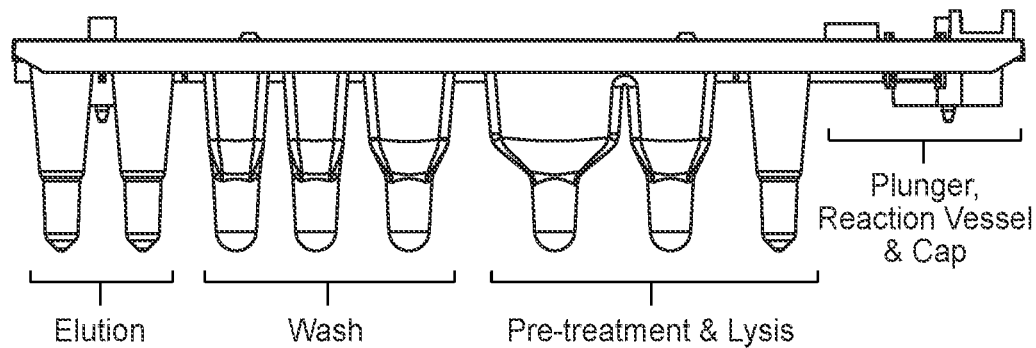
FIG. 51 shows sample processing and pipetting features of a system according to certain embodiments of the present disclosure.
Figure 51:
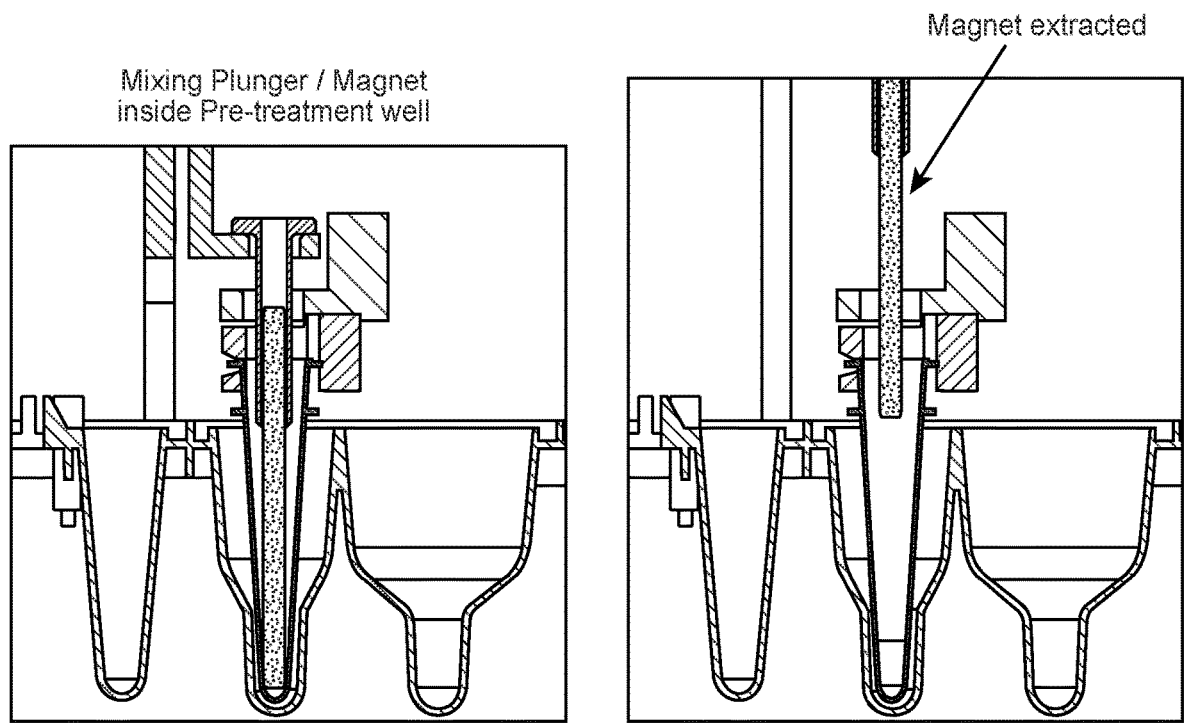

In certain aspects, movement of the target material (e.g., nucleic acids) using magnetic particles as opposed to pipetting has the benefit of reducing or eliminating splashing/cross-over contamination opportunities during sample processing/extraction (FIG. 51).

Robotic Pipettor

The automated analysis systems of the present disclosure include a robotic pipettor. The robotic pipettor is able to access the system positions required for pipetting to accomplish sample preparation and processing, and RV capping and transport.

The robotic pipettor interacts with, e.g., pipette tips at an internal location of the pipette tip loading area; sample tubes at an internal location of the sample loading area, ancillary reagents present at an internal location of the ancillary reagent loading area, the sample preparation station, assay reagents (e.g., lyophilized assay reagents present at an internal location of the assay reagent loading area), a pipette tip and/or RV waste location, and the sample analysis station. The pipettor is able to perform, e.g., transfer of samples and reagents to pretreatment or lysis wells of SP cartridges; transfer pretreated samples from pretreatment wells to lysis wells; access eluate wells, auxiliary wells, and plunger disposal locations; access RV caps on SP cartridges; fill RVs with eluate and reagents; access filled RVs on SP cartridges; and access RV wells of the analysis station.

In certain aspects, the robotic pipettor has the same number of pipetting barrels as lanes of an SP cartridge. For example, when an SP cartridge has 4 lanes (that is, a 4-channel SP cartridge), the robotic pipettor may have 4 pipetting barrels, such that the robotic pipettor can aspirate and/or dispense regents, samples, purified nucleic acids, and/or the like from corresponding wells of each lane/channel of an SP cartridge simultaneously.

Figure 31:
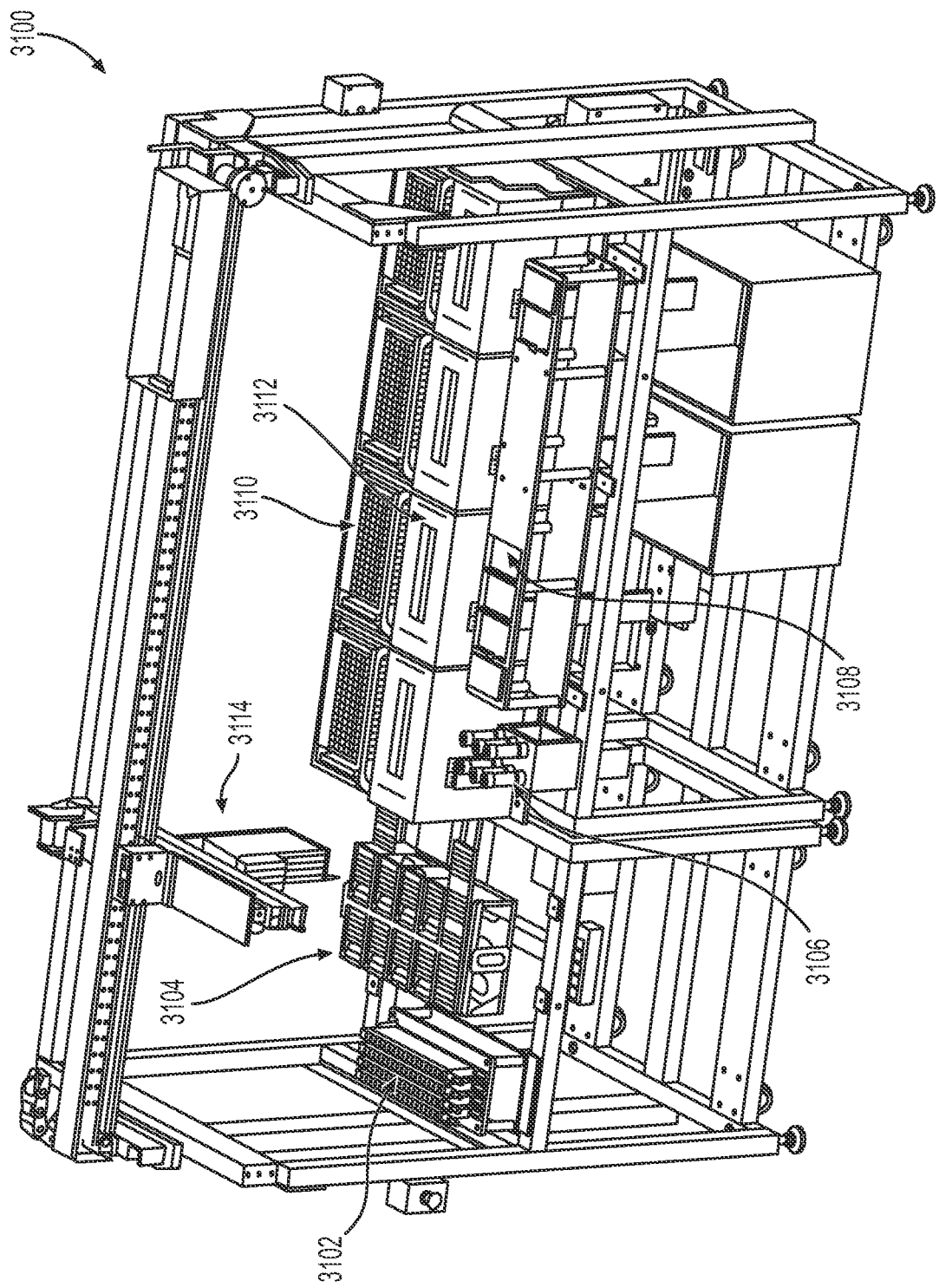
FIG. 31 shows a robotic pipettor in the context of an automated sample analysis system according to one embodiment.
Figure 32:
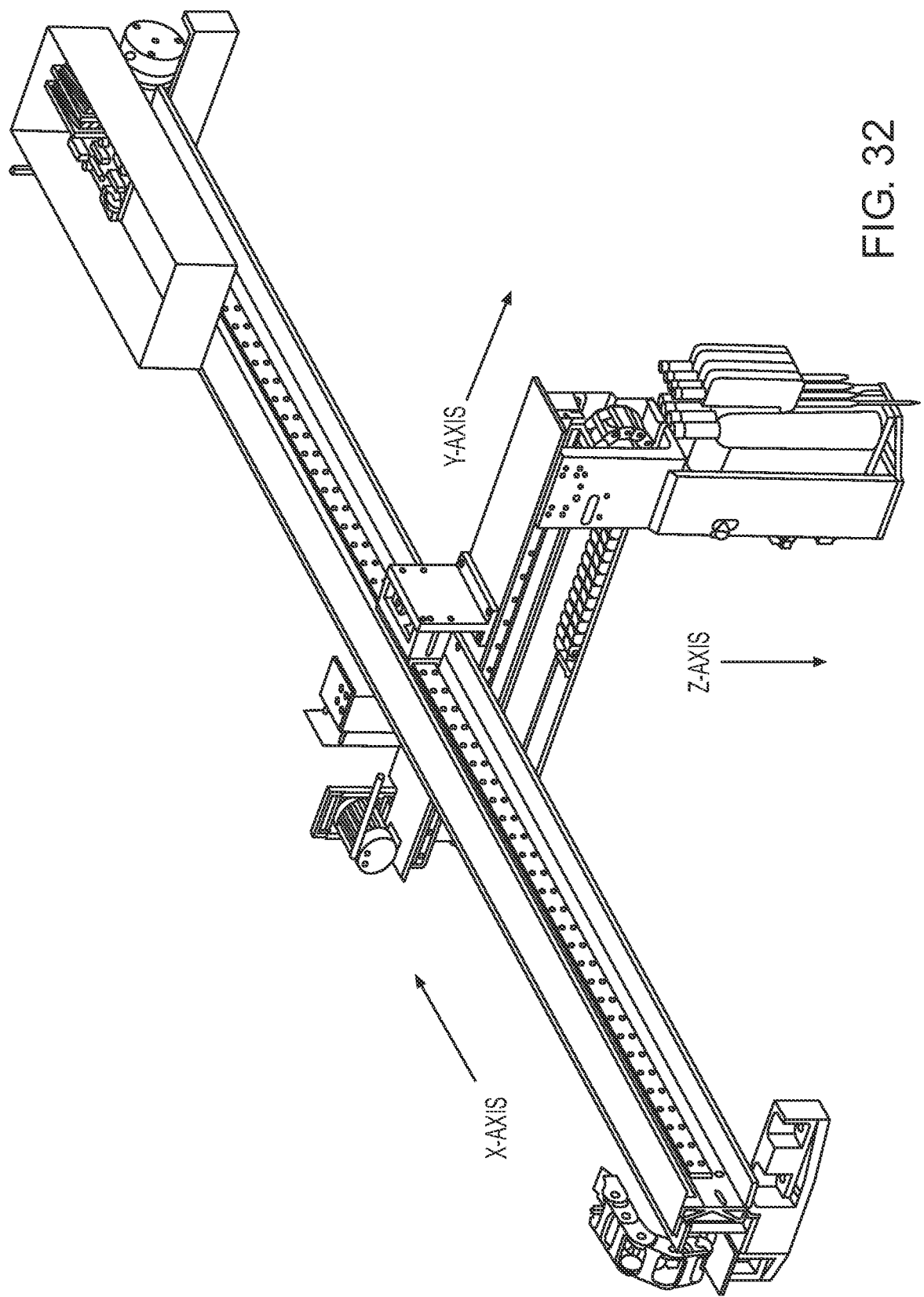
FIG. 32 shows a robotic pipettor according to one embodiment.
Figure 33:
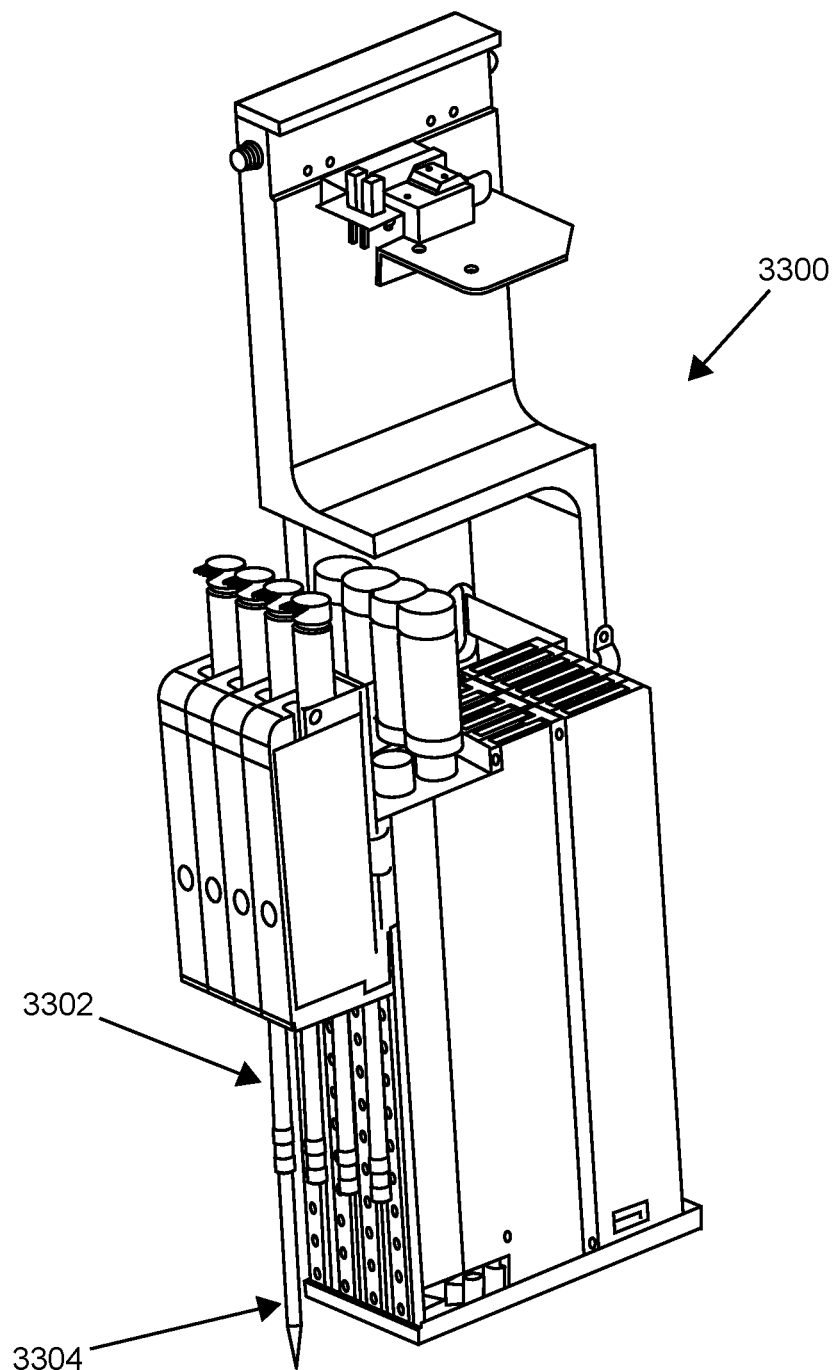
FIG. 33 shows a robotic pipettor according to one embodiment.

A robotic pipettor in the context of an analysis system according to one embodiment is shown in FIG. 31. Automated sample analysis system 3100 includes sample loading area 3102, pipette tip loading area 3104, ancillary reagent loading area 3106, assay reagent tray loading area 3108, four sample preparation units (e.g., sample preparation unit 3110) and four sample analysis units, e.g., sample analysis unit 3112. Robotic pipettor 3114 is movable in the X, Y and Z axes (e.g., via drive/servo motor assemblies) to interact with each of the aforementioned system areas/stations. Components that enable the movement of the robotic pipettor in the various axes are shown in further detail in FIG. 32. A magnified view of a robotic pipettor according to one embodiment is shown in FIG. 33. In this example, robotic pipettor 3300 has 4 barrels/channels. Barrel/channel 3302 is attached to pipette tip 3304.

Figure 34:
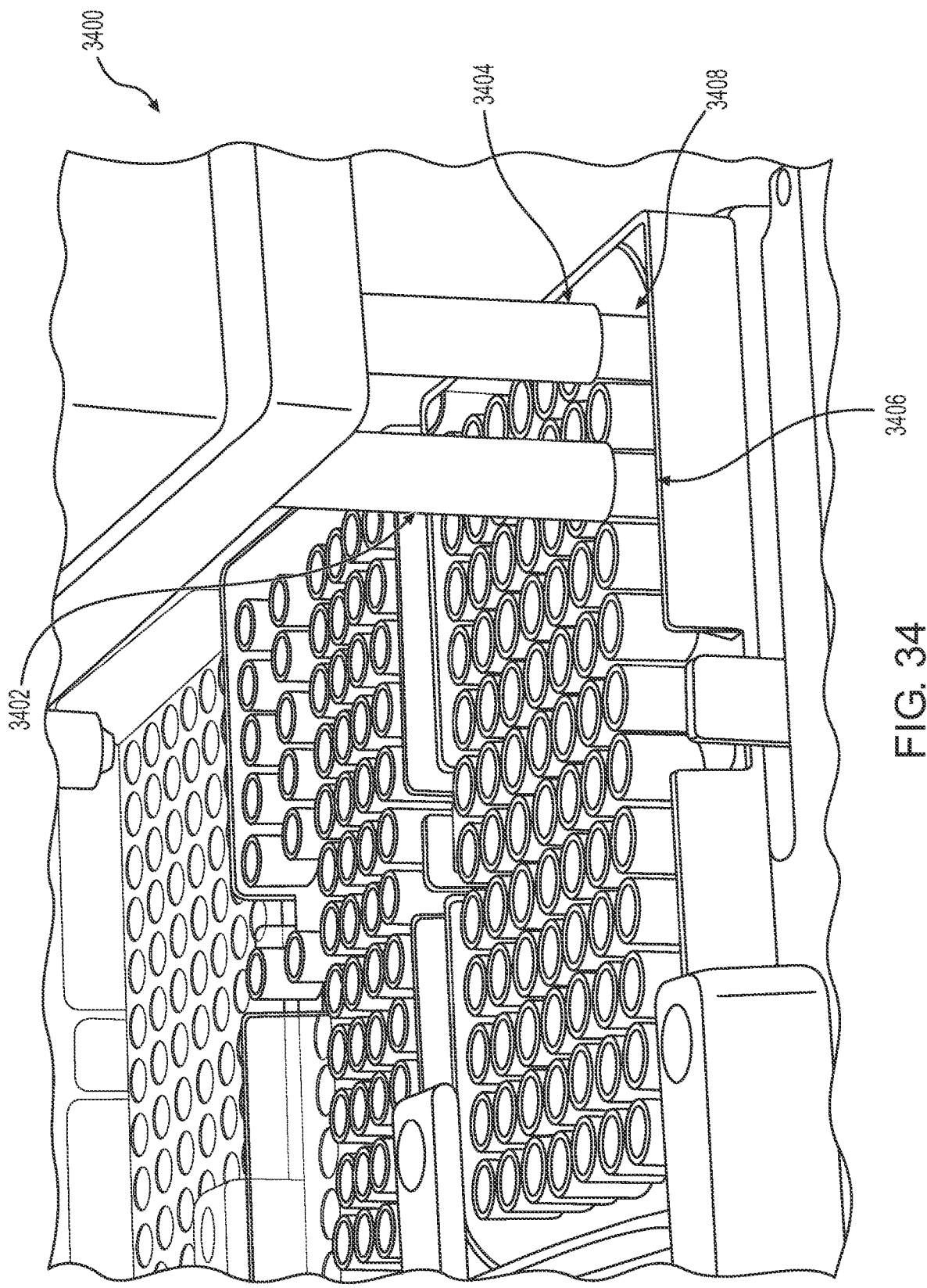
FIG. 34 shows the engagement of a robotic pipettor with pipette tips according to one embodiment.

An illustration of robotic pipettor 3400 having barrels 3402 and 3404 at a pipette tip loading area is provided in FIG. 34. Shown are barrels 3402 and 3404 staking two respective pipette tips (tips 3406 and 3408).

Figure 35:
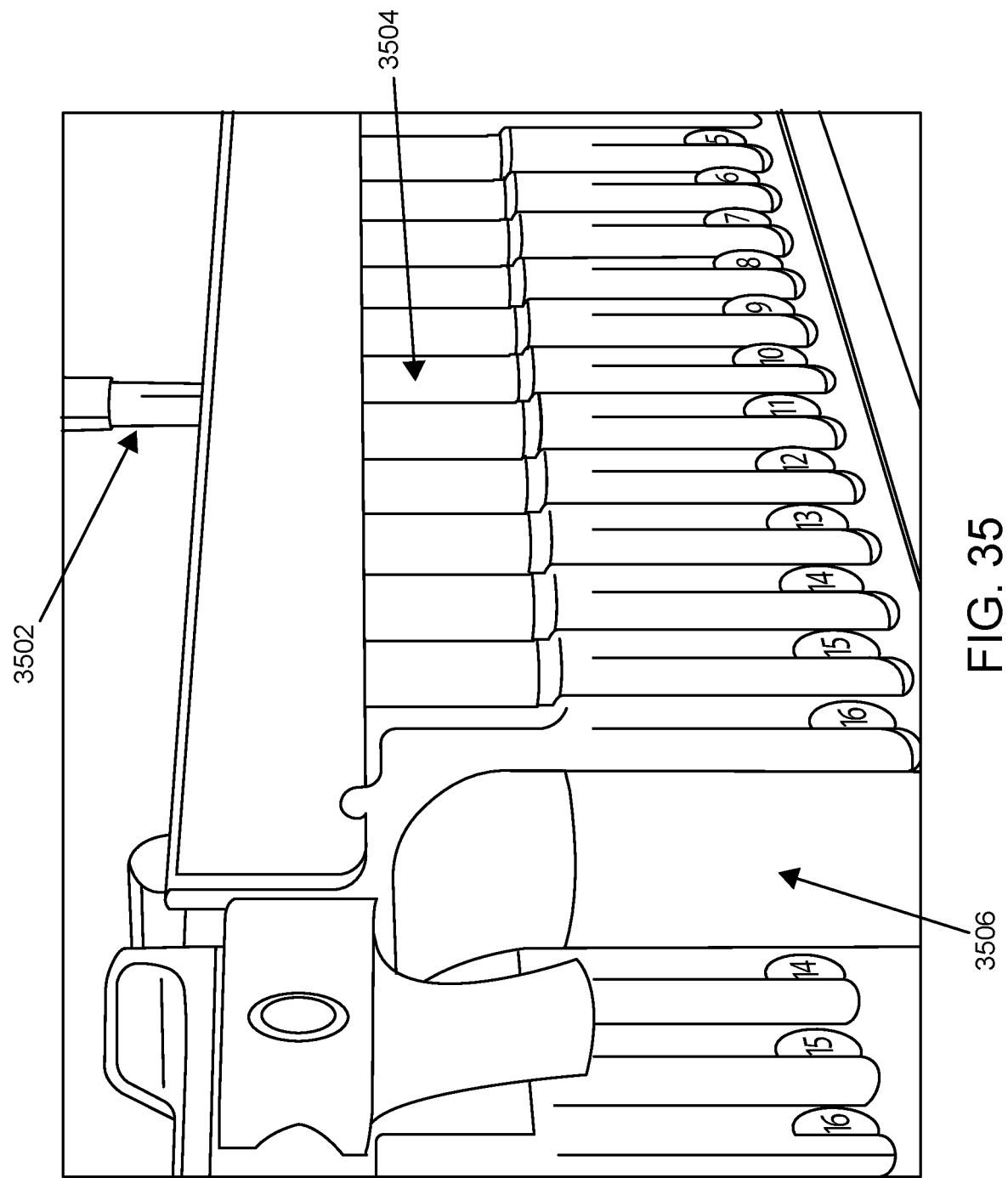
FIG. 35 shows the aspiration of a sample from a sample tube by a robotic pipettor according to one embodiment.

FIG. 35 illustrates sample aspiration from a sample tube present in a sample tube rack by a robotic pipettor according to one embodiment. Shown is pipette tip 3502 aspirating sample from sample tube 3504 present in sample tube rack 3506.

Figure 36:
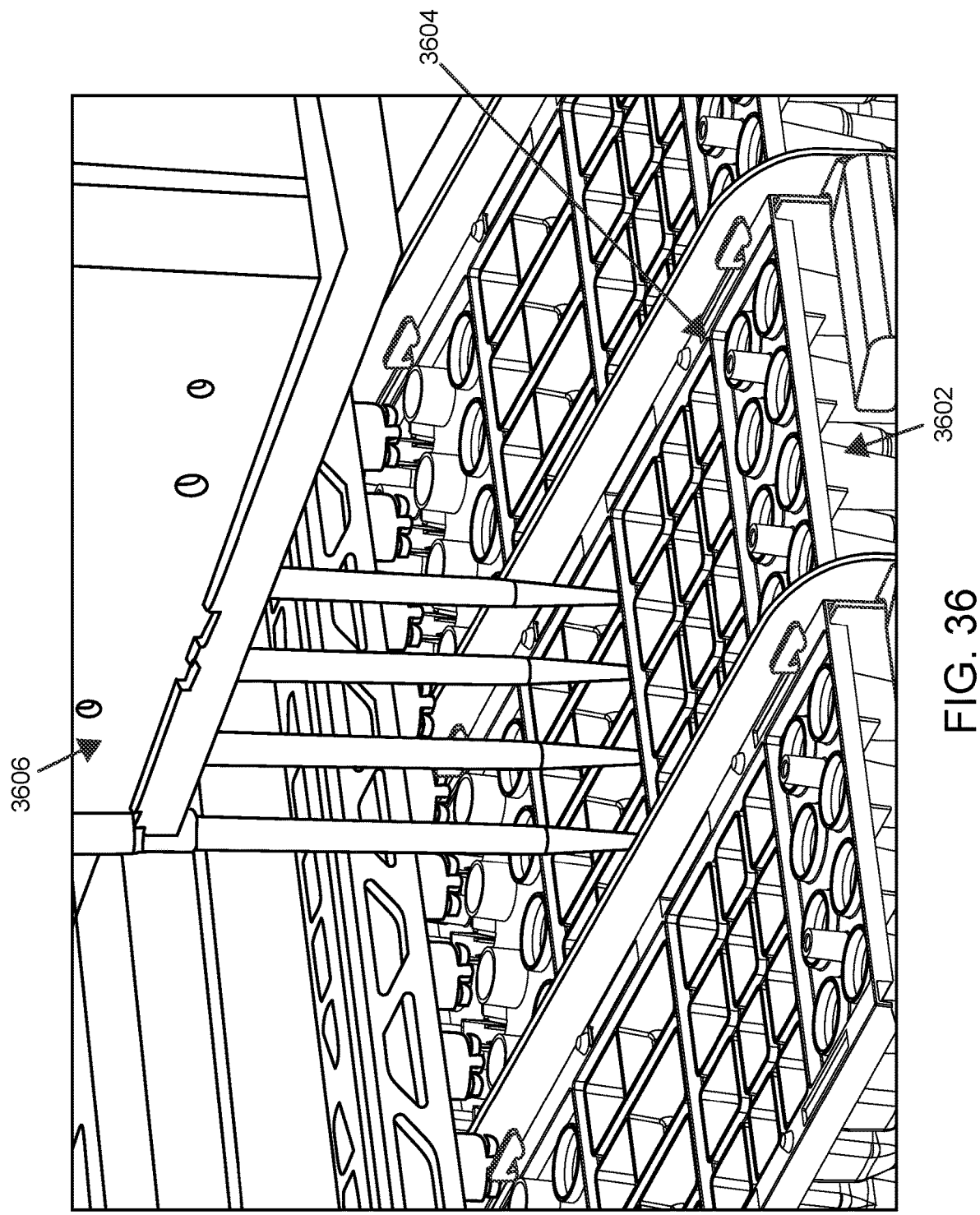
FIG. 36 shows the dispense of samples into respective wells of an SP cartridge according to one embodiment.

An illustration showing the dispense of samples into wells of an SP cartridge at a sample preparation position of a sample preparation unit of a sample preparation station by a robotic pipettor according to one embodiment is provided in FIG. 36. Present at position 3602 is 4-channel SP cartridge 3604. Robotic pipettor 3606 has four barrels and associated pipette tips, and dispenses samples into respective wells of 4-channel SP cartridge 3604.

Figure 37:
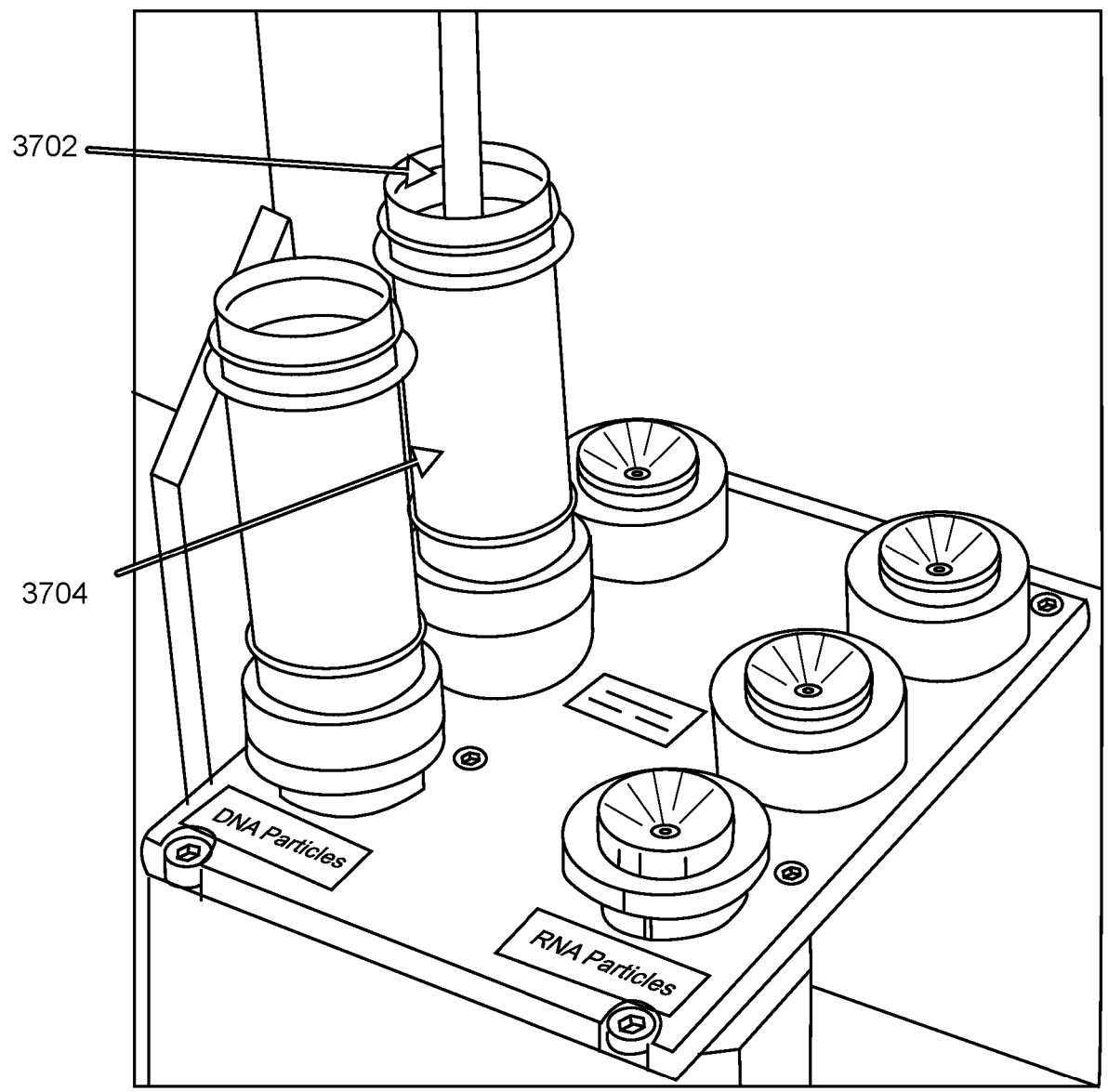
FIG. 37 shows the aspiration of an ancillary reagent by a robotic pipettor according to one embodiment.

An illustration showing the aspiration of an ancillary reagent at an ancillary reagent loading area by a robotic pipettor according to one embodiment is provided in FIG. 37. Shown is pipette tip 3702 attached to robotic pipettor (not shown) aspirating elution buffer from elution buffer tube 3704 present at an ancillary reagent loading area of the automated sample analysis system.

Figure 38:
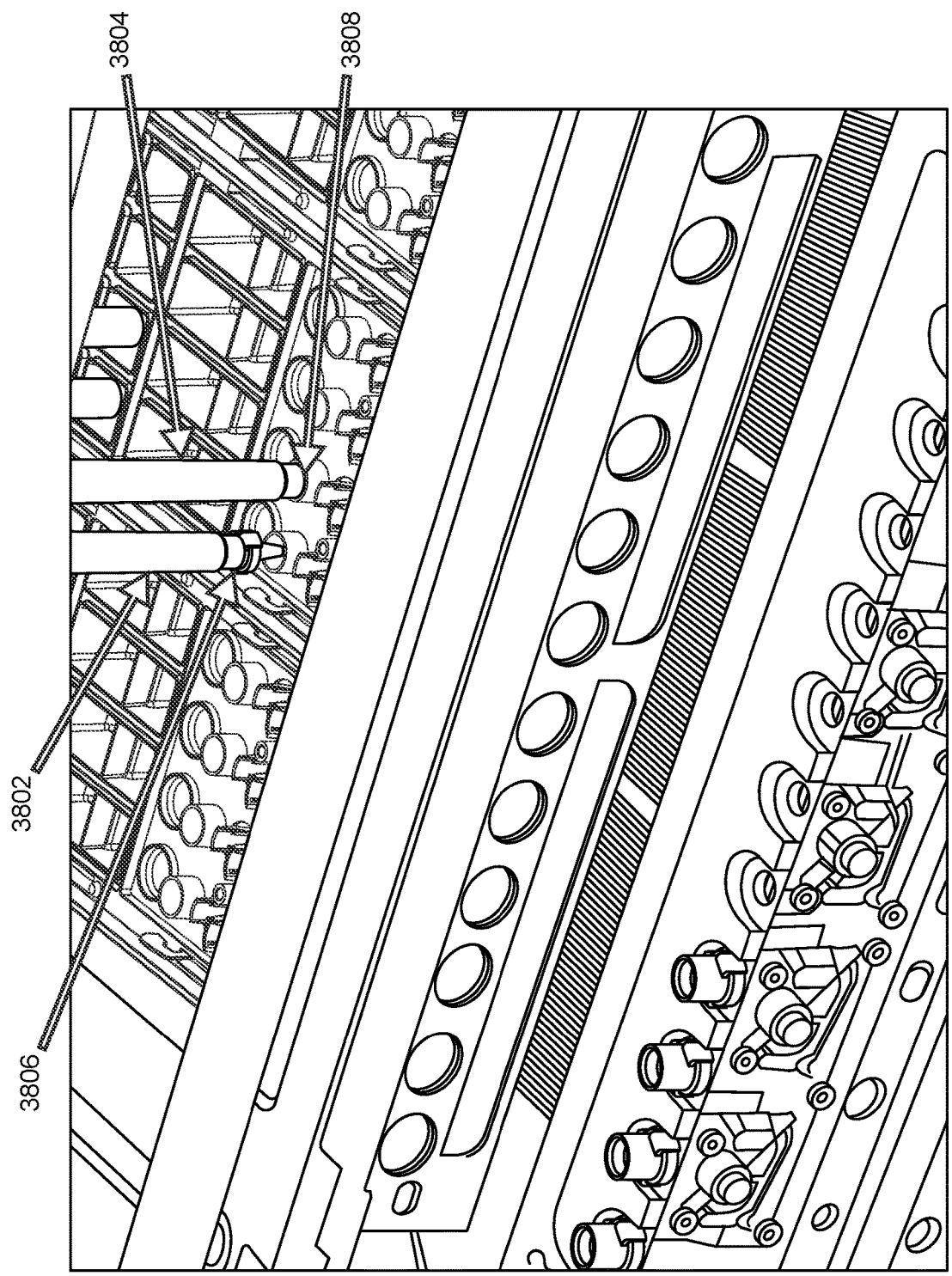
FIG. 38 shows the picking up of reaction vessel (RV) caps by a robotic pipettor according to one embodiment.

FIG. 38 shows an illustration of a robotic pipettor picking up reaction vessel (RV) caps present in an SP cartridge at a sample preparation unit. Shown are pipettor barrels 3802 and 3804 of a robotic pipettor attached to RV caps 3806 and 3808 in preparation for capping RVs present at adjacent positions of the SP cartridge.

Figure 39:
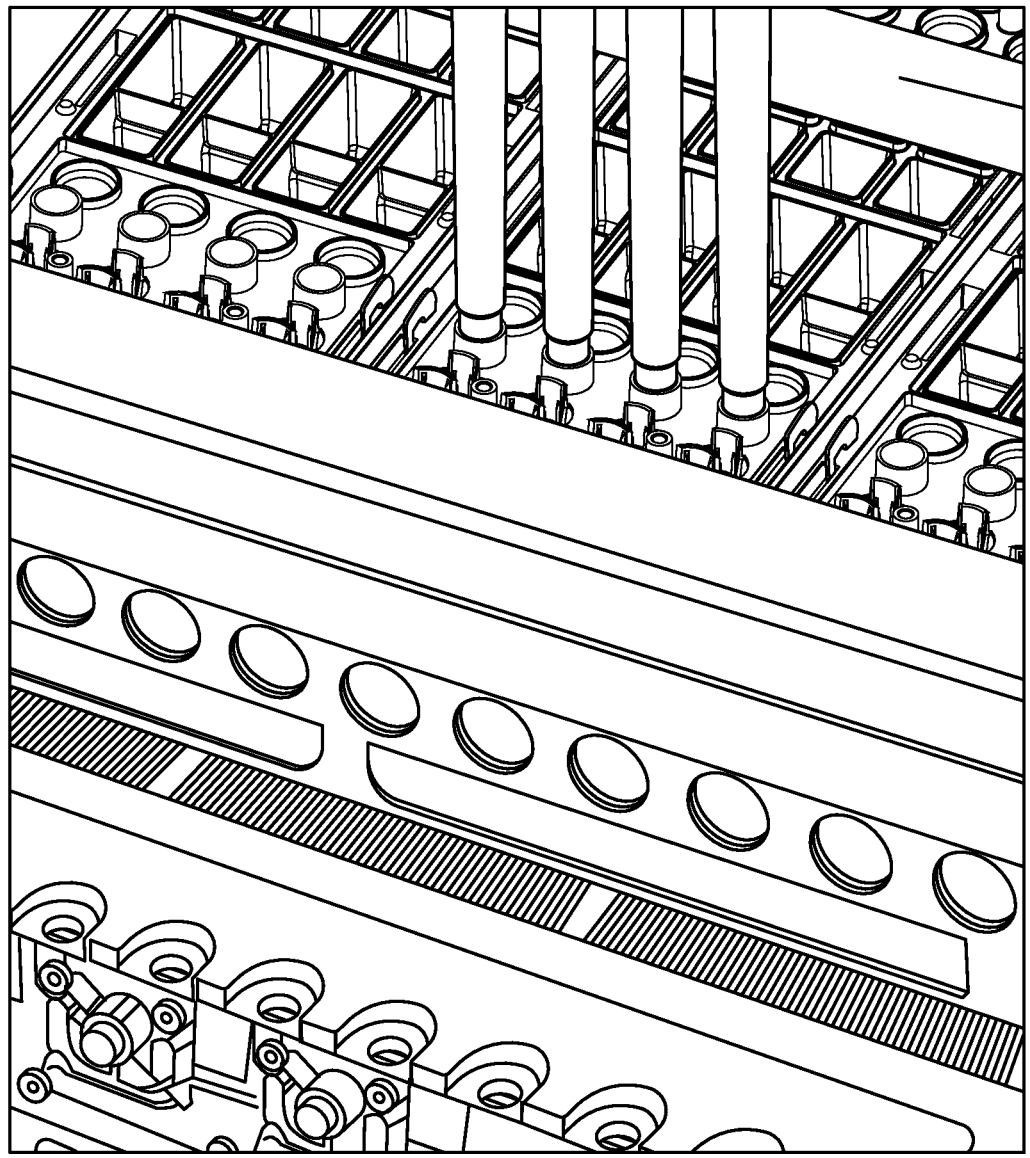
FIG. 39 shows the capping of RVs by a robotic pipettor according to one embodiment.

An illustration showing the capping of RVs with RV caps by a robotic pipettor according to one embodiment is provided in FIG. 39. In this example, the pipettor has four barrels, each of which is pushing an RV cap into a respective RV in an SP cartridge at a sample preparation unit.

Figure 40:
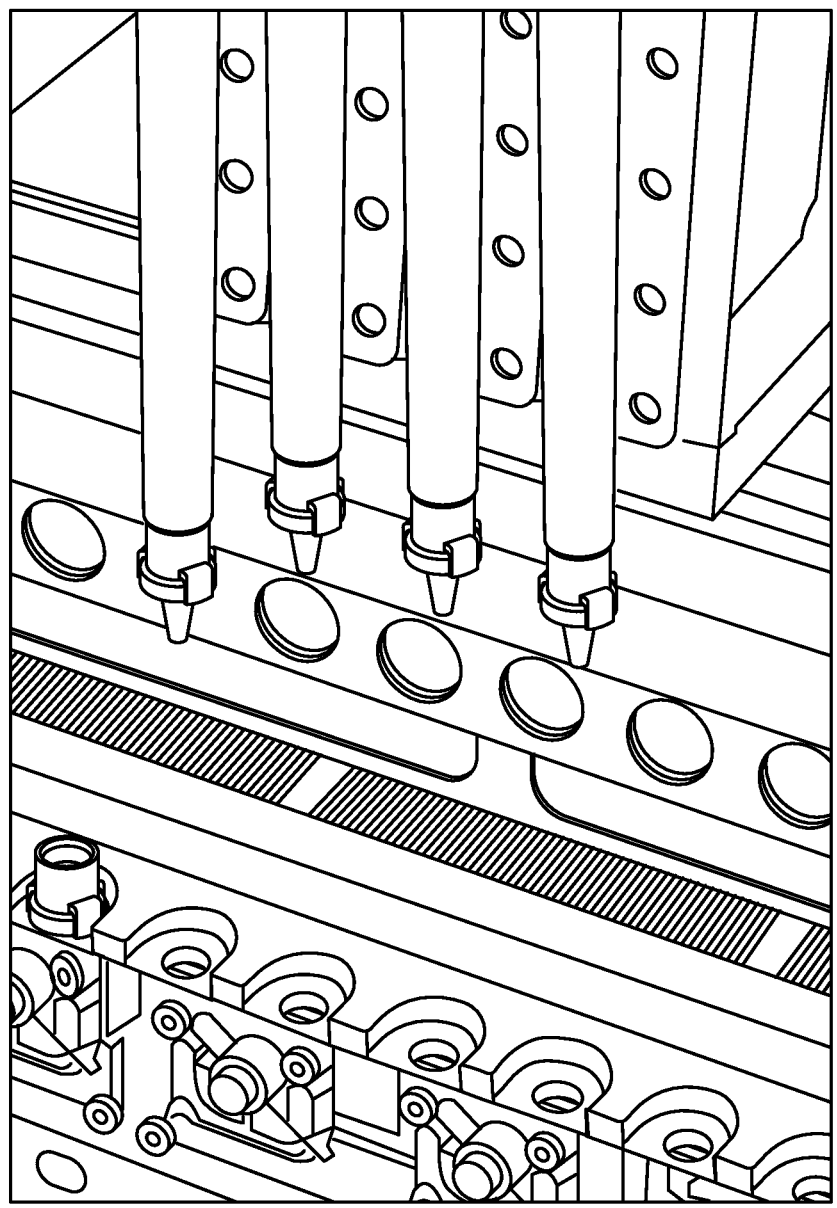
FIG. 40 shows the transfer of capped RVs from an SP cartridge to wells of a sample analysis unit according to one embodiment.
Figure 41:
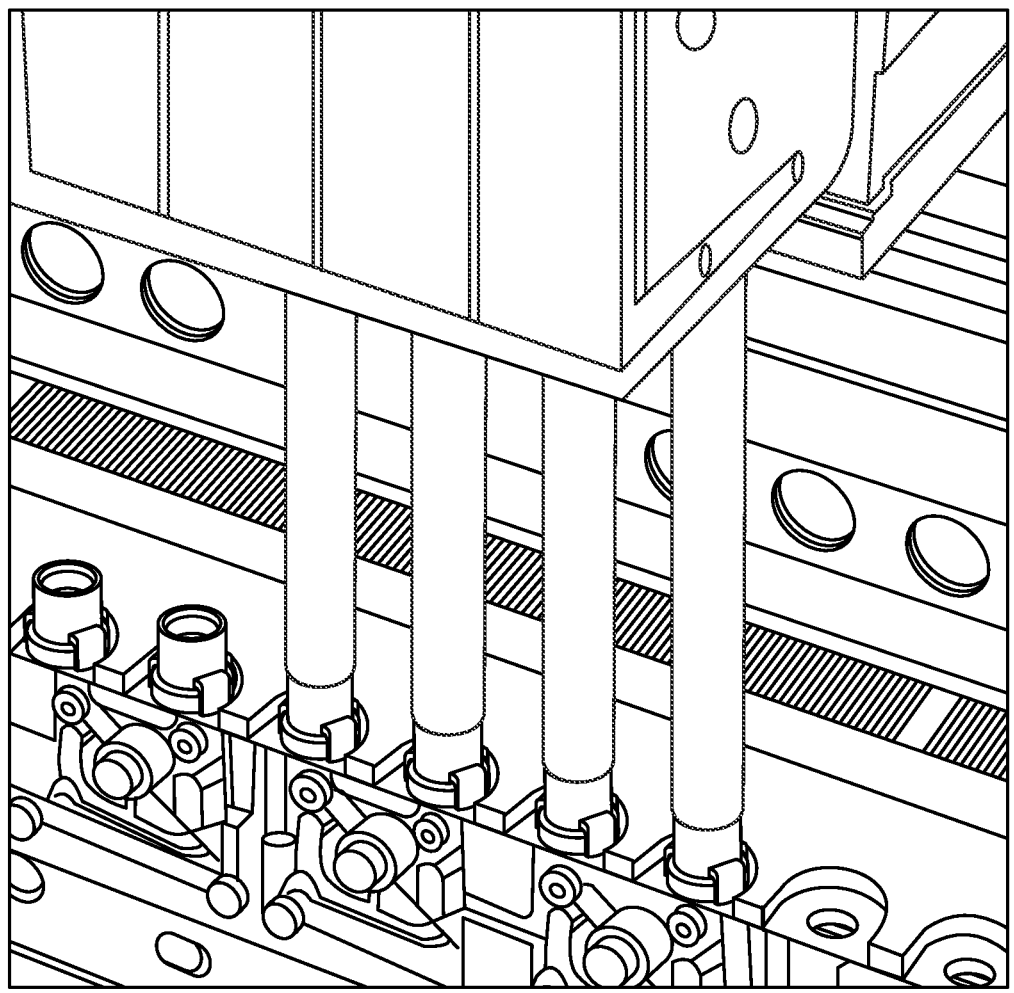
FIG. 41 shows the placement of capped RVs into wells of a sample analysis unit according to one embodiment.
Figure 42:
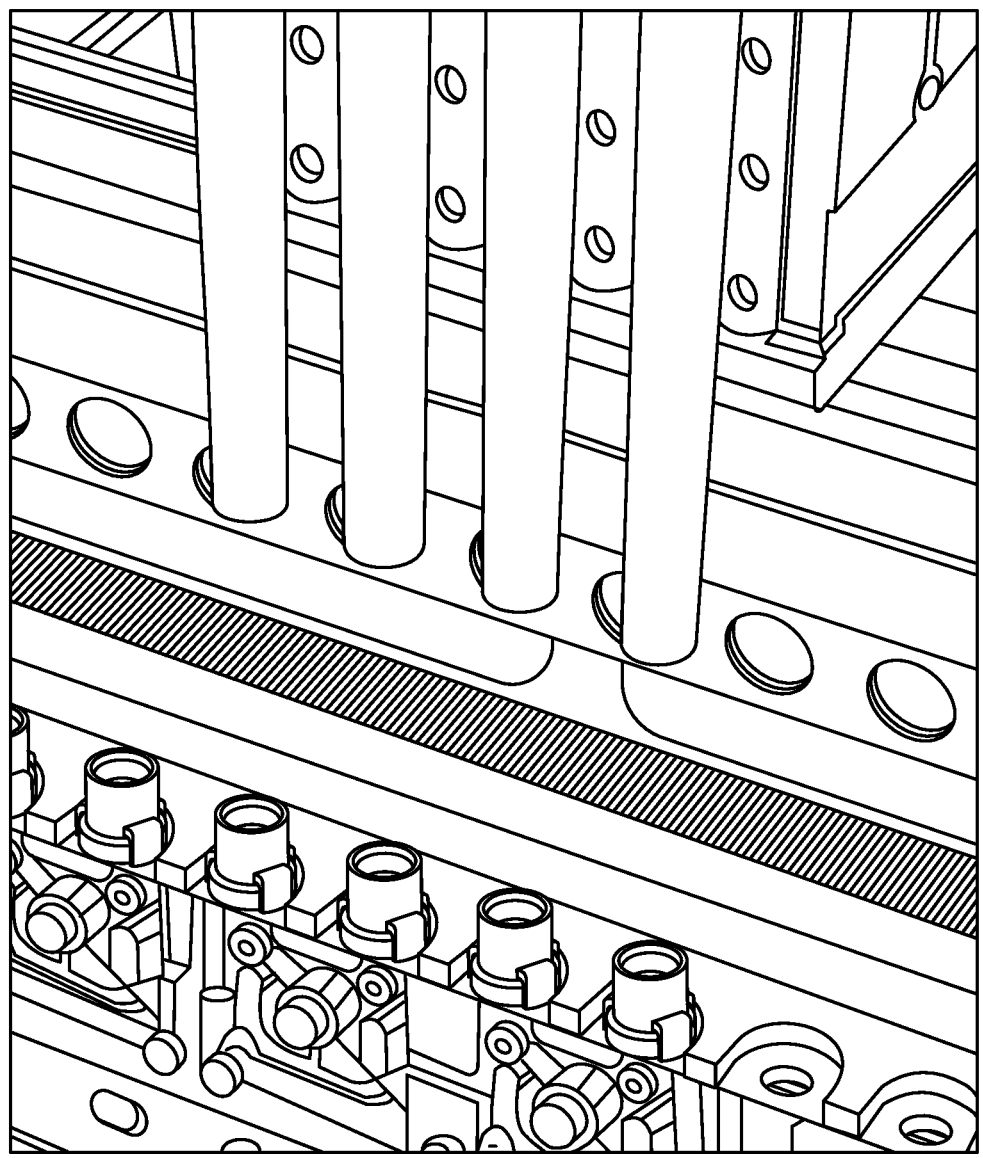
FIG. 42 shows capped RVs into wells of a sample analysis unit after release by a robotic pipettor according to one embodiment.

FIG. 40 shows the transport of capped RVs from an SP cartridge to RV wells of a sample analysis unit by a robotic pipettor. The distal ends of the 4 pipettor barrels are mated with the RV caps of the capped RVs, enabling the transport of the capped RVs by the robotic pipettor. FIG. 40 shows the placement of capped RVs into RV wells of a sample analysis unit by the robotic pipettor. FIG. 41 shows the capped RVs in their respective RV wells of a sample analysis unit subsequent to release of the RV caps of the capped RVs by the barrels of the robotic pipettor.

According to certain embodiments, the robotic pipettor may include a camera for capturing images of the of the system for local analysis as well as remote analysis for purpose of maintenance, performance, automated correction, and the like. In some embodiments, the camera may also be used in reading barcodes present on assay plates and ancillary bottles. It can also be used to identify consumable characteristics, such as tip type.

According to certain embodiments, the robotic pipettor picks up a disposable pipette tip from the pipette tip storage area, aspirates a sample from a sample tube present at the sample introduction area, and dispenses the sample into a first well of the SP cartridge. In certain aspects, the robotic pipettor aspirates a purified sample from a second well of the SP cartridge and dispenses the purified sample into an assay reagent well (e.g., a well of an assay reagent plate). The assay reagent well may include lyophilized assay reagents. According to certain embodiments, the robotic pipettor transfers a mixture that includes the purified sample and assay reagents from the assay reagent plate to a reaction vessel. In certain aspects, the reaction vessel is present in the SP cartridge. According to certain embodiments, the robotic pipettor picks up a reaction vessel cap and caps the reaction vessel. In certain aspects, the robotic pipettor picks up the capped reaction vessel and transports the capped reaction vessel to a well of one of the sample analysis units of the sample analysis station.

In certain aspects, a method of the present disclosure may include picking up, using a robotic pipettor, a disposable pipette tip from the pipette tip storage area, aspirating a sample from a sample tube present at the sample introduction area, and dispensing the sample into a first well of the SP cartridge. According to certain embodiments, a method of the present disclosure may include aspirating, using the robotic pipettor, a purified sample from a second well of the SP cartridge and dispensing the purified sample into an assay reagent well, e.g., a well of an assay reagent plate. The assay reagent well may include lyophilized assay reagents. In certain aspects, a method of the present disclosure may include transferring, using the robotic pipettor, a mixture that includes the purified sample and assay reagents from the assay reagent well to a reaction vessel, e.g., a reaction vessel present in the SP cartridge. According to certain embodiments, a method of the present disclosure may include picking up, using the robotic pipettor, a reaction vessel cap and capping the reaction vessel. In certain aspects, a method of the present disclosure may include picking up, using the robotic pipettor, the capped reaction vessel and transporting the capped reaction vessel to a well of a sample analysis unit of the sample analysis station.

In some embodiments, the robotic pipettor includes features that find use, e.g., in reducing or eliminating cross-contamination. For example, in certain aspects, the robotic pipettor has one or more (e.g., any combination) of the following features: an air-based pipetting mechanism; the ability to detect the level of a liquid in a container (e.g., the liquid level in a sample tube, reagent tube, well of an SP cartridge, etc.); the ability to aspirate from an upper level (e.g., the top) of a liquid to prevent liquid drop contamination on the outside of the pipette tips; pipette tip material that discourages or prevents liquid from clinging to the outside of pipette tips; the formation (or "aspiration") of an air gap to move aspirated liquid further up the pipette tip prior to movement, e.g., to prevent drips during movement (e.g., from a sample tube to a container into which the aspirated sample will be dispensed); one or more pressure sensors within the pipettor (e.g., one or more barrels of the pipettor) for sensing, e.g., fluid movement in the pipette tip (e.g., unanticipated fluid movement in the tip); a movement path such that the pipettor (e.g., with sample) never travels above an SP cartridge.

Sample Analysis Station

The automated analysis systems of the present disclosure include a sample analysis station. The analysis station is adapted to perform one or more assays of interest. In certain aspects, the analysis station includes one or more analysis units that perform real-time nucleic acid amplification and detection (e.g., real-time PCR).

In real-time PCR, the amount of nucleic acid is measured at a plurality of time points during the amplification reaction to determine the actual or relative amount of target nucleic acid analyte initially present in the sample. Real-time PCR may be quantitative, semi-quantitative or qualitative. Real-time PCR is generally carried out in a thermal cycler with the capacity to illuminate each amplification sample with a beam of light of at least one specified wavelength and detect the fluorescence emitted by an excited fluorophore that is either incorporated into the amplicon or unquenched during amplification. Non-specific fluorochromes (e.g., DNA binding dyes such as e.g., SYBR Green) or specific fluorescent hybridization probes may be used. Using different-colored labels, fluorescent probes can be used in multiplex assays for monitoring several target sequences in the same tube.

One method of using fluorescently labeled probes relies on a DNA-based probe with a fluorescent reporter at one end and a quencher of fluorescence at the opposite end of the probe. The close proximity of the reporter to the quencher prevents detection of its fluorescence. When bound to a target sequence, breakdown of the probe by the 5' to 3' exonuclease activity of the Taq polymerase breaks the reporter-quencher proximity and thus allows unquenched emission of fluorescence, which can be detected after excitation with a particular wavelength of light. An increase in the product targeted by the reporter probe at each PCR cycle therefore causes a proportional increase in fluorescence due to the breakdown of the probe and release of the reporter.

According to certain embodiments, a sample analysis station of an automated analysis system of the present disclosure includes one or more identical or substantially identical analysis units adapted to perform real-time nucleic acid amplification and detection. For example, the analysis station may include from 1 to 10 analysis units, in which each analysis unit has one or more reaction vessel (RV) wells for thermocyling and detection. In certain aspects, a sample analysis station of an analysis system of the present disclosure includes 4 sample analysis units. According to certain embodiments, each of the four units has 12 RV wells. Accordingly, in certain embodiments, an automated analysis system of the present disclosure is capable of simultaneously performing RT-PCR on 48 samples. The 48 assays which may be run in parallel may be the same assay or different assays.

According to certain embodiments, the system includes a real-time nucleic acid amplification and detection unit as described in No. 62/308,632, the disclosure of which is incorporated herein by reference in its entirety.

Figure 43:
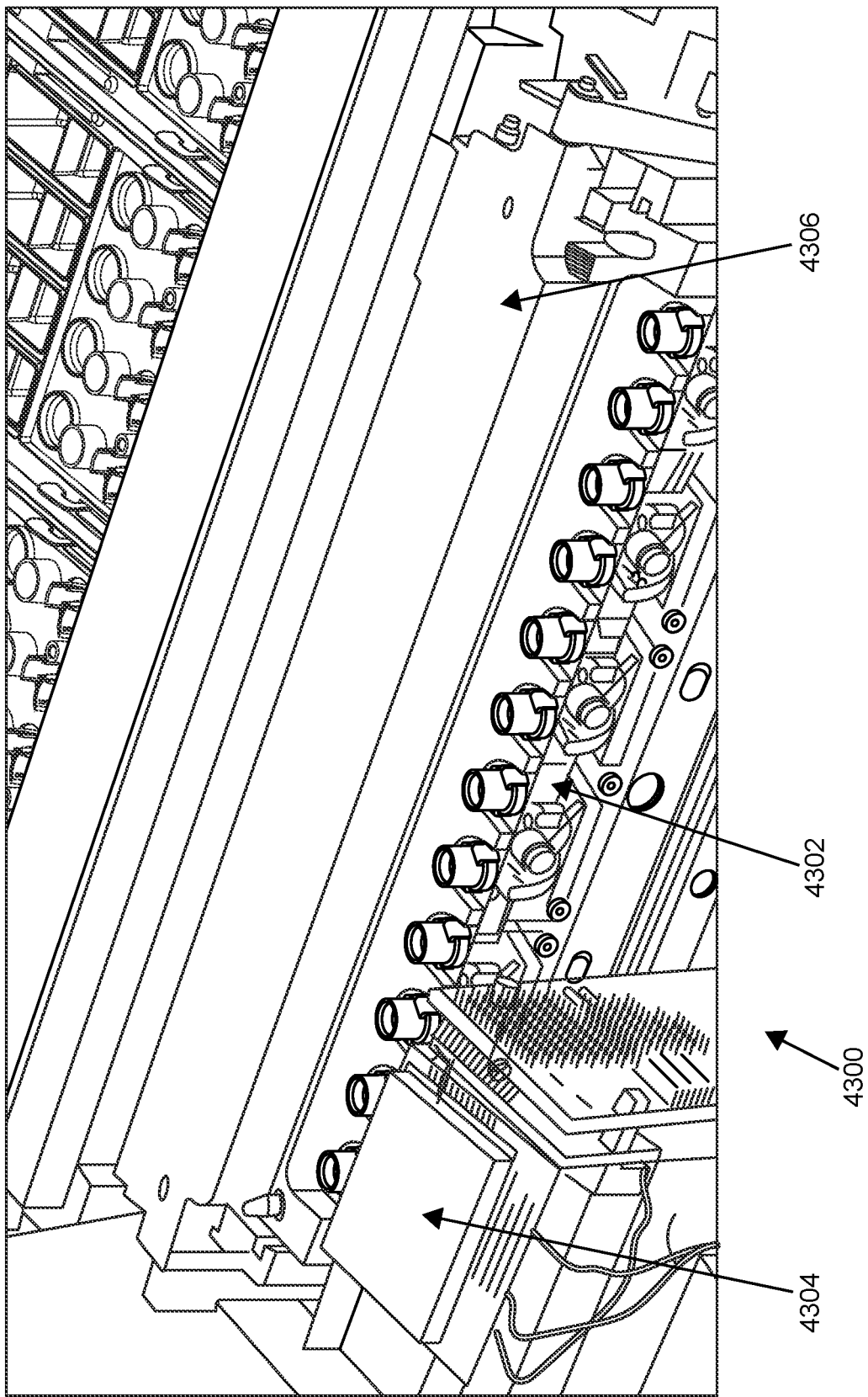
FIG. 43 shows a sample analysis unit according to one embodiment.
Figure 44:
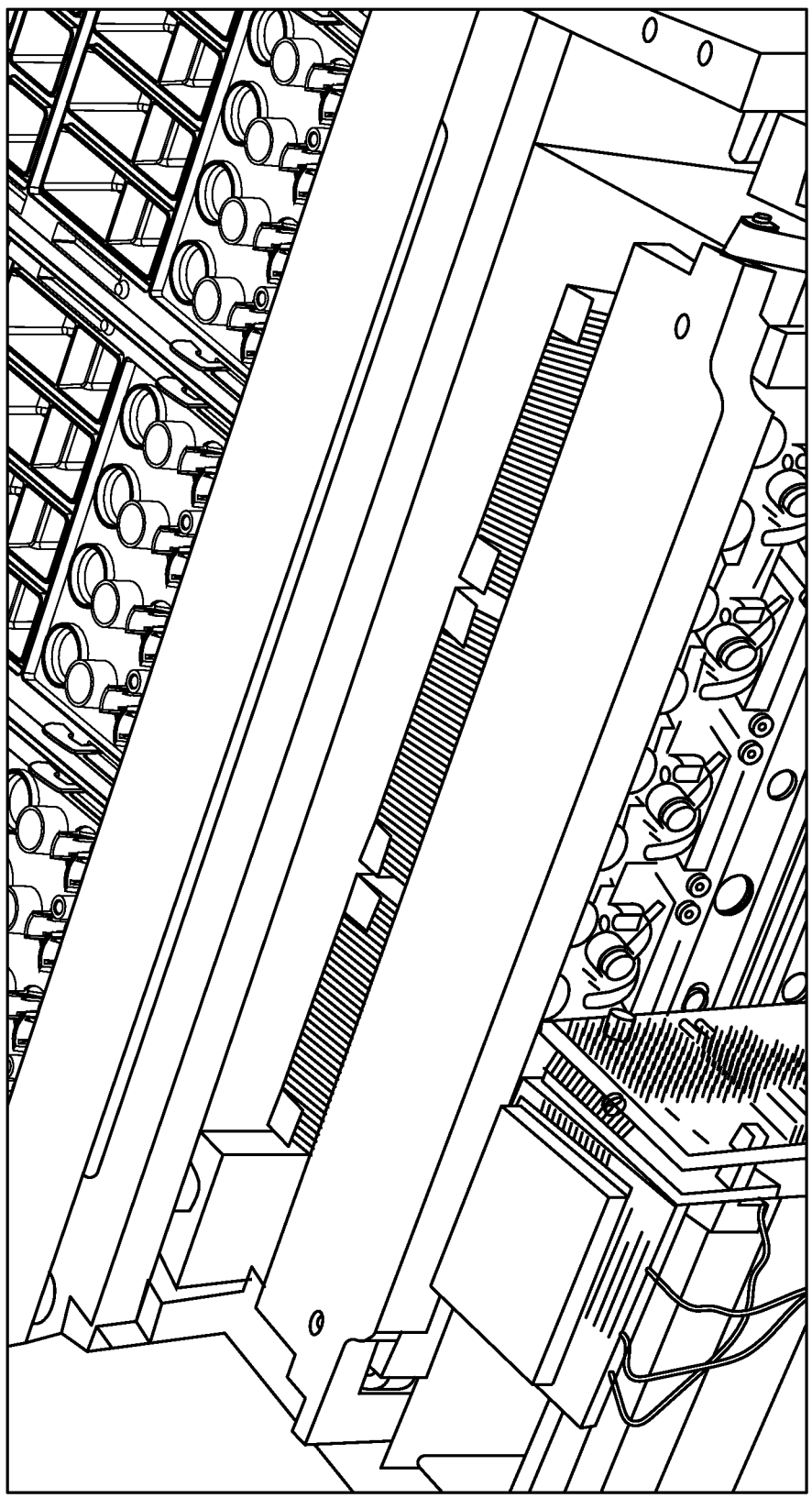
FIG. 44 shows a sample analysis unit at which a lid is positioned above RVs in a sample analysis unit, and a detection module is performing a scan to interrogate the RVs during nucleic acid amplification according to one embodiment.

An illustration of sample analysis unit of a sample analysis station according to one embodiment is shown in FIG. 43. Sample analysis unit 4300 includes thermocycler 4302 having 12 RV wells. As illustrated, a capped RV is present in each well of the thermocycler. Shown in FIG. 43 is lid 4306 (which may or may not be a heated lid) in a position that allows capped RVs to be into RV wells. Each well has an optical window that permits optical interrogation by detection module 4304 for detecting fluorescent signals relating to the presence and/or amount of nucleic acid amplification products generated. In this embodiment, detection module 4304 scans past the optical windows of the RV wells to optically interrogate the contents of each RV to detect the presence and/or amount of nucleic acid amplification products generated therein. Shown in FIG. 44 is the sample analysis unit of FIG. 43, in which lid 4306 is in contact with the tops of the capped RVs during thermocyling.

Figure 47:
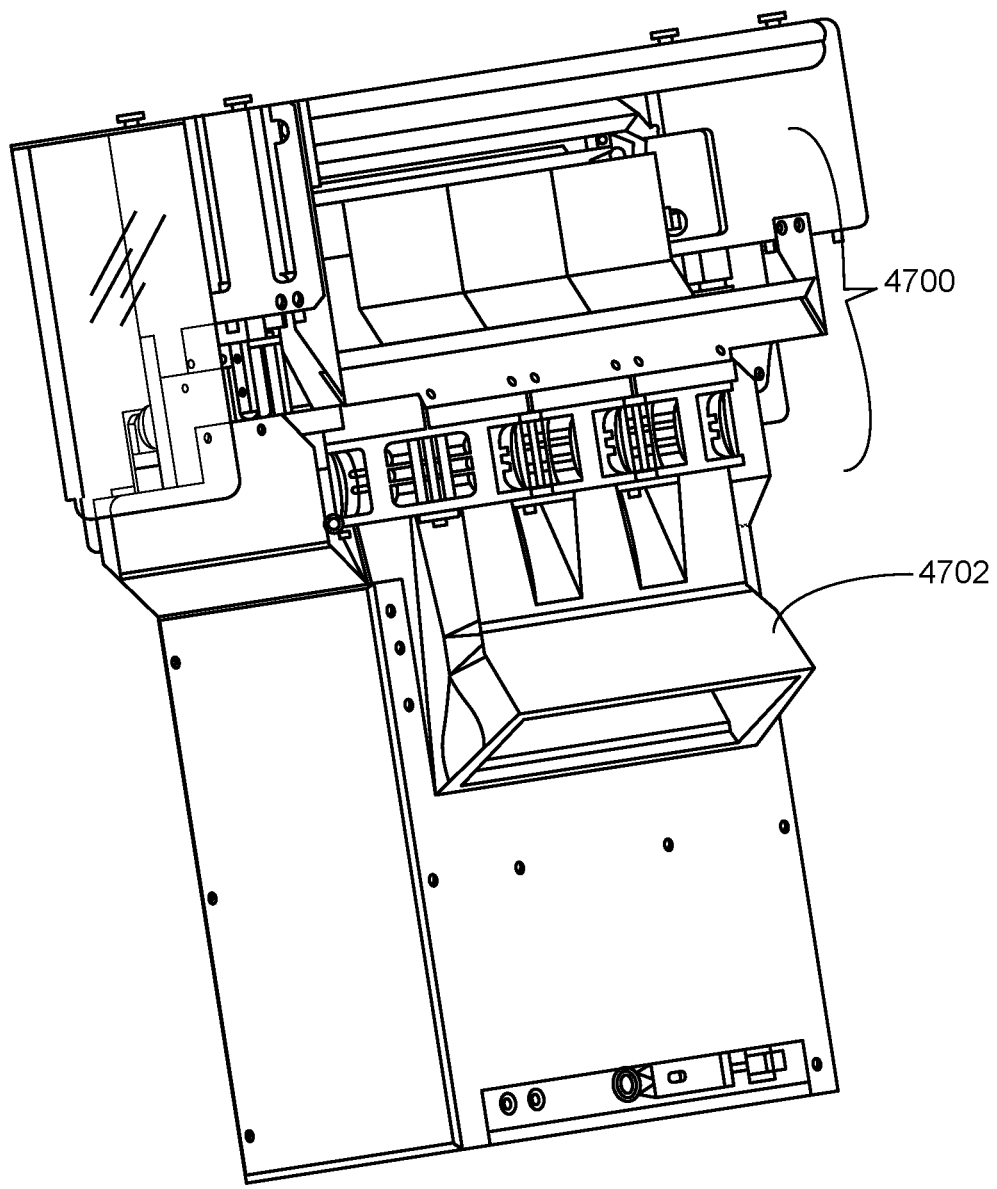
FIG. 47 shows a shroud connected to a sample analysis unit for containing possible contamination emanating from the sample analysis unit according to one embodiment.

In certain aspects, the sample analysis units or modules thereof include one or more components for containment of any contamination, e.g., an aerosolized portion of a reaction mixture emanating from a reaction vessel during thermocycling, or the like. In some embodiments, one or more fans that draw air away from the sample analysis unit is provided. In some embodiments, each thermocycler unit of the sample analysis unit has a dedicated fan for drawing air away from the thermocycler unit. In certain aspects, the one or more fans are enclosed (e.g., hermetically or substantially hermetically) by a shroud. The shroud may be connected (e.g., hermetically or substantially hermetically) to one or more ducts that direct the air drawn away from the sample analysis unit out of the system, e.g., out of a vent located on an exterior portion of the system, e.g., located on a side surface of the system. An example embodiment is illustrated in FIG. 47. In this example, shroud 4702 encloses fans (not shown) that drawer air away from sample analysis unit 4700 or modules thereof. The shroud is connected to a duct (not shown) that directs air drawn away from the sample analysis unit out of the system.

Liquid and Solid Waste Storage Areas

According to certain embodiments, the automated analysis systems of the present disclosure include one or more liquid waste storage areas and/or one or more solid waste storage areas.

In certain aspects, a system of the present disclosure is adapted to dispose of liquid waste into one or more liquid waste containers at one or more liquid waste storage areas, where the liquid waste may be from, e.g., used SP cartridges, fill stations (e.g., overflow, wash, prime, and purge liquids), bulk reagent cradle overflow, and/or the like. According to certain embodiments, a system includes two liquid waste containers, e.g., two 2 liter liquid waste containers. According to certain embodiments, a liquid waste storage area is present in a drawer of the system as shown in FIG. 22. That is, a liquid waste storage area may be present in a drawer that also includes a bulk reagent storage area.

Figure 45:
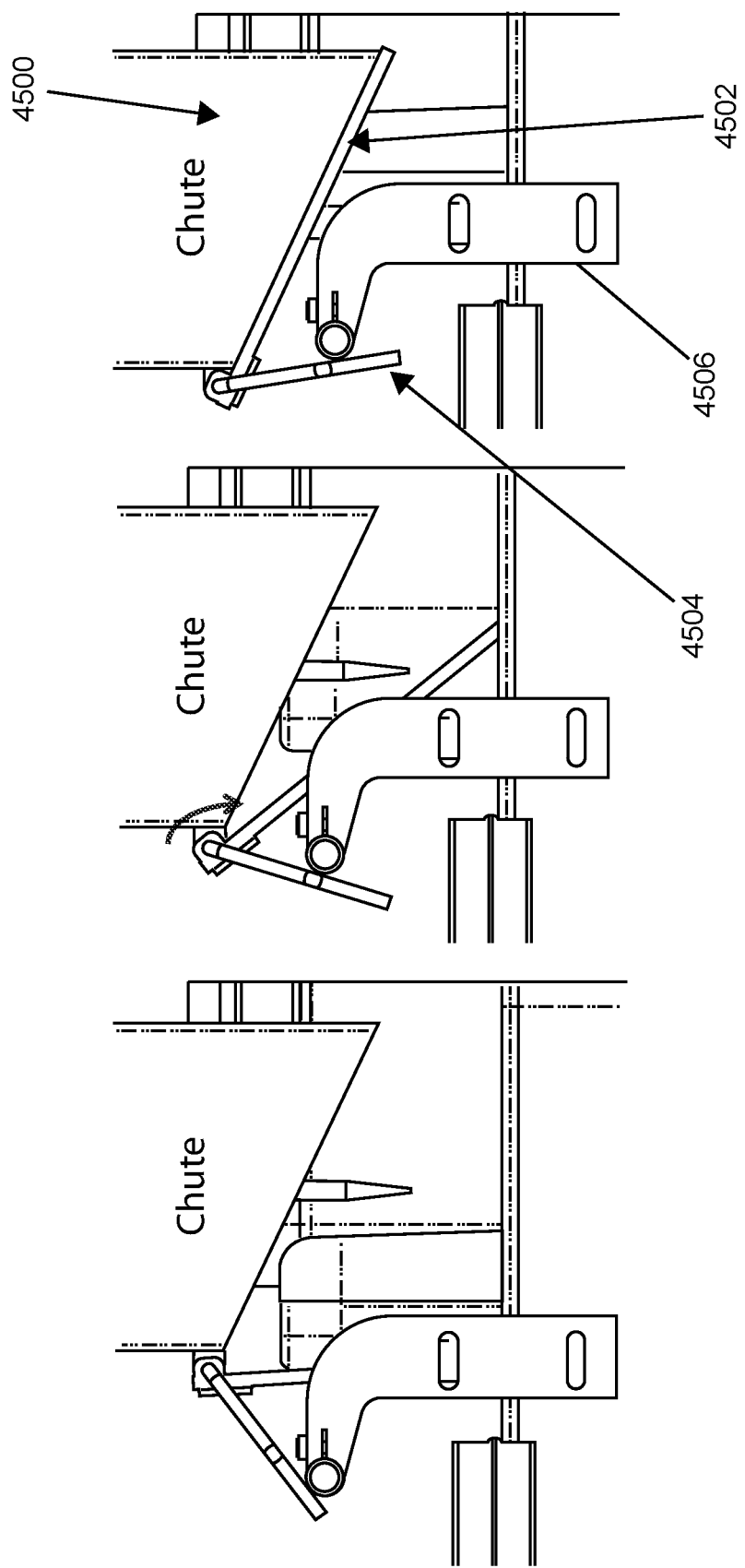
FIG. 45 shows a solid waste chute according to one embodiment.

The system may include one or more solid waste storage areas. According to one embodiment, an analysis system of the present disclosure includes a solid waste storage area present in a drawer of the system as shown in FIG. 22. There, container 2210 for disposing of capped reaction vessels (e.g., which have already undergone sample analysis), pipette tips, and/or the like, is present in a drawer that also includes a bulk reagent storage area and a liquid waste storage area. The solid waste items may be released by the system (e.g., by the robotic pipettor of the system) above the upper opening of chute 2208 which is disposed above container 2210. The drawer and chute may be configured such that the chute is only in communication with the container when the drawer is closed. One such approach is shown in FIG. 45, which shows three panels corresponding to three different drawer positions. The right panel shows chute 4500, chute flap 4502, chute flap handle 4504, and portion 4506 of the drawer, when the drawer is in the open position. When the drawer is in the open position, portion 4506 of the drawer and chute flap handle 4504 are positioned such that chute flap 4502 is blocking the lower end of chute 4500, thereby preventing liquid waste from exiting the bottom of the chute while the door is open. The middle panel shows portion 4506 of the drawer moving toward the left, thereby pushing chute flap handle 4504 in a clockwise direction as the drawer is being closed, such that chute flap 4502 begins to move away from the lower end of chute 4500 as the drawer is closing. The left panel shows portion 4506 of the drawer holding chute flap handle 4504 in a position such that chute flap 4502 is positioned away from the lower end of chute 4500 when the drawer is in the closed position.

Other mechanisms/configurations may be implemented for ensuring that the chute is only in communication with the container when the drawer is closed. For example, in certain aspects, a motor is operably connected to a chute flap. The motor is controlled by system electronics to position the chute flap such that the chute is in communication with the container when the drawer is closed and not in communication with the container when the drawer is open. According to some embodiments, when it is desirable to access the contents of the drawer, a user of the system can request such access, e.g., via a user interface (e.g., button, touchscreen, and/or the like). Upon such a request, system electronics instruct the motor to position the chute flap such that the chute is no longer in communication with the container. Optionally, when such a request is made, system electronics instruct a locking mechanism on the drawer to switch the drawer from a locked to unlocked configuration, e.g., subsequent to the chute flap handle being positioned such that the chute is no longer in communication with the container. An indicator (e.g., a light or particular color thereof) may be provided to the user of the system to indicate that the drawer may be safely opened.

The above-described mechanism/configuration serves as a temporary storage buffer to allow a replacement window for, e.g., replacing or emptying a pipette tip/RV waste container, emptying or replacing a liquid waste container, replacing bulk reagent containers, and/or the like, without disrupting the functioning of the system.

Figure 46:
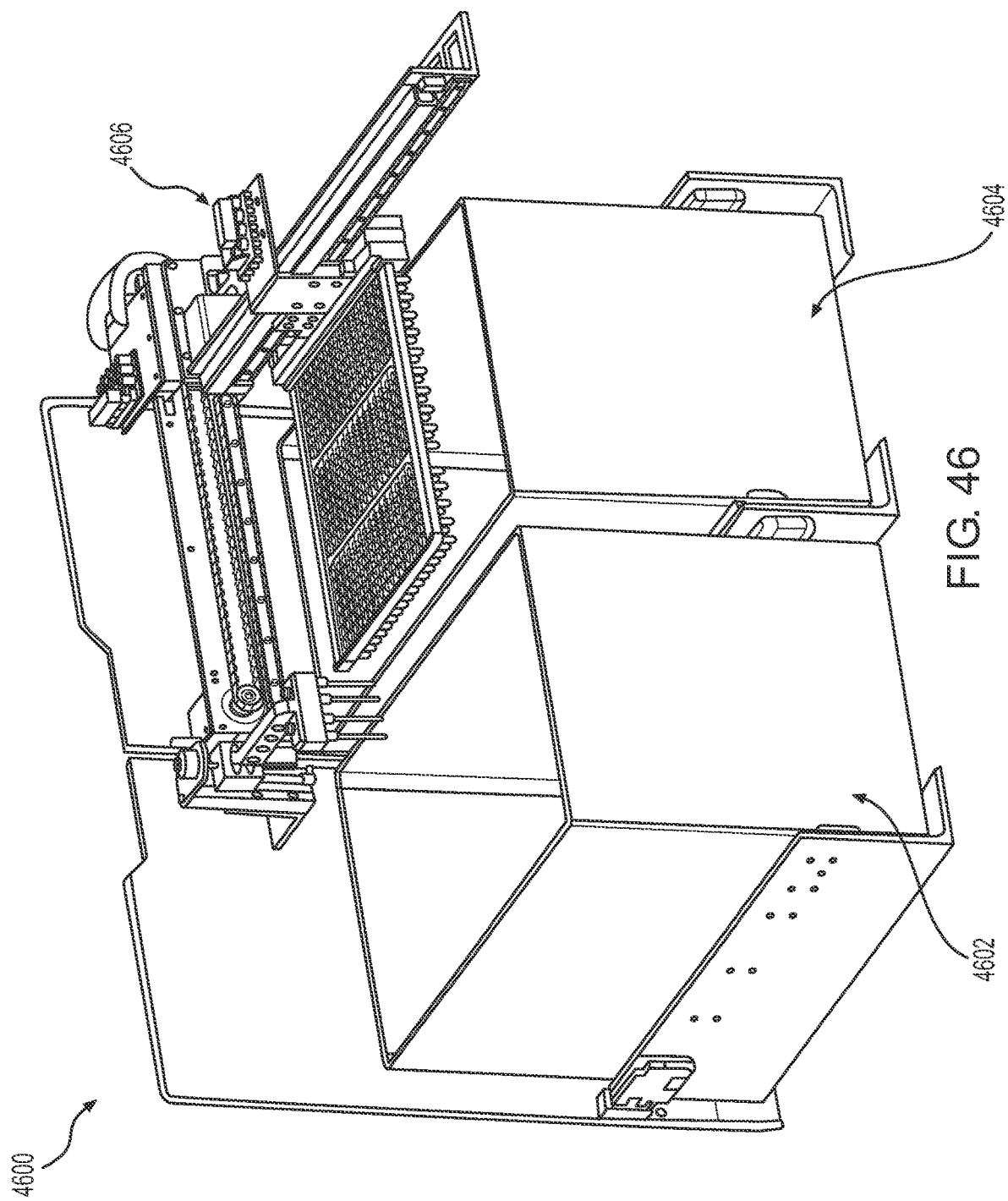
FIG. 46 shows a solid waste container according to one embodiment.

In certain aspects, an analysis system of the present disclosure includes a solid waste storage area that includes one or more solid waste containers into which used SP cartridges are disposed. An example of such a storage area is illustrated in FIG. 46, which may correspond to area 216 of FIG. 2. In this embodiment, solid waste storage area 4600 includes two SP cartridge waste containers 4602 and 4604 into which used SP cartridges are disposed. The SP cartridges may be disposed of by removal of the cartridges from sample processing units of the sample processing station by a solid (or liquid/solid) waste handling module (e.g., liquid/solid waste handling module 4606) which transports the SP cartridges to a position above one of the two containers, and drops the SP cartridges into the container.

Local User Interface

The automated analysis systems of the present disclosure may include a local user interface (LUI). In certain aspects, the LUI includes a touchscreen display (e.g., a touchscreen LCD display) and associated computer hardware for displaying a graphical user interface to the customer. The LUI display may be mounted in a location accessible by the user, and in certain aspects, is mounted on the front of the system, e.g., above the sample introduction station of the system.

The display may enable the user to locally view patient results and assess the status of the instrument. The LUI may be capable of displaying barcode information, provide specimen ID tracking and entry, display instrument status, lane status, reagent status, QC status, fault conditions, and the like.

The LUI may be connected to other systems, such as laboratory information systems or middleware. When connected to laboratory information systems or middleware, operators can download orders to the system control center for processing on the instrument. Operators can also transmit completed test results to laboratory information systems. In certain aspects, the system control center may also connect to other systems to facilitate remote troubleshooting and distribution of system updates.

A LUI according to an embodiment of the present disclosure is shown in FIG. 1, where the LUI is mounted above the sample introduction station of the system.

Notwithstanding the appended claims, the disclosure is also defined by the following clauses:

1. A method of continuously analyzing samples in an automated sample analysis system, comprising:
    loading samples and sample preparation (SP) cartridges into the system;
    filling SP cartridges with bulk reagents at an SP cartridge bulk reagent filling station comprising two or more SP cartridge bulk reagent filling positions;
    pipetting samples into the SP cartridges at an SP cartridge sample filling station comprising two or more SP cartridge sample filling positions;
    preparing the samples in the SP cartridges for analysis by isolating and purifying an analyte present in the samples at a sample preparation station comprising two or more SP cartridge sample preparation positions;
    combining the purified analyte with assay reagents to form assay mixtures; and
    performing analyte detection assays on the assay mixtures to analyze the samples,
    wherein, without ceasing operation of the system, an operator of the system has continuous access to the system for replenishment or removal of one or any combination of: samples, bulk fluids, reagents, commodities, and waste.

2. The method according to Clause 1, comprising performing two or more different analyte detection assays, wherein the system provides random access to any of the two or more different analyte detection assays.

3. The method according to Clause 1 or Clause 2, wherein samples loaded into the system are present in sample tubes.

4. The method according to Clause 3, wherein the sample tubes are present in sample tube racks, and wherein loading samples into the system comprises loading sample tube racks into one of two or more lanes of a sample loading station of the system.

5. The method according to Clause 4, wherein the system comprises from 2 to 20 lanes for sample tube racks.

6. The method according to Clause 4 or Clause 5, comprising reading sample identification information present on the sample tubes as the sample tube racks are loaded into the system.

7. The method according to any one of Clauses 4 to 6, comprising reading sample tube rack identification information present on the sample tube racks upon loading of the sample tube racks into the system.

8. The method according to any one of Clauses 1 to 7, wherein the SP cartridges are loaded into a cartridge loading area of the system, and wherein the method comprises transporting an SP cartridge from the SP cartridge loading area to one of the two or more positions of the SP cartridge bulk reagent filling station.

9. The method according to Clause 8, comprising transporting an SP cartridge from the SP cartridge bulk reagent filling station to one of the two or more positions of the SP cartridge sample filling station.

10. The method according to Clause 9, comprising transporting an SP cartridge from the SP cartridge sample filling station to one of the two or more positions of the sample preparation station.

11. The method according to any one of Clauses 8 to 10, wherein the transporting is performed using a robotic SP cartridge handler.

12. The method according to any one of Clauses 1 to 11, wherein the system comprises a pipette tip storage area.

13. The method according to Clause 12, comprising picking up, using a robotic pipettor, a disposable pipette tip from the pipette tip storage area, aspirating a sample from a sample tube present at the sample introduction area, and dispensing the sample into a first well of the SP cartridge.

14. The method according to Clause 13, comprising aspirating, using the robotic pipettor, a purified sample from a second well of the SP cartridge and dispensing the purified sample into an assay reagent well.

15. The method according to Clause 14, wherein the assay reagent well is a well of an assay reagent plate.

16. The method according to Clause 15, wherein the assay reagent well comprises lyophilized assay reagents.

17. The method according to Clause 15 or Clause 16, comprising transferring, using the robotic pipettor, a mixture that comprises the purified sample and assay reagents from the assay reagent plate to a reaction vessel.

18. The method according to Clause 15, wherein the reaction vessel is present in the SP cartridge.

19. The method according to Clause 17 or Clause 18, comprising picking up, using the robotic pipettor, a reaction vessel cap and capping the reaction vessel.

20. The method according to Clause 19, wherein the system comprises a sample analysis station comprising two or more sample analysis units.

21. The method according to Clause 20, comprising picking up, using the robotic pipettor, the capped reaction vessel and transporting the capped reaction vessel to a well of one of the sample analysis units of the sample analysis station.

22. The method according to any one of Clauses 1 to 21, wherein performing analyte detection assays comprises performing nucleic acid detection assays.

23. The method according to Clause 22, wherein performing nucleic acid detection assays comprises performing real-time nucleic acid amplification and detection.

24. The method according to Clause 22 or Clause 23, wherein preparing the samples in the SP cartridges for analysis comprises isolating and purifying nucleic acids present in the samples.

25. The method according to Clause 24, wherein isolating and purifying nucleic acids present in the samples comprises capturing the nucleic acids using magnetic particles.

26. The method according to any one of Clauses 1 to 25, comprising disposing liquid waste generated during operation of the system into a liquid waste storage area.

27. The method according to Clause 26, wherein the liquid waste storage area comprises a liquid waste chute and a liquid waste container.

28. The method according to Clause 27, wherein the liquid waste storage area is present in a drawer, and the liquid waste chute is in communication with the liquid waste container only when the drawer is closed.

29. The method according to any one of Clauses 1 to 25, comprising disposing solid waste generated during operation of the system into a solid waste storage area.

30. The method according to Clause 29, wherein the solid waste storage area comprises two or more solid waste storage containers.

31. An automated sample analysis system, comprising:
a sample loading area comprising two or more sample loading positions;
a sample preparation (SP) cartridge loading area comprising two or more SP cartridge loading positions;
an SP cartridge bulk reagent filling station comprising two or more SP cartridge filling positions;
a robotic pipettor;
an SP cartridge sample filling station comprising two or more SP cartridge sample filling positions;
a sample preparation station comprising two or more SP cartridge sample preparation positions;
a sample analysis station comprising two or more sample analysis units; and
a sample analysis system control center,
wherein, without ceasing operation of the system, the system provides continuous operator access during replenishment or removal of one or any combination of: samples, bulk fluids, reagents, commodities, and waste.

32. The automated analysis system of Clause 31, wherein the system is adapted to perform two or more different assays and provides random access to any of the two or more different assays.

33. The automated analysis system of Clause 31 or Clause 32, wherein samples are present in sample tubes, and wherein the two or more sample loading positions comprise two or more lanes for sample tube racks.

34. The automated analysis system of Clause 33, wherein the sample loading area comprises from 1 to 20 lanes for sample tube racks.

35. The automated analysis system of any one of Clauses 31 to 34, wherein the sample loading area comprises a sample tube identification code reader.

36. The automated analysis system of any one of Clauses 31 to 35, wherein the sample tube identification code reader reads an identification code present on sample tubes present in a sample tube rack as the sample tube rack is loaded into the system.

37. The automated analysis system of any one of Clauses 31 to 36, wherein the sample loading area comprises a sample tube rack identification code reader.

38. The automated analysis system of any one of Clauses 31 to 37, comprising a robotic SP cartridge handler that transports an SP cartridge from the SP cartridge loading area to one of the two or more positions of the SP cartridge bulk reagent filling station.

39. The automated analysis system of Clause 38, wherein the robotic SP cartridge handler transports an SP cartridge from the SP cartridge bulk reagent filling station to one of the two or more positions of the SP cartridge sample filling station.

40. The automated analysis system of Clause 39, wherein the robotic SP cartridge handler transports an SP cartridge from the SP cartridge sample filling station to one of the two or more positions of the sample preparation station.

41. The automated analysis system of any one of Clauses 31 to 40, comprising a pipette tip storage area.

42. The automated analysis system of Clause 41, wherein the robotic pipettor picks up a disposable pipette tip from the pipette tip storage area, aspirates a sample from a sample tube present at the sample introduction area, and dispenses the sample into a first well of the SP cartridge.

43. The automated analysis system of any one of Clauses 31 to 42, wherein the robotic pipettor aspirates an ancillary reagent from an ancillary reagent tube present at an ancillary reagent loading area of the system and dispenses the ancillary reagent into a well of the SP cartridge.

44. The automated analysis system of Clause 43, wherein the ancillary reagent includes magnetic particles.

45. The automated analysis system of Clause 44, wherein the magnetic particles are maintained in suspension by a mixing motor present at the ancillary reagent loading area.

46. The automated analysis system of Clause 45, wherein a bottom portion of the ancillary reagent tube is inserted into the mixing motor, and the mixing motor alternatingly rotates the ancillary reagent tube in counterclockwise and clockwise directions to maintain the magnetic particles in suspension.

47. The automated analysis system of any one of Clauses 42 to 46, wherein the robotic pipettor aspirates a purified sample from a second well of the SP cartridge and dispenses the purified sample into an assay reagent well.

48. The automated analysis system of Clause 47, wherein the assay reagent well is a well of an assay reagent plate.

49. The automated analysis system of Clause 47 or Clause 48, wherein the assay reagent well comprises lyophilized assay reagents.

50. The automated analysis system of any one of Clauses 47 to 49, wherein the robotic pipettor transfers a mixture comprising the purified sample and assay reagents from the assay reagent plate to a reaction vessel.

51. The automated analysis system of Clause 50, wherein the reaction vessel is present in the SP cartridge.

52. The automated analysis system of Clause 50 or Clause 51, wherein the robotic pipettor picks up a reaction vessel cap and caps the reaction vessel.

53. The automated analysis system of any one of Clauses 50 to 52, wherein the robotic pipettor picks up the capped reaction vessel and transports the capped reaction vessel to a well of one of the sample analysis units of the sample analysis station.

54. The automated analysis system of any one of Clauses 31 to 53, wherein the system is an automated nucleic acid analysis system.

55. The automated analysis system of Clause 54, wherein the sample preparation station is a nucleic acid isolation and purification station.

56. The automated analysis system of Clause 55, wherein the sample preparation station is a magnetic particle-based nucleic acid isolation and purification station.

57. The automated analysis system of any one of Clauses 54 to 56, wherein the sample analysis units are real-time nucleic acid amplification and detection units.

58. The automated analysis system of any one of Clauses 31 to 57, comprising a solid waste storage area.

59. The automated system of Clause 58, wherein the solid waste storage area comprises a solid waste chute and a solid waste container.

60. The automated system of Clause 59, wherein the solid waste storage area is present in a drawer, and the solid waste chute is not in communication with the solid waste container when the drawer is open.

61. The automated system of Clause 58, wherein the solid waste storage area comprises two or more solid waste storage containers present in a drawer.

62. The automated system of any one of Clauses 31 to 61, comprising a liquid waste storage area.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. An automated sample analysis system, comprising:
a sample loading area comprising two or more sample loading positions, each sample loading position structurally engages with a sample tube rack comprising sample tubes so as to receive the sample tube rack;
a sample processing (SP) cartridge loading area comprising two or more SP cartridge loading positions, each SP cartridge loading position structurally engages an SP cartridge so as to receive the SP cartridge, the SP cartridge comprising one or more sample wells, each sample well adapted to receive a sample;
an SP cartridge bulk reagent filling station comprising two or more SP cartridge filling positions, each SP cartridge filling position structurally engages an SP cartridge so as to position the SP cartridge for filling one or more bulk reagents in the SP cartridge;
an SP cartridge sample filling station comprising two or more SP cartridge sample filling positions, each SP cartridge sample filling position structurally engages an SP cartridge so as to position the SP cartridge for receiving a sample from the robotic pipettor;
a robotic pipettor aspirates samples from the sample tubes from the sample loading area and dispenses the samples into the SP cartridges at the SP cartridge sample filling station;
a sample preparation station comprising two or more SP cartridge sample preparation positions, each SP cartridge sample preparation position structurally engages with an SP cartridge so as to position the SP cartridge for engaging with hardware that processes a sample in the SP cartridge for analysis;
a robotic SP cartridge handler that transports an SP cartridge between various positions in the SP cartridge loading area, the SP cartridge bulk reagent filling station, the SP cartridge sample filling station, and the sample preparation station;

a sample analysis station comprising two or more sample analysis units, each sample analysis unit comprising one or more sample analysis wells and a hardware that analyzes an analyte; and a sample analysis system control center controls the automated sample analysis system, wherein, duplication of positions within each of the sample loading area, the SP cartridge loading area, the SP cartridge bulk reagent filling station, the SP cartridge sample filling station, and the sample preparation station allows for continuous access by an operator without ceasing sample analysis in the system for replenishment or removal of: sample tube racks, SP cartridges, bulk reagents, and waste generated during sample preparation and analysis of the samples.

2. The automated analysis system of claim 1, wherein the system is adapted to perform two or more different assays on any of the one or more samples.

3. The automated analysis system of claim 1, wherein the two or more sample loading positions comprise two or more lanes, each lane adapted to receive a sample tube rack comprising one or more sample tubes.

4. The automated analysis system of claim 3, wherein the sample loading area comprises from 2 to 20 lanes, each lane adapted to receive a sample tube rack.

5. The automated analysis system of claim 1, wherein the sample loading area comprises a sample tube identification code reader.

6. The automated analysis system of claim 1, wherein the sample tube identification code reader reads an identification code present on sample tubes present in a sample tube rack as the sample tube rack is loaded into the system.

7. The automated analysis system of claim 1, wherein the sample loading area comprises a sample tube rack identification code reader.

8. The automated analysis system of claim 1, wherein the robotic SP cartridge handler transports an SP cartridge from the SP cartridge loading area to one of the two or more positions of the SP cartridge bulk reagent filling station.

9. The automated analysis system of claim 8, wherein the robotic SP cartridge handler transports an SP cartridge from the SP cartridge bulk reagent filling station to one of the two or more positions of the SP cartridge sample filling station.

10. The automated analysis system of claim 9, wherein the robotic SP cartridge handler transports an SP cartridge from the SP cartridge sample filling station to one of the two or more positions of the sample preparation station.

11. The automated analysis system of claim 1, comprising a pipette tip storage area.

12. The automated analysis system of claim 11, wherein the robotic pipettor picks up a disposable pipette tip from the pipette tip storage area, aspirates a sample from a sample tube present at the sample loading area, and dispenses the sample into one of the one or more sample wells of the SP cartridge.

13. The automated analysis system of claim 1, further comprising an ancillary reagent tube in an ancillary reagent loading area, and wherein the robotic pipettor aspirates the ancillary reagent from the ancillary reagent tube present in the ancillary reagent loading area of the system and dispenses the ancillary reagent into a sample well from the one or more sample wells of the SP cartridge.

14. The automated analysis system of claim 13, wherein the ancillary reagent includes magnetic particles.

15. The automated analysis system of claim 14, wherein the ancillary reagent loading area further comprises a mixing motor, and wherein the magnetic particles are maintained in suspension by the mixing motor in the ancillary reagent loading area.

16. The automated analysis system of claim 15, wherein a bottom portion of the ancillary reagent tube is inserted into the mixing motor, and the mixing motor alternatingly rotates the ancillary reagent tube in counterclockwise and clockwise directions to maintain the magnetic particles in suspension.

17. The automated analysis system of claim 12, wherein the robotic pipettor aspirates a purified sample from the one of the one or more sample wells of the SP cartridge that has been subjected to an analyte purification process in the sample preparation station, and dispenses the purified sample into an assay reagent well of an assay reagent plate.

18. The automated analysis system of claim 17, wherein the assay reagent well comprises lyophilized assay reagents.

19. The automated analysis system of claim 18, wherein the robotic pipettor transfers a mixture comprising the purified sample and assay reagents from the assay reagent plate to a reaction vessel.

20. The automated analysis system of claim 19, wherein the reaction vessel is present in the SP cartridge.

21. The automated analysis system of claim 19, wherein the robotic pipettor picks up a reaction vessel cap and caps the reaction vessel.

22. The automated analysis system of claim 21, wherein the robotic pipettor picks up the capped reaction vessel and transports the capped reaction vessel to a well of the one or more wells of one of the sample analysis units of the sample analysis station.

23. The automated analysis system of claim 1, wherein the system is an automated nucleic acid analysis system, comprising a thermal cycler and a fluorescence detector.

24. The automated analysis system of claim 23, wherein the sample preparation station is a nucleic acid isolation and purification station, comprising reagents for isolation and purification of nucleic acids from samples.

25. The automated analysis system of claim 24, wherein the sample preparation station is a magnetic particle-based nucleic acid isolation and purification station.

26. The automated analysis system of claim 23, wherein the sample analysis units are real-time nucleic acid amplification and detection units.

27. The automated analysis system of claim 1, comprising a solid waste storage area comprising a solid waste container adapted for receiving solid waste generated during the operation of the system.

28. The automated system of claim 27, wherein the solid waste storage area further comprises a solid waste chute.

29. The automated system of claim 28, wherein the solid waste storage area is present in a drawer, and the solid waste chute is not in communication with the solid waste container when the drawer is open.

30. The automated system of claim 27, wherein the solid waste storage area comprises two or more solid waste storage containers present in a drawer.

31. The automated system of claim 1, comprising a liquid waste storage area comprising a liquid waste container adapted for receiving liquid waste generated during the operation of the system.

32. The automated system of claim 1, wherein the robotic pipettor simultaneously aspirates multiple samples from the sample tubes from the sample loading area and simultaneously dispenses the multiple samples into the SP cartridges at the SP cartridge sample filling station.

* * * * *

UNITED STATES PATENT AND TRADEMARK OFFICE
CERTIFICATE OF CORRECTION

PATENT NO. : 12,025,630 B2  
APPLICATION NO. : 16/994163  
DATED : July 2, 2024  
INVENTOR(S) : Jason E. Bryant et al.

It is certified that error appears in the above-identified patent and that said Letters Patent is hereby corrected as shown below:

In the Specification

In Column 19, Line 63, delete "of the of the" and insert -- of the --.

In Column 21, Line 43, delete "thermocyling" and insert -- thermocycling --.

In Column 22, Lines 5-6, delete "thermocyling." and insert -- thermocycling. --.

In the Claims

In Column 30, Line 48, in Claim 28, after "automated" insert -- analysis --.

In Column 30, Line 50, in Claim 29, after "automated" insert -- analysis --.

In Column 30, Line 54, in Claim 30, after "automated" insert -- analysis --.

In Column 30, Line 57, in Claim 31, after "automated" insert -- analysis --.

In Column 30, Line 61, in Claim 32, after "automated" insert -- analysis --.

Signed and Sealed this  
Twenty-ninth Day of October, 2024

Katherine Kelly Vidal  
*Director of the United States Patent and Trademark Office*